United States Patent
Seto et al.

(10) Patent No.: US 8,206,465 B2
(45) Date of Patent: Jun. 26, 2012

(54) AZO PIGMENTS, PIGMENT DISPERSION, COLORING COMPOSITION, AND INK FOR INKJET RECORDING

(75) Inventors: Nobuo Seto, Fujinomiya (JP); Keiichi Tateishi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/921,272

(22) PCT Filed: Mar. 5, 2009

(86) PCT No.: PCT/JP2009/054177
§ 371 (c)(1),
(2), (4) Date: Sep. 7, 2010

(87) PCT Pub. No.: WO2009/110554
PCT Pub. Date: Sep. 11, 2009

(65) Prior Publication Data
US 2011/0011306 A1  Jan. 20, 2011

(30) Foreign Application Priority Data

Mar. 7, 2008 (JP) .................. 2008-058707
Dec. 16, 2008 (JP) .................. 2008-319660

(51) Int. Cl.
*C09B 67/00* (2006.01)
*C09D 11/00* (2006.01)
(52) U.S. Cl. .......... 8/637.1; 8/639; 8/662; 8/670; 8/682; 8/688; 8/689; 8/690; 8/691; 8/692; 106/31.5
(58) Field of Classification Search .................. 8/637.1, 8/639, 662, 670, 682, 688, 689, 690, 691, 8/692; 106/31.5
See application file for complete search history.

(56) References Cited

U.S. PATENT DOCUMENTS
7,108,743 B2 * 9/2006 Fujiwara et al. ........... 106/31.48
(Continued)

FOREIGN PATENT DOCUMENTS
EP 1 676 892 A1 7/2006
(Continued)

OTHER PUBLICATIONS
STIC Search Report dated Jun. 6, 2011.*
(Continued)

*Primary Examiner* — Eisa Elhilo
(74) *Attorney, Agent, or Firm* — Sughrue Mion, PLLC

(57) ABSTRACT

An azo pigment showing excellent coloring characteristics such as tinctorial strength and hue and excellent fastness such as light fastness, and a pigment dispersion containing the azo pigment are provided. An azo pigment represented by the following general formula (1) and a pigment dispersion containing the pigment:

General formula (1)

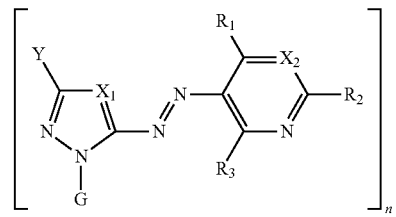

Wherein Y, G, $X_1$, $X_2$, $R_1$, $R_2$ and $R_3$ are defined in the claims and in the specification.

10 Claims, 14 Drawing Sheets

U.S. PATENT DOCUMENTS

2006/0009357 A1     1/2006    Fujiwara et al.
2007/0070160 A1     3/2007    Takasaki et al.

FOREIGN PATENT DOCUMENTS

| | | |
|---|---|---|
| JP | 11-100519 A | 4/1999 |
| JP | 2002-371079 A | 12/2002 |
| JP | 2002-371214 A | 12/2002 |
| JP | 2003-246942 A | 9/2003 |
| JP | 2005-213357 A | 8/2005 |
| WO | 02/083662 A2 | 10/2002 |
| WO | 2005-030887 A1 | 4/2005 |
| WO | 2007/083840 A1 | 7/2007 |
| WO | 2007/088794 A1 | 8/2007 |

OTHER PUBLICATIONS

International Search Report (PCT/ISA/210) for PCT/JP2009-054177; dated May 19, 2009.

Written Opinion (PCT/ISA/237) for PCT/JP2009-054177; dated May 19, 2009.

Extended European Search Report dated Jun. 8, 2011, in application No. 09716363.8.

* cited by examiner

EXEMPLIFIED EXAMPLE D-101

EXEMPLIFIED EXAMPLE D-103

AZO PIGMENTS, PIGMENT DISPERSION, COLORING COMPOSITION, AND INK FOR INKJET RECORDING

TECHNICAL FIELD

The present invention relates to novel nitrogen-containing heterocyclic azo pigments, and a pigment dispersion, coloring composition and ink for inkjet recording containing the azo pigment.

BACKGROUND ART

In recent years, as image-recording materials, materials for forming color images have been predominant and, specifically, recording materials for an ink jet system, recording materials for a thermal transfer system, recording materials for an electro-photographic system, transfer type silver halide light-sensitive materials, printing inks, and recording pens have found widespread use. Also, in photographing devices such as CCDs for photographing equipment, and in LCDs and PDPs for display, color filters are used for recording or reproducing a color image. In these color image recording materials and color filters, colorants (dyes or pigments) of three primary colors of a so-called additive color mixing process or subtractive color mixing process have been used in order to display or record full-color images. In actuality, however, there is no fast colorant having the absorption characteristics capable of realizing a preferred color reproduction region and resisting various use conditions and environmental conditions. Thus, the improvement thereof has strongly been desired.

Dyes or pigments to be used for the above-mentioned uses are required to have in common the following properties. That is, they are required to have absorption characteristics favorable in view of color reproduction and have good fastness under the conditions of the environment wherein they are used, for example, fastness against light, heat, and an oxidative gas such as ozone. In addition, in the case where the colorant is a pigment, the pigment is further required to be substantially insoluble in water or in an organic solvent, to have a good fastness to chemicals, and not to lose the preferred absorption characteristics it shows in a molecularly dispersed state even when used as particles. Although the required properties described above can be controlled by adjusting the intensity of intermolecular interaction, both of them are in a trade-off relation with each other, thus being difficult to allow them to be compatible with each other. Besides, in the case of using a pigment as the colorant, the pigment is additionally required to have a particle size and a particle shape necessary for realizing desired transparency, to have good fastness under the conditions of the environment wherein they are used, for example, fastness against light, heat, and an oxidative gas such as ozone, to have good fastness to an organic solvent and chemicals such as a sulfurous acid gas, and to be capable of being dispersed in a used medium to a level of fine particles, with the dispersed state being stable. In particular, there is a strong demand for a pigment which has a good hue and is fast to light, moist heat, and active gases in the environment, particularly for a pigment having high tinctorial strength and is fast against light.

That is, in comparison with a dye which is required to have properties as colorant molecules, the pigment is required to have more properties, i.e., it is required to satisfy all of the above-mentioned requirements as a solid of an aggregate of a colorant (dispersion of fine particles) as well as the properties as molecules of a colorant molecule. As a result, a group of compounds which can be used as pigments are extremely limited in comparison with dyes. Even when high-performance dyes are converted to pigments, few of them can satisfy requirement for the properties as a dispersion of fine particles. Thus, such pigments are difficult to develop. This can be confirmed from the fact that the number of pigments registered in Color Index is no more than $1/10$ of the number of dyes.

Azo pigments are excellent in hue and tinctorial strength which are characteristics of coloring, and hence they have widely been used in printing inks, ink for an inkjet system, and electro-photographic materials. Of the pigments, yellow diarylide pigments and red naphthol azo pigments are the most typically used as azo pigments. Examples of such diarylide pigments include C.I. pigment yellow 12, C.I. pigment yellow 13, and C.I. pigment yellow 17. Examples of such napththol azo pigments include C.I. pigment red 208 and C.I. pigment red 242. However, these pigments are inferior in fastness, particularly light fastness, and hence they are decomposed when prints printed by them are exposed to light, thus being inappropriate for prints which are to be stored for a long time.

In order to remove such defects, there have been disclosed azo pigments having a fastness improved by increasing molecular weight or by introducing a group having a strong intermolecular interaction (see, for example, patent document 1). However, even the improved pigments have still insufficient light fastness though improved to some extent.

Also, patent document 2 discloses colorants which have absorption characteristics excellent in color reproducibility and have sufficient fastness. However, all of the specific compounds described in the patent document dissolve in water or in an organic solvent, thus being insufficient in fastness against chemicals.

In the case of expressing a full-color image based on the subtractive color mixing process using three colors of yellow, magenta, and cyan or using four colors further including black, use of a pigment having an inferior fastness as one of the pigments would change gray balance of the prints with the lapse of time, and use of a pigment having inferior coloring characteristics would reduce color reproducibility upon printing. Thus, in order to obtain prints which can maintain high color reproducibility for a long time, there have been desired a pigment and a pigment dispersion which have both good coloring characteristics and good fastness.

Azo colorants have conventionally been utilized in various fields since they absorb various visible lights. For example, they have come into use in such various fields as coloring of synthetic resins, printing inks, colorants for sublimation type thermal transfer materials, inks for inkjet recording, and colorants for color filters. Important performance required for azo colorants as colorants includes absorption spectrum. Hue of a colorant exerts a great influence on color tone and feeling of a body colored with the colorant, giving a large effect on visual sensation. Therefore, there have long been made studies on absorption spectrum of a colorant.

The azo dye having as an azo component a nitrogen-containing 5-membered ring which has conventionally been known is also disclosed in Patent documents 2 to 5.

Patent document 1: JP-A-11-100519
Patent document 2: JP-A-2005-213357
Patent document 3: JP-A-2003-246942
Patent document 4: JP-A-2002-371214
Patent document 5: JP-A-2002-371079

DISCLOSURE OF THE INVENTION

Problems that the Invention is to Solve

An object of the invention is to provide azo pigments having excellent coloring characteristics such as tinctorial strength and hue and excellent fastness such as light fastness and ozone fastness, an azo pigment dispersion, a coloring composition, and an ink for inkjet recording.

Means for Solving the Problem

As a result of intensive investigations, the inventors have found that particular nitrogen-containing, heterocyclic azo pigments show a good hue and exhibits good light fastness, heat fastness, and ozone fastness. Specific means for solving the above-described problem will be described below.

[1]

An azo pigment represented by the general formula (1), a tautomer, salt, or hydrate thereof.

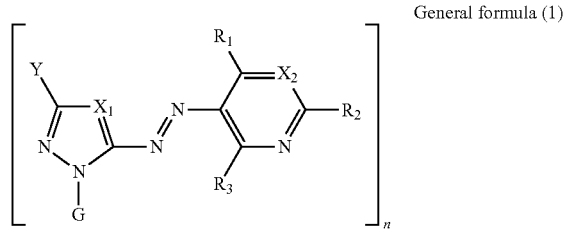

General formula (1)

In general formula (1), G represents an aliphatic group, an aryl group, or a heterocyclic group; Y represents a hydrogen atom or an aliphatic group; $R_1$ represents an aliphatic group, an aliphatic amino group, an arylamino group, a heterocyclic amino group, an acylamino group, a sulfonamido group, an amino group, or a heterocyclic group; $R_2$ and $R_3$ each independently represents an aliphatic amino group, an arylamino group, a heterocyclic amino group, an acylamino group, a sulfonamido group, an amino group, or a heterocyclic group; $X_1$ represents a nitrogen atom or C—Z, Z represents an electron-withdrawing group having a Hammett σp value of 0.2 or more; $X_2$ represents a nitrogen atom or C—$R_5$, $R_5$ represents a hydrogen atom, a cyano group, a carbamoyl group, an aliphatic oxycarbonyl group, or a carboxyl group; n represents an integer of from 1 to 4; when n=2, the general formula (1) represents a dimer formed through $R_1$, $R_2$, $R_3$, Y, Z, or G; when n=3, the general formula (1) represents a trimer formed through $R_1$, $R_2$, $R_3$, Y, Z, or G; when n=4, the general formula (1) represents a tetramer formed through $R_1$, $R_2$, $R_3$, Y, Z, or G.

[2]

The azo pigment, a tautomer, salt, or hydrate thereof according to [1], wherein the azo pigment represented by the general formula (1) is represented by general formula (2) or (2-1).

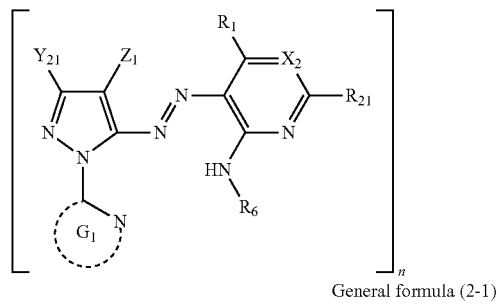

General formula (2)

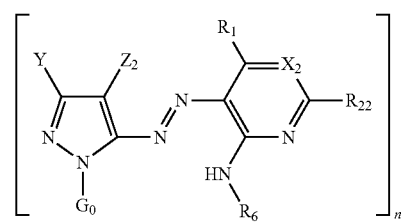

General formula (2-1)

In general formulae (2) and (2-1), Y, $R_1$, n, and $X_2$ are the same as those defined with respect to the general formula (1); $R_6$ represents a hydrogen atom, an aliphatic group, an aryl group, or a heterocyclic group; $R_{21}$ and $R_{22}$ each independently represents an aliphatic amino group, an arylamino group, a heterocyclic amino group, an acylamino group, a sulfonamido group, an amino group, or a heterocyclic group; $G_1$ represents a 5- or 6-membered ring together with carbon atoms and a nitrogen atom(s), the heterocyclic ring may be an aromatic ring or a condensed ring; $G_0$ represents an aliphatic group; $Z_1$ and $Z_2$ each represents an electron-withdrawing group having a Hammett σp value of 0.2 or more; $Y_{21}$ represents a hydrogen atom or a methyl group.

[3]

A pigment dispersion containing at least one azo pigment according to [1] or [2], a tautomer, salt, or hydrate thereof.

[4]

A coloring composition containing at least one azo pigment according to [1] or [2], a tautomer, salt, or hydrate thereof.

[5]

An ink for inkjet recording using the pigment dispersion according to [3].

[6]

An azo compound represented by the general formula (2) or (2-1).

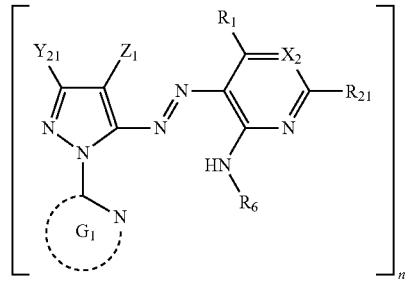

General formula (2)

-continued

General formula (2-1)

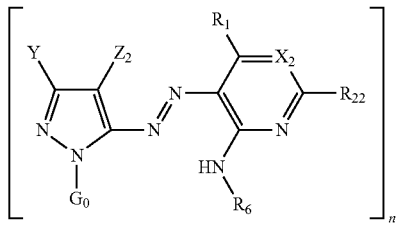

In general formulae (2) and (2-1), Y represents a hydrogen atom or an aliphatic group; $R_1$ represents an aliphatic group, an aliphatic amino group, an arylamino group, a heterocyclic amino group, an acylamino group, a sulfonamido group, an amino group, or a heterocyclic group; $R_{21}$ and $R_{22}$ each independently represents an aliphatic amino group, an arylamino group, a heterocyclic amino group, an acylamino group, a sulfonamido group, an amino group, or a heterocyclic group; $Z_1$ and $Z_2$ each represents an electron-withdrawing group having a Hammett σp value of 0.2 or more; $X_2$ represents a nitrogen atom or C—$R_5$, $R_5$ represents a hydrogen atom, a cyano group, a carbamoyl group, an aliphatic oxycarbonyl group, or a carboxyl group; $R_6$ represents a hydrogen atom, an aliphatic group, an aryl group, or a heterocyclic group; $G_0$ represents an aliphatic group; $G_1$ represents a 5- or 6-membered ring together with carbon atoms and a nitrogen atom(s), the heterocyclic ring may be an aromatic ring or a condensed ring; $Y_{21}$ represents a hydrogen atom or a methyl group; n represents an integer of from 1 to 4; when n=2, the general formula (1) represents a dimer formed through $R_1$, $R_{21}$, $R_{22}$, $R_6$, Y, $Y_{21}$, $Z_1$, $Z_2$, $G_O$, or $G_1$; when n=3, the general formula (1) represents a trimer formed through $R_1$, $R_{21}$, $R_{22}$, $R_6$, Y, $Y_{21}$, $Z_1$, $Z_2$, $G_0$, or $G_1$; when n=4, the general formula (1) represents a tetramer formed through $R_1$, $R_{21}$, $R_{22}$, $R_6$, Y, $Y_{21}$, $Z_1$, $Z_2$, $G_0$, or $G_1$.

Advantages of the Invention

The azo pigments of the present invention have excellent coloring characteristics such as high tinctorial strength and hue, and have excellent fastness, such as light fastness and ozone fastness.

Further, the pigment dispersion of the invention contains the azo pigment of the invention dispersed in various media, and show excellent coloring characteristics, excellent fastness, and excellent dispersion stability.

BEST MODE FOR CARRYING OUT THE INVENTION

Figure 1:
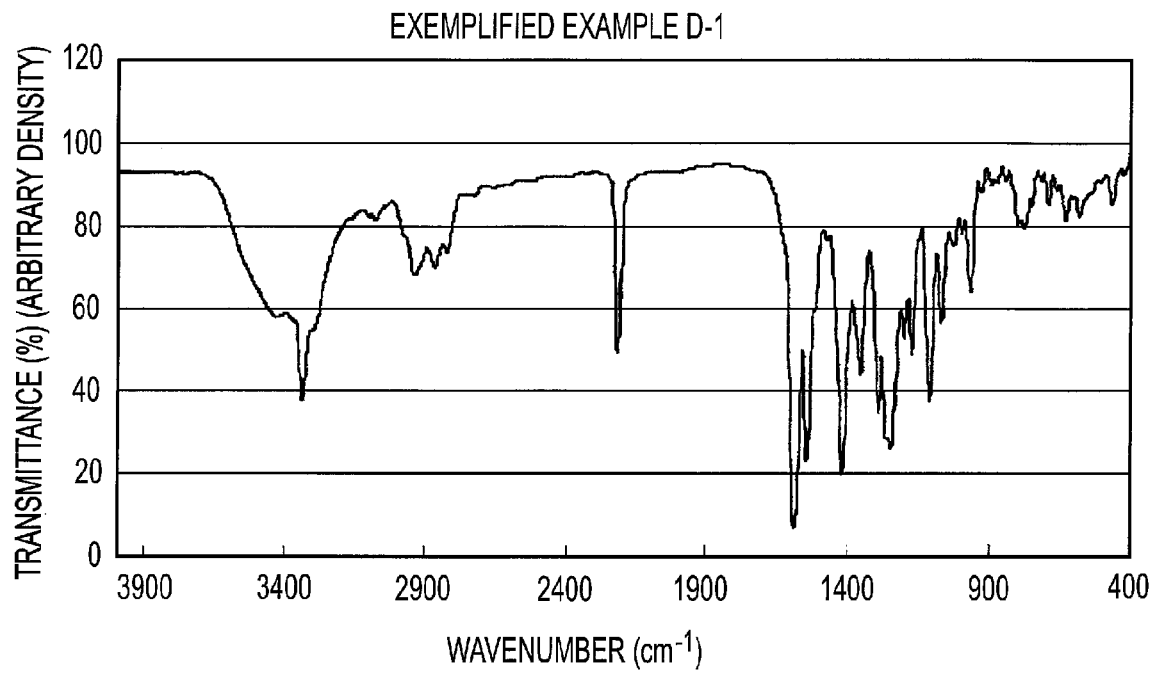
FIG. 1 is an infrared absorption spectrum of a specific illustrative compound D-1 synthesized according to Synthesis Example 1.

First, the terms "aliphatic group", "aryl group", "heterocyclic group", and "substituent" as used in the present invention will be described below.

In the aliphatic group in the invention, the aliphatic moiety thereof may be straight, branched, or cyclic, and may be saturated or unsaturated. Specifically, there can be illustrated an alkyl group, an alkenyl group, a cycloalkyl group, and a cycloalkenyl group. Further, the aliphatic group may be unsubstituted or may have a substituent.

Also, the aryl group may be a monocyclic group or a condensed ring group, and may be unsubstituted or may have a substituent. Also, with the heterocyclic group, the heterocyclic moiety may be any ring that contains a hetero atom (e.g., a nitrogen atom, a sulfur atom, or an oxygen atom) in the ring, and may be a saturated ring or an unsaturated ring. Also, the ring may be a monocyclic ring or a condensed ring, and may be unsubstituted or may have a substituent.

Also, the substituent in the invention means any substitutable group, and examples thereof include an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxycarbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamido group, an arylsulfonamido group, a heterocyclic sulfonamido group, an amino group, an aliphatic amino group, an arylamino group, a heterocyclic amino group, an aliphatic oxycarbonylamino group, an aryloxycarbonylamino group, a heterocyclic oxycarbonylamino group, an aliphatic sulfinyl group, an arylsulfinyl group, an aliphatic thio group, an arylthio group, a hydroxyl group, a cyano group, a sulfo group, a carboxyl group, an aliphatic oxyamino group, an aryloxyamino group, a carbamoylamino group, a sulfamoylamino group, a halogen atom, a sulfamoylcarbamoyl group, a carbamoylsulfamoyl group, a dialiphatic oxyphosphinyl group, a diaryloxyphosphinyl group, and an ionic hydrophilic group (e.g., a carboxyl group, a sulfo group, a phosphono group, or a quaternary ammonium salt).

In the case where the azo pigment of the invention contains an ionic hydrophilic group as a substituent, it is preferably a salt with a multi-valent metal cation (for example, magnesium ion, calcium ion, or barium ion), and is particularly preferably a lake pigment.

A Hammett substituent constant σp to be used in this specification is briefly explained below.

The Hammett's rule is an empirical rule advocated by L. P. Hammett in 1935 in an attempt to quantitatively discuss the influences of a substituent on the reaction or equilibrium of a benzene derivative, the validity of which has been widely accepted nowadays. Substituent constants obtained by the Hammett's rule include σp and σm values. These values are found in a number of general books. The details are given in, for example, J. A. Dean (ed.), *Lange's Handbook of Chemistry*, the 12th Ed., MacGraw-Hill, 1979 and *Kagakuno Ryoiki*, Extra No. 122, Nankodo, 1979, 96-103. While substituents are described in the invention by reference to their Hammett substituent constants σp, it is needless to say that such description applies to not only the substituents whose Hammett substituent constants σp are known from the literature but those whose Hammett substituent constants σp are unknown from the literature but are to fall within a range in question when determined in accordance with the Hammett's rule. Although compounds of the invention represented by the general formula (1) or (2) are not benzene derivatives, σp values are referred to as a measure of the electron effect of their substituents irrespective of the position of substitution. In the invention, the σp value will be used in this mean.

[Azo Pigments]

Pigments are in a state wherein molecules constituting them are strongly connected to each other through aggregation energy produced by strong interaction between pigment molecules. In order to realize this state, van der Waals force and intermolecular hydrogen bond are necessary as described in, for example, *The Imaging Society of Japan*, vol. 43, p. 10 (2004).

In order to increase the intermolecular van der Waals force, introduction of an aromatic group, a polar group and/or a hetero atom to a molecule may be considered. Also, in order to form intermolecular hydrogen bond, introduction of a substituent which contains a hydrogen atom connected to a hetero atom and/or introduction of an electron donative substituent may be considered. Further, polarity of the entire molecule may preferably be considered to be higher. For these purposes, with a chain group such as an alkyl group, a shorter group may be considered to be preferred and, with respect to the value of molecular weight/azo group, a smaller value may be considered to be preferred.

From these standpoints, pigment particles preferably contain an amido bond, a sulfonamido bond, an ether bond, a sulfon group, an oxycarbonyl group, an imido group, a carbamoylamino group, a heterocyclic ring, a benzene ring, or the like.

The azo pigments of the invention are represented by the following general formula (1).

The compounds represented by the general formula (1) intend to produce intermolecular interaction between colorant molecules due to the unique structure thereof, show a low solubility for water or for an organic solvent, thus being usable as azo pigments.

As is different from dyes which are used by dissolving in water or in an organic solvent in a molecular dispersion state, pigments are finely dispersed in a solvent as solid particles such as molecular aggregates.

Also, the pigments can show excellent coloring characteristics such as tinctorial strength and hue and excellent fastness such as light fastness and ozone fastness by having particular structure represented by the following general formula (1).

Next, pigments represented by the general formula (1) will be described below.

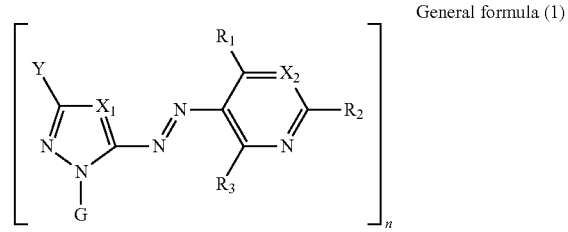

General formula (1)

(In general formula (1), G represents an aliphatic group, an aryl group, or a heterocyclic group, and Y represents a hydrogen atom or an aliphatic group. $R_1$ represents an aliphatic group, an aliphatic amino group, an arylamino group, a heterocyclic amino group, an amino group, an acylamino group, a sulfonamido group, or a heterocyclic group, and $R_2$ and $R_3$ each independently represents an aliphatic amino group, an arylamino group, a heterocyclic amino group, an amino group, an acylamino group, a sulfonamido group, or a heterocyclic group. $X_1$ represents a nitrogen atom or C—Z. Z represents an electron-withdrawing group having a Hammett σp value of 0.2 or more. $X_2$ represents a nitrogen atom or C—$R_5$. $R_5$ represents a hydrogen atom, a cyano group, a carbamoyl group, an aliphatic oxycarbonyl group, or a carboxyl group. n represents an integer of from 1 to 4. When n=2, the general formula (1) represents a dimer formed through $R_1$, $R_2$, $R_3$, Y, Z, or G. When n=3, the general formula (1) represents a trimer formed through $R_1$, $R_2$, $R_3$, Y, Z, or G. When n=4, the general formula (1) represents a tetramer formed through $R_1$, $R_2$, $R_3$, Y, Z, or G.)

The aliphatic group represented by G may have a substituent, and may be saturated or unsaturated. As a group which may be the substituent, any group that has been described hereinbefore as substituents and that is substitutable may be employed. As the aliphatic group represented by G, an aliphatic group containing a total of from 1 to 8 carbon atoms is preferred, and an alkyl group containing a total of from 1 to 4 carbon atoms is more preferred. Examples thereof include methyl, ethyl, vinyl, cyclohexyl, and carbamoylmethyl.

The aryl group represented by G may be a condensed ring, and may have a substituent. As a group which may be the substituent, any group that has been described hereinbefore as a substituent and that is substitutable may be employed. As the aryl group represented by G, an aryl group containing a total of from 6 to 12 carbon atoms is preferred, and an aryl group containing a total of from 6 to 10 carbon atoms is more preferred. Examples thereof include phenyl, 4-nitrophenyl, 4-acetylaminophenyl, and 4-methanesulfonylphenyl.

The heterocyclic group represented by G may have a substituent, may be saturated or unsaturated, and may be a condensed ring. The heterocyclic group is preferably a heterocyclic group containing a total of from 2 to 12 carbon atoms and being connected at a carbon atom, more preferably an unsaturated 5- or 6-membered heterocyclic group containing a total of from 2 to 10 carbon atoms and being connected at a carbon atom, still more preferably an unsaturated 5- or 6-membered heterocyclic group containing a total of from 2 to 10 carbon atoms and having a nitrogen atom adjacent to the position at which the heterocyclic group is connected to the pyrazole ring, and most preferably an aromatic 6-membered heterocyclic group connected at a carbon atom. Examples thereof include 2-tetrahydrofuryl, 2-furyl, 2-pyrrolyl, 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, and 2-triazinyl. These heterocyclic groups may have a tautomer structure together with the substituent. As a group which may be the substituent for the heterocyclic group represented by G, any group that has been described hereinbefore as a substituent and that is substitutable may be employed. Preferred examples thereof include an aliphatic group, an aryl group, a hydroxyl group, a halogen atom, an aliphatic oxy group, an aliphatic thio group, an amino group which may be substituted, a carbamoylamino group, an acylamino group, a sulfonamido group, a carbamoyl group, and a sulfamoyl group, more preferred examples thereof include aliphatic group, a hydroxyl group, an aliphatic oxy group, an aliphatic thio group, an amino group which may be substituted, a carbamoylamino group, an acylamino group, and a carbamoyl group.

The aliphatic group represented by Y may have a substituent, and may be saturated or unsaturated. As a group which may be the substituent for the aliphatic group of Y, any group that has been described hereinbefore as a substituent and that is substitutable may be employed. As the aliphatic group represented by Y, an alkyl group containing a total of from 1 to 8 carbon atoms is preferred, and an alkyl group containing a total of from 1 to 6 carbon atoms is more preferred. Examples thereof include methyl, ethyl, vinyl, cyclohexyl, (t)-butyl, and carbamoylmethyl.

The aliphatic group represented by $R_1$ may have a substituent, and may be saturated or unsaturated. As a group which may be the substituent, any group that has been described hereinbefore as a substituent and that is substitutable may be employed. As the aliphatic group represented by $R_1$, an alkyl group containing a total of from 1 to 8 carbon atoms is preferred, and an alkyl group containing a total of from 1 to 6 carbon atoms is more preferred. Examples thereof include methyl, ethyl, i-propyl, cyclohexyl, and t-butyl.

The aliphatic amino group represented by $R_1$, $R_2$, and $R_3$ may have a substituent, and may be saturated or unsaturated. As a group which may be the substituent, any group that has been described hereinbefore as a substituent and that is substitutable may be employed. As the aliphatic amino group represented by $R_1$ and $R_2$, an aliphatic amino group containing a total of from 1 to 8 carbon atoms is preferred, and an alkylamino group containing a total of from 1 to 4 carbon atoms and having a hydrogen atom connected to the amino group is more preferred. Examples thereof include methylamino, ethylamino, dimethylamino, diethylamino, and methoxyethylamino. As the aliphatic amino group represented by $R_3$, an aliphatic amino group containing a total of from 1 to 8 carbon atoms and having a hydrogen atom connected to the amino group is preferred, and an alkylamino group containing a total of from 1 to 4 carbon atoms and having a hydrogen atom connected to the amino group is more preferred. Examples thereof include methylamino, ethylamino, methoxyethylamino, and acetylaminoethylamino.

The arylamino group represented by $R_1$, $R_2$, and $R_3$ may have a substituent. As a group which may be the substituent, any group that has been described hereinbefore as a substituent and that is substitutable may be employed. In the case where the arylamino group has a substituent, it is preferred for the arylamino group to have the substituent at a m- and/or p-position with respect to the amino group, and it is more preferred for the arylamino group to have the substituent only at a p-position with respect to the amino group.

The arylamino group represented by $R_1$, $R_2$, and $R_3$ is preferably an arylamino group containing a total of from 6 to 16 carbon atoms, more preferably an arylamino group containing a total of from 6 to 8 carbon atoms. Examples thereof include anilino, 4-acetylaminoanilino, N-methyl-3-methoxyanilino, 3-carbamoylanilino, and 3-carbamoylaminoanilino.

The heterocyclic amino group represented by $R_1$, $R_2$, and $R_3$ may have a substituent, and may be saturated or unsaturated. As a group which may be the substituent, any group that has been described hereinbefore as a substituent and that is substitutable may be employed. The heterocyclic amino group represented by $R_1$, $R_2$, and $R_3$ is preferably a heterocyclic amino group containing a total of from 2 to 16 carbon atoms, more preferably a 5- or 6-membered heterocyclic amino group containing a total of from 2 to 12 carbon atoms. Examples thereof include 2-pyridylamino, 2-pyrimidylamino, and 2-pyrrolidinylamino.

The acylamino group represented by $R_1$, $R_2$, and $R_3$ may have a substituent, and may be aliphatic, aromatic, or heterocyclic. As a group which may be the substituent, any group that has been described hereinbefore as a substituent and that is substitutable may be employed. The acylamino group represented by $R_1$, $R_2$, and $R_3$ is preferably an acylamino group containing a total of from 1 to 12 carbon atoms, more preferably an acylamino group containing a total of from 1 to 8 carbon atoms, still more preferably an alkyloxycarbonylamino group containing a total of from 1 to 8 carbon atoms. Examples thereof include acetylamino, benzoylamino, and 2-pyridinecarbonylamino, propanoylamino.

The sulfonamido group represented by $R_1$, $R_2$, and $R_3$ may have a substituent, and may be aliphatic, aromatic, or heterocyclic. As a group which may be the substituent, any group that has been described hereinbefore as a substituent and that is substitutable may be employed. The sulfonamido group represented by $R_1$, $R_2$, and $R_3$ is preferably a sulfonamido group containing a total of from 1 to 12 carbon atoms, more preferably a sulfonamido group containing a total of from 1 to 8 carbon atoms, still more preferably an alkylsulfonamido group containing a total of from 1 to 8 carbon atoms. Examples thereof include methanesulfonamido, benzenesulfonamido, and 2-pyridinesulfonamido.

The heterocyclic group represented by $R_1$, $R_2$, and $R_3$ may have a substituent, may be saturated or unsaturated, and may be a condensed ring. As a group which may be the substituent, any group that has been described hereinbefore as a substituent and that is substitutable may be employed. The heterocyclic group represented by $R_1$, $R_2$, and $R_3$ is preferably a heterocyclic group containing a total of from 2 to 16 carbon atoms and being connected at nitrogen atom, more preferably a 5- or 6-membered heterocyclic group containing a total of from 2 to 12 carbon atoms and being connected at a nitrogen atom. Examples thereof include 1-pyrrolidinyl, 4-morpholinyl, 1-piperidinyl, 1-pyrrolyl, 1-imidazolyl, and 1-benzimidazolyl.

In the general formula (1), Z is an electron-withdrawing group having a Hammett substituent constant σp value of 0.2 or more, preferably an electron-withdrawing group having a Hammett substituent constant σp value of 0.30 or more. With respect to the upper limit of σp value, an electron-withdrawing group having a Hammett substituent constant σp value of 1.0 or less is preferred.

Specific examples of Z which is an electron-withdrawing group having a σp value of 0.2 or more include an acyl group, an acyloxy group, a carbamoyl group, an aliphatic oxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanato group, a thiocarbonyl group, a halogenated alkyl group, a halogenated alkoxy group, a halogenated aryloxy group, a halogenated alkylamino group, a halogenated alkylthio group, an aryl group substituted by other electron-withdrawing group having a σp value of 0.2 or more, a heterocyclic group, a halogen atom, an azo group, and a selenocyanato group.

Z preferably represents a cyano group, a carbamoyl group, an aliphatic oxycarbonyl group, a carboxyl group, or a sulfonyl group.

The carbamoyl group represented by Z may have a substituent. As a group which may be the substituent, any group that has been described hereinbefore as a substituent and that is substitutable may be employed. The carbamoyl group represented by Z is preferably a carbamoyl group containing a total of from 1 to 12 carbon atoms, more preferably a carbamoyl group containing a total of from 1 to 7 carbon atoms, still more preferably an unsubstituted or alkyl-substituted carbamoyl group having a total of from 1 to 5 carbon atoms, most preferably an unsubstituted carbamoyl group. Examples thereof include unsubstituted carbamoyl, N-methylcarbamoyl, N,N-dimethylcarbamoyl, and N-ethylcarbamoyl.

The aliphatic oxycarbonyl group represented by Z may have a substituent. As a group which may be the substituent, any group that has been described hereinbefore as a substituent and that is substitutable may be employed. The aliphatic oxycarbonyl group represented by Z is preferably an aliphatic oxycarbonyl group containing a total of from 2 to 12 carbon atoms, more preferably an alkoxycarbonyl group containing a total of from 2 to 8 carbon atoms. Examples thereof include methoxycarbonyl, ethoxycarbonyl, and carbamoylmethoxycarbonyl.

The sulfonyl group represented by Z may have a substituent, and may be aliphatic, aromatic or heterocyclic. As a group which may be the substituent, any group that has been described hereinbefore as a substituent and that is substitutable may be employed. The sulfonyl group represented by Z is preferably an alkylsulfonyl group containing a total of from 2 to 12 carbon atoms, more preferably an alkylsulfonyl group containing a total of from 2 to 8 carbon atoms. Examples thereof include methanesulfonyl, ethanesulfonyl, and benzenesulfonyl.

The carbamoyl group represented by $R_5$ may have a substituent. As a group which may be the substituent, any group that has been described hereinbefore as a substituent and that is substitutable may be employed. The carbamoyl group represented by $R_5$ is preferably a carbamoyl group containing a total of from 1 to 7 carbon atoms, more preferably an unsubstituted or alkyl-substituted carbamoyl group containing a total of from 1 to 5 carbon atoms, still more preferably an unsubstituted carbamoyl group. Examples thereof include unsubstituted carbamoyl, N-methylcarbamoyl, N,N-dimethylcarbamoyl, and N-ethylcarbamoyl.

The aliphatic oxycarbonyl group represented by $R_5$ may have a substituent. As a group which may be the substituent, any group that has been described hereinbefore as a substituent and that is substitutable may be employed. The aliphatic oxycarbonyl group represented by $R_5$ is preferably an aliphatic oxycarbonyl group containing a total of from 2 to 8 carbon atoms, more preferably an alkoxycarbonyl group containing a total of from 2 to 6 carbon atoms. Examples thereof include methoxycarbonyl, ethoxycarbonyl, and carbamoylmethoxycarbonyl.

In view of the effects of the invention, G in the general formula (1) is preferably an aliphatic group or a heterocyclic group, more preferably a heterocyclic group.

In view of the effects of the invention, Y in the general formula (1) is preferably a hydrogen atom. In view of the effects of the invention, $R_1$ in the general formula (1) is preferably an aliphatic group, an aliphatic amino group, an arylamino group, a heterocyclic amino group, an amino group, or a heterocyclic group, more preferably an aliphatic group, an aliphatic amino group, an arylamino group, an amino group, or a heterocyclic group, most preferably an alkyl group, an alkylamino group, or a saturated heterocyclic group connected at a nitrogen atom.

In view of the effects of the invention, $R_2$ in the general formula (1) is preferably an aliphatic amino group, an arylamino group, an acylamino group, an amino group, or a heterocyclic group, more preferably an alkylamino group, an arylamino group, an acylamino group, an amino group, or a heterocyclic group, still more preferably an alkylamino group, an arylamino group, an acylamino group, an amino group, or a saturated heterocyclic group connected at a nitrogen atom, most preferably an alkylamino group, an arylamino group, or a saturated heterocyclic group connected at a nitrogen atom.

$R_3$ in the general formula (1) is preferably an aliphatic amino group, an arylamino group, an acylamino group, or an amino group, more preferably an alkylamino group having a hydrogen atom connected to the nitrogen atom, an arylamino group having a hydrogen atom connected to the nitrogen atom, or an amino group, still more preferably an alkylamino group having a hydrogen atom connected to the nitrogen atom, or an arylamino group having a hydrogen atom connected to the nitrogen atom, most preferably an alkylamino group having a hydrogen atom connected to the nitrogen atom (a monoalkylamino group wherein the alkyl moiety may have a substituent).

In view of the effects of the invention, $X_1$ in the general formula (1) is preferably C—Z, wherein Z is more preferably a cyano group, a carbamoyl group, or an aliphatic oxycarbonyl group, still more preferably a cyano group or an aliphatic oxycarbonyl group, most preferably a cyano group.

In view of the effects of the invention, $X_2$ in the general formula (1) is preferably a nitrogen atom or C—$R_5$ wherein $R_5$ is a hydrogen atom, a cyano group, or a carbamoyl group, more preferably a nitrogen atom or C—$R_5$ wherein $R_5$ is a hydrogen atom or a cyano group, most preferably C—$R_5$ wherein $R_5$ is a cyano group. n represents an integer of from 1 to 4, preferably 1, 2, or 3, more preferably 1 or 2.

In view of the effects of the invention, the pigment represented by the general formula (1) is preferably a pigment wherein G represents an aliphatic group or a heterocyclic group, Y represents a hydrogen atom or an aliphatic group, $R_1$ represents an aliphatic group, an aliphatic amino group, an arylamino group, an amino group, or a heterocyclic group, $R_2$ represents an aliphatic amino group, an arylamino group, an acylamino group, an amino group, or a heterocyclic group, $R_3$ represents an alkylamino group having a hydrogen atom connected to the nitrogen atom, an arylamino group having a hydrogen atom connected to the nitrogen atom, or an amino group, $X_1$ represents C—Z wherein Z is an aliphatic oxycarbonyl group, a cyano group, or a carbamoyl group, $X_2$ is a nitrogen atom or C—$R_5$ wherein $R_5$ is a hydrogen atom or a cyano group, and n is 1 or 2.

In view of the effects of the invention, the pigment represented by the general formula (1) is preferably an azo pigment represented by the following general formula (2) or the following general formula (2-1).

The azo pigments represented by the following general formula (2) or (2-1), and the tautomers, salts, and hydrates thereof will be described in detail below.

[Ka 5]

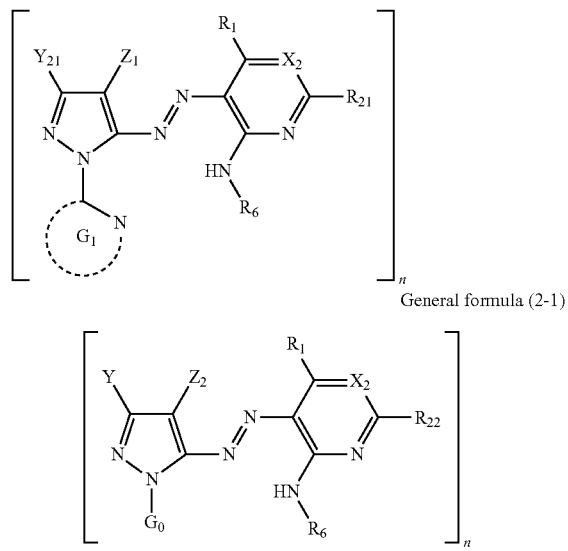

General formula (2)

General formula (2-1)

(In the general formulae (2) and (2-1), Y, $R_1$, n, and $X_2$ are the same as those defined with respect to the general formula (1). $R_6$ represents a hydrogen atom, an aliphatic group, an aryl group, or a heterocyclic group. $R_{21}$ and $R_{22}$ are the same as is defined for $R_2$ in the general formula (1). $G_1$ represents a 5- or 6-membered ring together with carbon atoms and a nitrogen atom(s), and the heterocyclic ring may be an aromatic ring or a condensed ring. $G_0$ represents an aliphatic group, $Z_1$ and $Z_2$ each represents an electron-withdrawing group having a Hammett σp value of 0.2 or more. $Y_{21}$ represents a hydrogen atom or a methyl group.

The aliphatic group represented by $R_6$ may have a substituent, and may be saturated or unsaturated. As a group which may be the substituent, any group that has been described hereinbefore as a substituent and that is substitutable may be employed. As the aliphatic group represented by $R_6$, an aliphatic group containing a total of from 1 to 8 carbon atoms is preferred, an alkyl group containing a total of from 1 to 4 carbon atoms is more preferred, and a methyl group is most preferred. Examples thereof include methyl, ethyl, propyl, isopropyl, methoxyethyl, and acetylaminoethyl.

The aryl group represented by $R_6$ may have a substituent. As a group which may be the substituent, any group that has been described hereinbefore as a substituent and that is substitutable may be employed. As the aryl group represented by $R_6$, an aryl group containing a total of from 6 to 16 carbon atoms is preferred, and an aryl group containing a total of from 6 to 8 carbon atoms is more preferred. Examples thereof include phenyl, 4-acetylaminophenyl, 3-carbamoylphenyl, 3-carbamoylaminophenyl, and 3,4-benzimidazolone.

The heterocyclic group represented by $R_6$ may have a substituent, and may be saturated or unsaturated. As a group which may be the substituent, any group that has been described hereinbefore as a substituent and that is substitutable may be employed. As the heterocyclic group represented by $R_6$, a heterocyclic group containing a total of from 2 to 16 carbon atoms is preferred, and a 5- or 6-membered heterocyclic group containing a total of from 2 to 12 carbon atoms is more preferred. Examples thereof include 2-pyridyl, 2-pyrimidyl, and 4-pyrimidyl.

The aliphatic group represented by $G_0$ is the same as the aliphatic group described for G in the general formula (1), and preferred substituents and preferred scope thereof are also the same as described there.

The 5- or 6-membered heterocyclic ring represented by $G_1$ together with carbon atoms and nitrogen atom(s) may have a substituent, may be a saturated ring or an unsaturated ring, and may be an aromatic ring or a condensed ring. The heterocyclic ring is preferably a heterocyclic group containing a total of from 2 to 12 carbon atoms and being connected at a carbon atom, more preferably an unsaturated 5- or 6-membered heterocyclic group containing a total of from 2 to 10 carbon atoms. Examples thereof include 2-thiazolyl, 2-benzothiazolyl, 2-oxazolyl, 2-benzoxazolyl, 2-pyridyl, 2-pyrazinyl, 3-pyridazinyl, 2-pyrimidinyl, 4-pyrimidinyl, 2-imidazolyl, 2-benzimidazolyl, and 2-triazinyl. These heterocyclic groups may have a tautomer structure together with the substituent.

The electron-withdrawing group represented by $Z_1$ or $Z_2$ and having a σp value of 0.2 or more is the same as that referred to for Z in the general formula (1), and preferred substituents and preferred scope are also the same as described there.

Preferred substituents and preferred scope for Y, $R_1$, $R_5$, $X_2$, and n in the general formulae (2) and (2-1) which represent the pigments are also the same as described with respect to the general formula (1).

In view of the effects of the invention, $Y_{21}$ is preferably a hydrogen atom.

In view of the effects of the invention, $R_6$ in the general formula (2) is preferably a hydrogen atom, an aliphatic group, or an aryl group, more preferably a hydrogen atom, an alkyl group, or an aryl group, still more preferably an alkyl group or an aryl group, particularly preferably an alkyl group, most preferably a methyl group.

In view of the effects of the invention, $R_6$ in the general formula (2-1) is preferably a hydrogen atom, an aliphatic group, or an aryl group, more preferably a hydrogen atom, an alkyl group, or an aryl group, still more preferably a hydrogen atom or an alkyl group, particularly preferably an alkyl group, most preferably a methyl group.

The 5- or 6-membered heterocyclic ring represented by $G_1$ in the general formula (2) together with carbon atoms and a nitrogen atom(s) is preferably any one of the following (G-1) to (G-13), more preferably any one of the following (G-1) to (G-6), still more preferably the following (G-1), (G-4), or (G-6). * shows the connected portion with the N atom of the pyrazole ring. $Y_1$ to $Y_{11}$ each represents a hydrogen atom or a substituent. $G_{11}$ in (G-13) represents non-metallic atoms capable of forming a 5- or 6-membered heterocyclic ring. The heterocyclic ring represented by $G_{11}$ may be unsubstituted or may have a substituent, and may be a monocyclic ring or a condensed ring. Formulae (G-1) to (G-13) may have a tautomer structure together with the substituent.

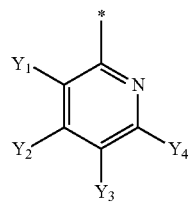
(G-1)

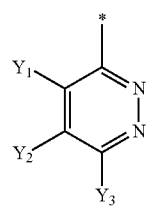
(G-2)

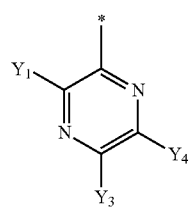
(G-3)

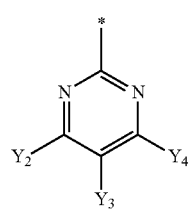
(G-4)

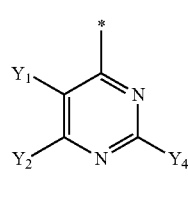
(G-5)

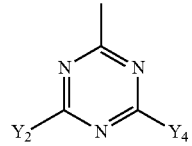
(G-6)

-continued

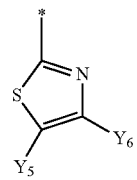
(G-7)

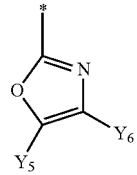
(G-8)

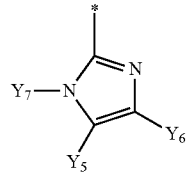
(G-9)

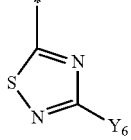
(G-10)

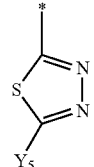
(G-11)

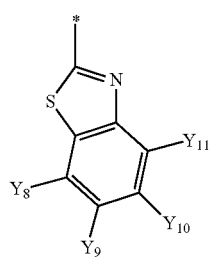
(G-12)

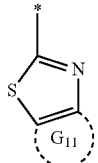
(G-13)

In view of the effects of the invention, particularly in view of dispersibility and dispersion stability, the pigments of the invention has a "number of total carbon atoms/number of azo groups" ratio of preferably 40 or less, more preferably 30 or less. In view of the effects of the invention, particularly in view of dispersibility and dispersion stability, the pigments of the invention have a "molecular weight/number of azo groups" ratio of preferably 600 or less. In view of the effects of the invention, particularly in view of dispersibility and dispersion stability, the pigments of the invention preferably do not have an ionic substituent such as a sulfo group or a carboxyl group.

Pigments represented by the general formula (2) wherein $R_{21}$ represents an arylamine and $X_2$ represents C—$R_5$ show a hue of from red to violet and are excellent in light fastness, thus being preferred.

Also, pigments represented by the general formula (2-1) wherein $R_1$, $R_3$, and $R_{22}$ each represents an amino group, an alkylamino group, or an acylamino group, $G_0$ represents an alkyl group, and $Z_2$ represents an aliphatic oxycarbonyl group show a hue of from yellow to red and are excellent in light fastness, thus being preferred.

In view of the effects of the invention, the pigment represented by the general formula (2) is preferably a pigment wherein $R_1$ represents an alkyl group, an alkylamino group, an arylamino group, an amino group, or a saturated heterocyclic group connected at the nitrogen atom, $R_{21}$ represents an alkylamino group, an arylamino group, an amino group, or a saturated heterocyclic group connected at the nitrogen atom, $Z_1$ represents an aliphatic oxycarbonyl group, a cyano group, or a carbamoyl group, $X_2$ represents a nitrogen atom or C—$R_5$ (wherein $R_5$ represents a hydrogen atom or a cyano group), $R_6$ represents an alkyl group or an aryl group, $G_1$ represents, together with carbon atoms and a nitrogen atom(s), a 5- or 6-membered heterocyclic ring of any one of (G-1) to (G-13), $Y_{21}$ represents a hydrogen atom or a methyl group, and n represents 1 or 2.

In view of the effects of the invention, the pigment represented by the general formula (2) is more preferably a pigment wherein $R_1$ represents an alkyl group, $R_{21}$ represents an alkylamino group, an arylamino group, or a saturated heterocyclic group connected at the nitrogen atom, $Z_1$ represents an aliphatic oxycarbonyl group or a cyano group, $X_2$ represents C—$R_5$ (wherein $R_5$ represents a hydrogen atom or a cyano group), $R_6$ represents an alkyl group or an aryl group, $G_1$ represents, together with carbon atoms and a nitrogen atom(s), a 5- or 6-membered heterocyclic ring of any one of (G-1) to (G-6), $Y_{21}$ represents a hydrogen atom or a methyl group, and n represents 1 or 2.

In view of the effects of the invention, the pigment represented by the general formula (2) is still more preferably a pigment wherein $R_1$ represents an alkyl group, $R_{21}$ represents an alkylamino group, an arylamino group, or a saturated heterocyclic group connected at the nitrogen atom, $Z_1$ represents an aliphatic oxycarbonyl group or a cyano group, $X_2$ represents C—$R_5$ (wherein $R_5$ represents a hydrogen atom or a cyano group), $R_6$ represents an alkyl group or an aryl group, $G_1$ represents, together with carbon atoms and a nitrogen atom(s), a 5- or 6-membered heterocyclic ring of (G-1), (G-4), or (G-6), $Y_{21}$ represents a hydrogen atom or a methyl group, and n represents 1 or 2.

In view of the effects of the invention, the pigment represented by the general formula (2) is yet more preferably a pigment wherein $R_1$ represents an alkyl group, $R_{21}$ represents an alkylamino group, an arylamino group, or a saturated heterocyclic group connected at the nitrogen atom, $Z_1$ represents an aliphatic oxycarbonyl group or a cyano group, $X_2$ represents C—$R_5$ (wherein $R_5$ represents a hydrogen atom or a cyano group), $R_6$ represents an alkyl group, $G_1$ represents, together with carbon atoms and a nitrogen atom(s), a 5- or 6-membered heterocyclic ring of (G-1), (G-4), or (G-6), $Y_{21}$ represents a hydrogen atom, and n represents 1.

In view of the effects of the invention, the pigment represented by the general formula (2) is most preferably a pigment wherein $R_1$ represents an alkyl group, $R_{21}$ represents an arylamino group, $Z_1$ represents an aliphatic oxycarbonyl group or a cyano group, $X_2$ represents C—$R_5$ (wherein $R_5$ represents a cyano group), $R_6$ represents an alkyl group, $G_1$ represents, together with carbon atoms and a nitrogen atom(s), a 5- or 6-membered heterocyclic ring of (G-4), $Y_{21}$ represents a hydrogen atom, and n represents 1.

In view of the effects of the invention, the pigment represented by the general formula (2-1) is preferably a pigment wherein Y represents a hydrogen atom, $R_1$ represents an alkylamino group, an arylamino group, an amino group, or a saturated heterocyclic group connected at the nitrogen atom, $R_{22}$ represents an alkylamino group, an arylamino group, an amino group, or a saturated heterocyclic group connected at the nitrogen atom, $Z_2$ represents an aliphatic oxycarbonyl group or a carbamoyl group which may be substituted, $X_2$ represents a nitrogen atom or C—$R_5$ (wherein $R_5$ represents a hydrogen atom or a cyano group), $R_6$ represents an alkyl group or an aryl group, and n represents 1 or 2.

In view of the effects of the invention, the pigment represented by the general formula (2-1) is more preferably a pigment wherein Y represents a hydrogen atom, $R_1$ represents an alkylamino group, an arylamino group, or an amino group, $R_{22}$ represents an alkylamino group, an arylamino group, an amino group, or an acylamino group, $Z_2$ represents an aliphatic oxycarbonyl group or a carbamoyl group which may be substituted, $X_2$ represents a nitrogen atom, $R_6$ represents an alkyl group or an aryl group, and n represents 1 or 2.

In view of the effects of the invention, the pigment represented by the general formula (2-1) is still more preferably a pigment wherein Y represents a hydrogen atom, $R_1$ represents an alkylamino group or an amino group, $R_{22}$ represents an alkylamino group, an amino group, or an acylamino group, $Z_2$ represents an aliphatic oxycarbonyl group or a carbamoyl group which may be substituted, $X_2$ represents a nitrogen atom, $R_6$ represents an alkyl group, and n represents 1 or 2.

In view of the effects of the invention, the pigment represented by the general formula (2-1) is most preferably a pigment wherein Y represents a hydrogen atom, $R_1$ represents an alkylamino group or an amino group, $R_{22}$ represents an alkylamino group, an amino group, or an acylamino group, $Z_2$ represents an aliphatic oxycarbonyl group, $X_2$ represents a nitrogen atom, $R_6$ represents an alkyl group, and n represents 1 or 2.

In view of the effects of the invention, the pigments represented by the general formulae (1) and (2) is preferably azo pigments represented by the following general formula (3).

The azo pigments represented by the following general formula (3), and the tautomers, salts, and hydrates thereof will be described in detail below.

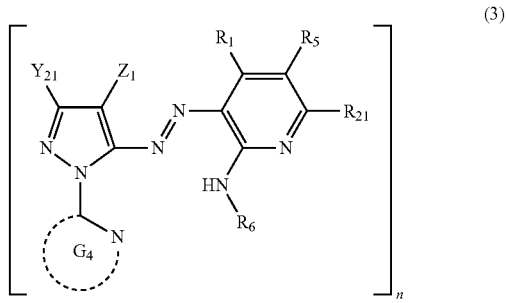

(In the general formula (3), $R_1$, $R_{21}$, $Z_1$, $R_5$, $R_6$, $Y_{21}$, and n are the same as those defined with respect to the general formulae (1) and (2). $G_4$ represents one of (G-1) to (G-6) in the general formula (2).

Preferred substituents and preferred scopes of $R_1$, $R_2$, $Z_1$, $R_5$, $R_6$, $Y_{21}$, and n in the general formula (3) which represents the pigments are the same as those with the general formula (2). A preferred scope of $G_4$ is the same as that of $G_1$ in the general formula (2).

In view of the effects of the invention, the pigment represented by the general formula (3) is preferably a pigment wherein $R_1$ represents an alkyl group, $R_{21}$ represents an alkylamino group, an arylamino group, or a saturated heterocyclic group connected at the nitrogen atom, $Z_1$ represents an aliphatic oxycarbonyl group or a cyano group, $R_5$ represents a hydrogen atom or a cyano group, $R_6$ represents an alkyl group or an aryl group, $G_4$ represents, together with carbon atoms and a nitrogen atom(s), a 5- or 6-membered heterocyclic ring of (G-1), (G-4), or (G-6), $Y_{21}$ represents a hydrogen atom or a methyl group, and n represents 1 or 2, more preferably a pigment wherein $R_1$ represents an alkyl group, $R_{21}$ represents an alkylamino group, an arylamino group, or a saturated heterocyclic group connected at the nitrogen atom, $Z_1$ represents an aliphatic oxycarbonyl group or a cyano group, $R_5$ represents a hydrogen atom or a cyano group, $R_6$ represents an alkyl group, $G_4$ represents, together with carbon atoms and a nitrogen atom(s), a 5- or 6-membered heterocyclic ring of (G-1), (G-4), or (G-6), $Y_{21}$ represents a hydrogen atom, and n represents 1 or 2, still more preferably a pigment wherein $R_1$ represents an alkyl group, $R_{21}$ represents an alkylamino group, an arylamino group, or a saturated heterocyclic group connected at the nitrogen atom, $Z_1$ represents an aliphatic oxycarbonyl group or a cyano group, $R_5$ represents a hydrogen atom or a cyano group, $R_6$ represents an alkyl group, $G_4$ represents, together with carbon atoms and a nitrogen atom(s), a 5- or 6-membered heterocyclic ring of (G-1), (G-4), or (G-6), $Y_{21}$ represents a hydrogen atom, and n represents 1, most preferably a pigment wherein $R_1$ represents an alkyl group, $R_{21}$ represents an arylamino group, $Z_1$ represents an aliphatic oxycarbonyl group or a cyano group, $R_5$ represents a cyano group, $R_6$ represents a methyl group, $G_4$ represents, together with carbon atoms and a nitrogen atom(s), a 5- or 6-membered heterocyclic ring of (G-4), $Y_{21}$ represents a hydrogen atom, and n represents 1.

In view of the effects of the invention, the azo pigments represented by the general formulae (1) and (2-1) are preferably azo pigments represented by the following general formula (4).

The azo pigments represented by the following general formula (4), and the tautomers, salts, and hydrates thereof will be described in detail below.

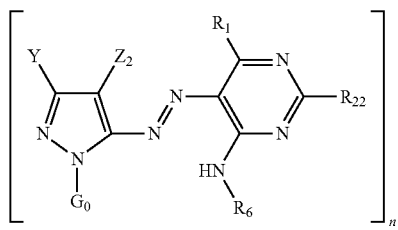

(4)

(In the general formula (4), Y, $R_1$, $R_{22}$, $Z_2$, $R_6$, $G_0$, and n are the same as those defined with respect to the general formulae (1) and (2-1).)

Preferred substituents and preferred scopes of Y, $R_1$, $R_{22}$, $Z_2$, $R_6$, $G_0$, and n in the general formula (4) which represents the pigments are the same as those with the general formula (2-1).

In view of the effects of the invention, the pigment represented by the general formula (4) is preferably a pigment wherein Y represents a hydrogen atom, $R_1$ represents an alkylamino group, an arylamino group, an amino group, or a saturated heterocyclic group connected at the nitrogen atom, $R_{22}$ represents an alkylamino group, an arylamino group, an amino group, or a saturated heterocyclic group connected at the nitrogen atom, $Z_2$ represents an aliphatic oxycarbonyl group or a carbamoyl group which may be substituted, $R_6$ represents an alkyl group or an aryl group, and n represents 1 or 2, more preferably a pigment wherein Y represents a hydrogen atom, $R_1$ represents an alkylamino group, an arylamino group, or an amino group, $R_{22}$ represents an alkylamino group, an arylamino group, an amino group, or an acylamino group, $Z_2$ represents an aliphatic oxycarbonyl group or a carbamoyl group which may be substituted, $R_6$ represents an alkyl group or an aryl group, and n represents 1 or 2, still more preferably a pigment wherein Y represents a hydrogen atom, $R_1$ represents an alkylamino group or an amino group, $R_{22}$ represents an alkylamino group, an amino group, or an acylamino group, $Z_2$ represents an aliphatic oxycarbonyl group or a carbamoyl group which may be substituted, $R_6$ represents an alkyl group, and n represents 1 or 2, most preferably a pigment wherein Y represents a hydrogen atom, $R_1$ represents an alkylamino group or an amino group, $R_{22}$ represents an alkylamino group, an amino group, or an acylamino group, $Z_2$ represents an aliphatic oxycarbonyl group, $R_6$ represents an alkyl group, and n represents 1 or 2.

The invention includes in its scope tautomers of the azo pigments represented by the general formulae (1) to (4) and (2-1). Although the general formulae (1) to (4) and (2-1) is shown in the form of limiting structure among several tautomer forms which are possible in view of chemical structure, the azo pigments may be tautomers of other structure than the shown ones, and may be used as a mixture containing plural tautomers.

For example, with the pigment represented by the general formula (1), azo-hydrazone tautomers represented by the following general formula (1') can be considered.

The invention also includes in its scope tautomers of the azo pigments represented by the following general formula (1') which is a tautomer of the azo pigment represented by the general formula (1).

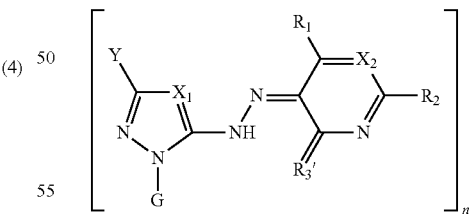

General formula (1')

(In the general formula (1'), G, Y, $R_1$, $R_2$, $X_1$, $X_2$, and n are the same as those defined with respect to the general formula (1). In the general formula (1'), $R_3'$ is a group corresponding to $R_3$ defined with respect to the general formula (1).)

The pigment represented by the above general formula (1) is preferably a azo pigment represented by the following general formula (5-1), (5-2), or (5-3).

The azo pigments represented by the following general formulae (5-1), (5-2), or (5-3), and the tautomers, salts, and hydrates thereof will be described in detail below.

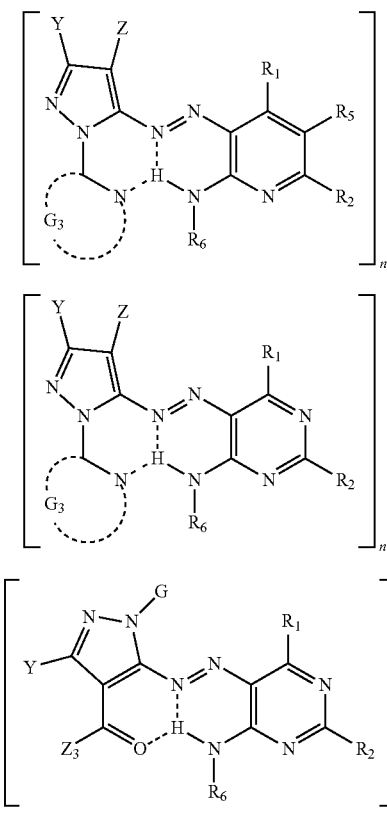

(5-1)

(5-2)

(5-3)

(In the general formulae (5-1), (5-2), and (5-3), G, Y, Z, $R_1$, $R_2$, $R_5$, $R_6$, and n are the same as those defined with respect to the general formulae (1) and (2). $G_3$ represents non-metallic atoms necessary for forming a 6-membered ring together with carbon atoms and a nitrogen atom(s), and the heterocyclic ring may be an aromatic ring or a condensed ring. $Z_3$ represents a group formed by removing carbonyl from a corresponding group of Z in the general formula (1).)

With the azo pigments represented by the foregoing general formulae (1) to (4) and (2-1), many tautomers may be considered.

Also, in the invention, the azo pigment represented by the general formula (1) preferably has a substituent capable of forming an intramolecular hydrogen bond or intramolecular crosslinking hydrogen bond. As the substituent, a substituent capable of forming at least one or more intramolecular hydrogen bonds is more preferred, and a substituent capable of forming at least one or more intramolecular crosslinking hydrogen bonds is particularly preferred.

Of the azo pigments represented by the general formulae (1) to (4) and (2-1), particularly preferred azo pigments are exemplified by those azo pigments which are represented by the foregoing general formula (5-1), (5-2), or (5-3) as has been described hereinbefore.

The reason why this structure is preferred is that, as is shown by the general formula (5-1), (5-2) or (5-3), nitrogen atoms, hydrogen atoms, and hetero atoms (oxygen atom of the carbonyl group or nitrogen atom of the amino group) constituting the heterocyclic rings contained in the azo pigment structure are intend to form at least one or more intramolecular crosslinking hydrogen bonds (intramolecular hydrogen bonds). As a result, flatness of the molecule is enhanced, the intramolecular and intermolecular interaction is improved, crystallinity of the azo pigment represented by the general formula (5-1), (5-2), or (5-3) is enhanced (higher structure of the pigment becoming liable to be formed), and hence performances required as pigments, i.e., light fastness, heat stability, moist heat stability, water resistance, gas resistance, and/or solvent resistance, can markedly be improved, thus such pigments being most preferred.

<Azo Compounds>

The invention also relates to azo compounds represented by the foregoing general formulae (2) and (2-1), and the tautomers, salts, and hydrates thereof.

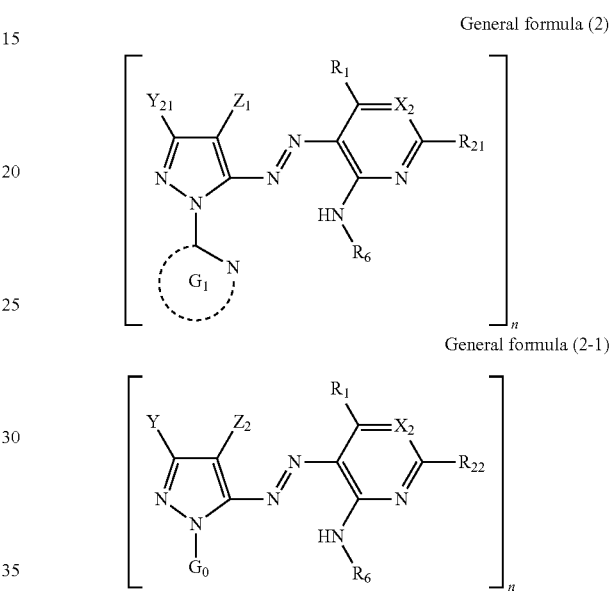

General formula (2)

General formula (2-1)

(In the general formulae (2) and (2-1), Y represents a hydrogen atom or an aliphatic group. $R_1$ represents an aliphatic group, an aliphatic amino group, an arylamino group, a heterocyclic amino group, an acylamino group, a sulfonamido group, an amino group, or a heterocyclic group, $R_{21}$ and $R_{22}$ each independently represents an aliphatic amino group, an arylamino group, a heterocyclic amino group, an acylamino group, a sulfonamido group, an amino group, or a heterocyclic group. Each $Z_1$ and $Z_2$ represents an electron-withdrawing group having a Hammett σp value of 0.2 or more. $X_2$ represents a nitrogen atom or C—$R_5$ (wherein $R_5$ represents a hydrogen atom, a cyano group, a carbamoyl group, an aliphatic oxycarbonyl group, or a carboxyl group). $R_6$ represents a hydrogen atom, an aliphatic group, an aryl group, or a heterocyclic group. $G_0$ represents an aliphatic group, and $G_1$ represents a 5- or 6-membered ring together with carbon atoms and nitrogen atom(s). The heterocyclic ring may be an aromatic ring or a condensed ring. $Y_{21}$ represents a hydrogen atom or a methyl group. n represents an integer of from 1 to 4. When n=2, the general formula (2) or (2-1) represents a dimer formed through $R_1$, $R_{21}$, $R_{22}$, $R_6$, Y, $Y_{21}$, $Z_1$, $Z_2$, $G_O$, or $G_1$. When n=3, the general formula (2) or (2-1) represents a trimer formed through $R_1$, $R_{21}$, $R_{22}$, $R_6$, Y, $Y_{21}$, $Z_1$, $Z_2$, $G_O$, or $G_1$. When n=4, the general formula (2) or (2-1) represents a tetramer formed through $R_1$, $R_{21}$, $R_{22}$, $R_6$, Y, $Y_{21}$, $Z_1$, $Z_2$, $G_O$, or $G_1$.)

In view of the effects of the invention, the compounds represented by the general formula (2) are preferably compounds represented by the following general formula (3):

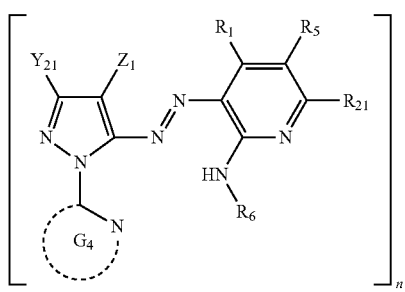

(3)

(In the general formula (3), $R_1$, $R_{21}$, $Z_1$, $R_6$, $R_5$, $Y_{21}$, and n are the same as those defined with respect to the general formulae (1) and (2). $G_4$ represents any one of following (G-1) to (G-6).

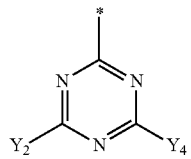

(G-1) ... (G-5)

(G-6)

* in the general formulae (G-1) to (G-6) shows the connected portion to the N atom of the pyrazole ring. $Y_1$ to $Y_4$ each represents a hydrogen atom or a substituent. The heterocyclic ring may be a monocyclic ring or a condensed ring. The groups represented by the formulae (G-1) to (G-6) may have a tautomer structure together with the substituent.

In view of the effects of the invention, the compounds represented by the general formula (2-1) are preferably compounds represented by the following general formula (4):

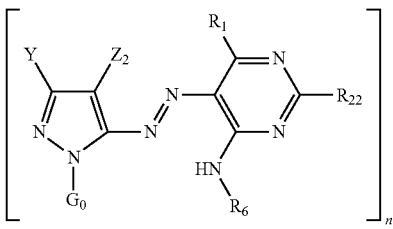

(4)

(In the general formula (4), Y, $R_1$, $R_{22}$, $Z_2$, $R_6$, $G_0$, and n are the same as those defined with respect to the general formulae (1) and (2-1).

As the salts, hydrates, and tautomers of the azo compounds of the invention represented by the general formulae (2), (3), and (4), there can be illustrated the same ones as the salts, hydrates, and tautomers of the azo pigments of the invention.

The novel azo compounds of the invention are useful as azo pigments.

Specific examples of the azo pigments and azo compounds represented by the foregoing general formulae (1) to (4) and (2-1) will be shown below. However, the azo pigments to be used in the invention and the azo compounds of the invention are not limited only to the following examples. Also, although the structures of the following specific examples are shown in the form of limiting structure among several tautomer forms which are possible in view of chemical structure, it is needless to say that they may be other tautomer structures than the shown one.

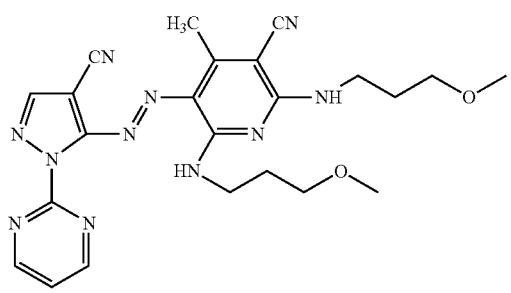

D-1

Molecular Weight: 489.53

-continued
D-2
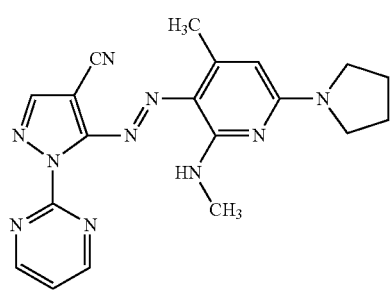
D-3
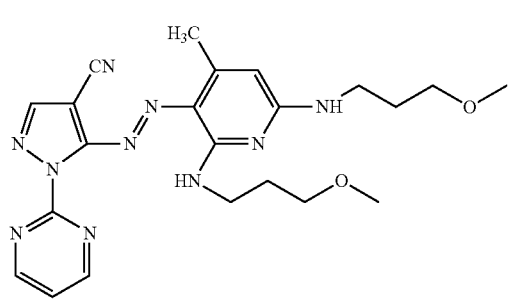
D-4
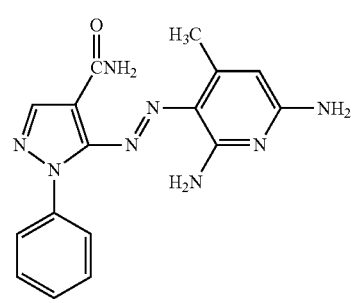
D-5
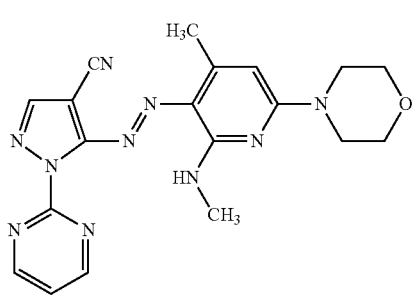
D-6
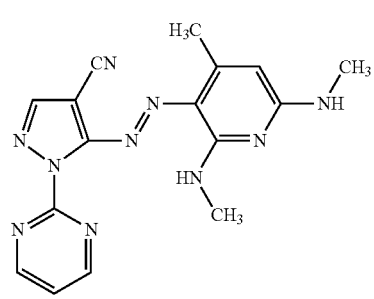
D-7
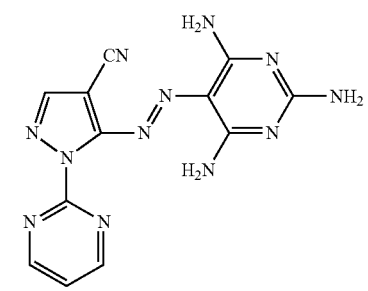
D-8
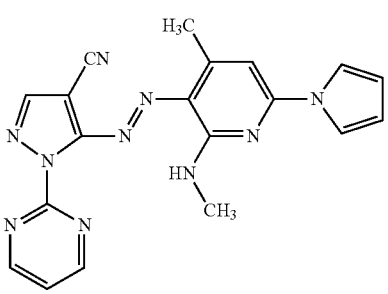
D-9
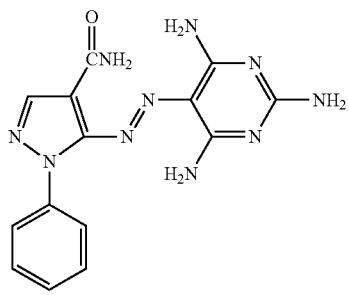
D-10
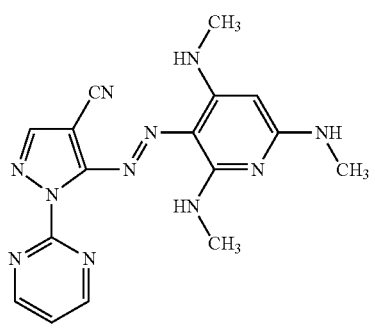
D-11
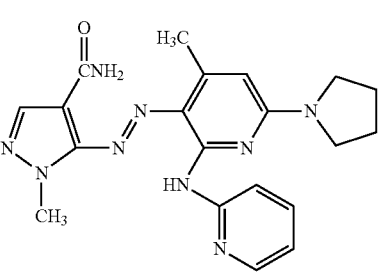

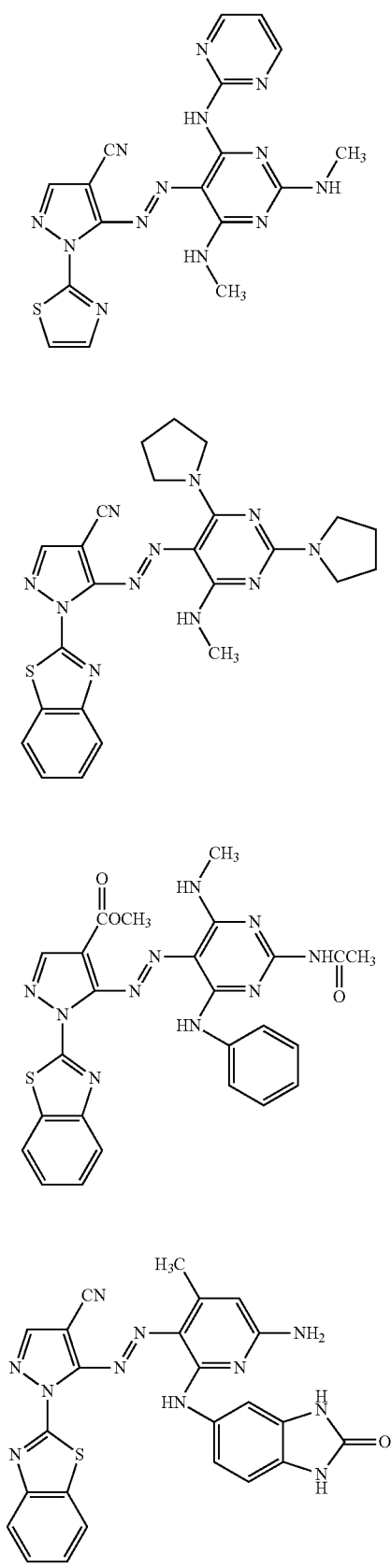
D-12
D-13
D-14
D-15
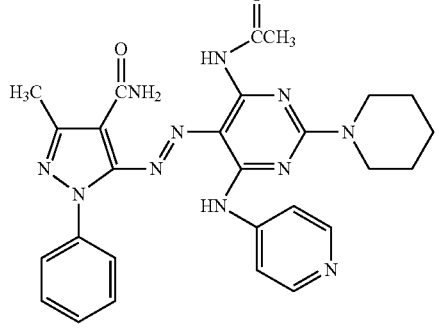
D-16
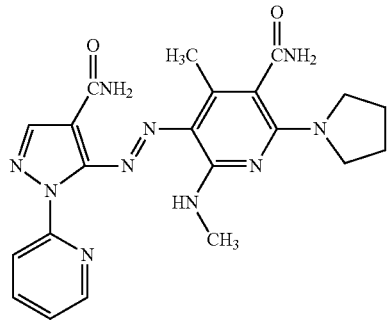
D-17
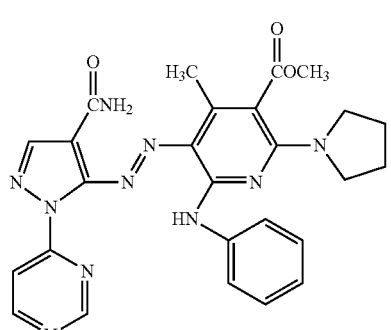
D-18
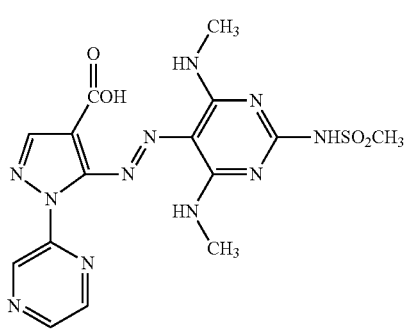
D-19
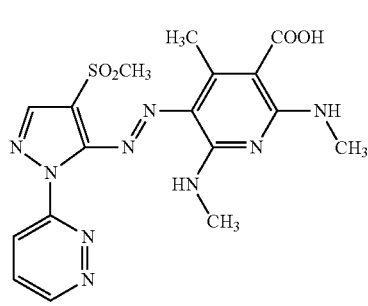
D-20

D-21 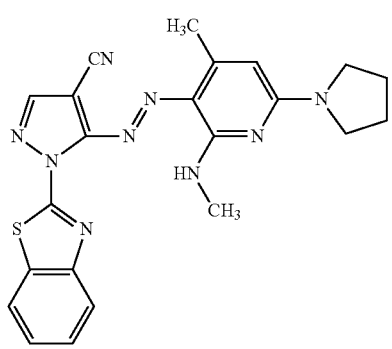
D-25 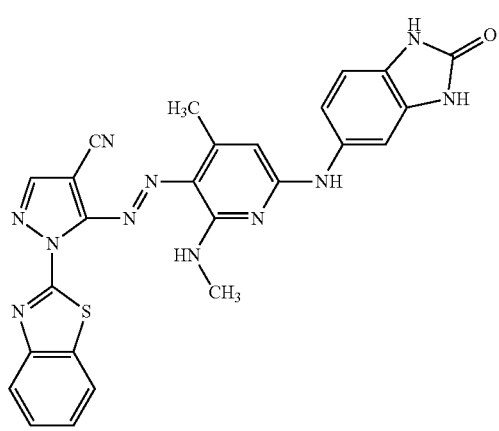
D-22 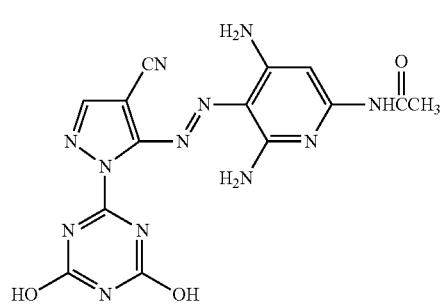
D-26 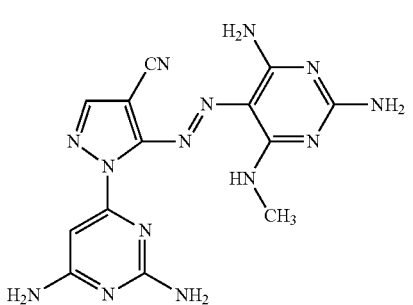
D-23 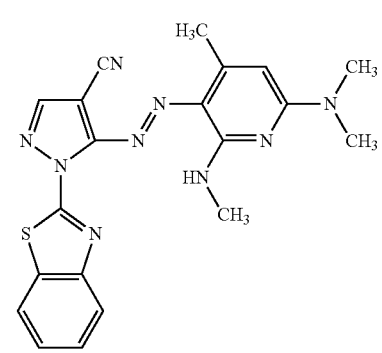
D-27 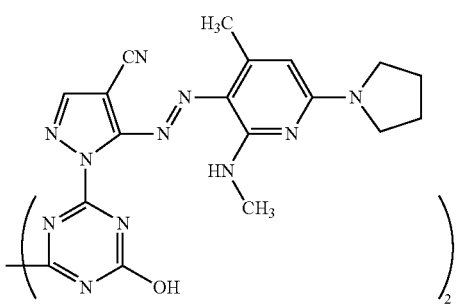
D-24 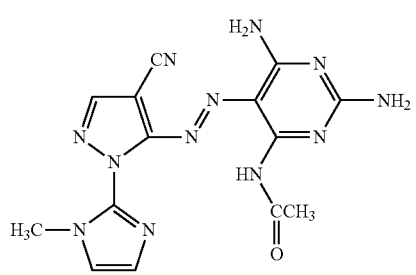
D-28 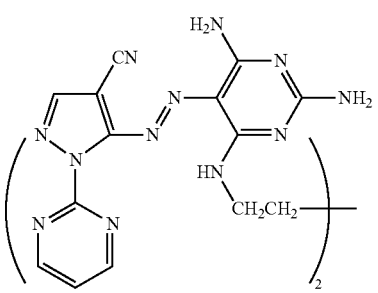

D-29
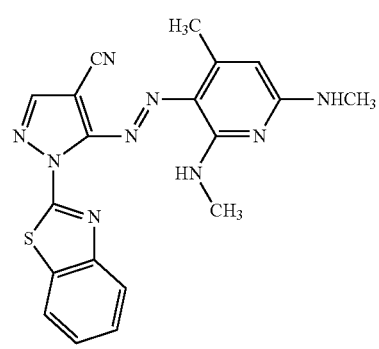
D-30
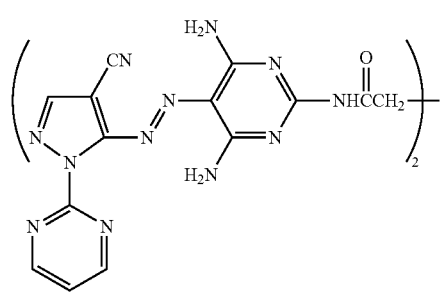
D-31
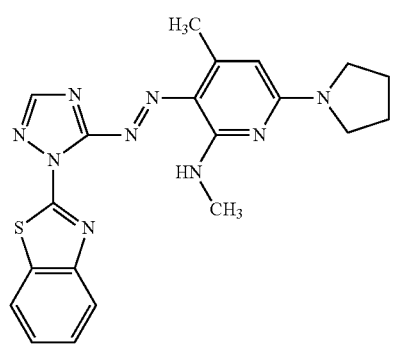
D-32
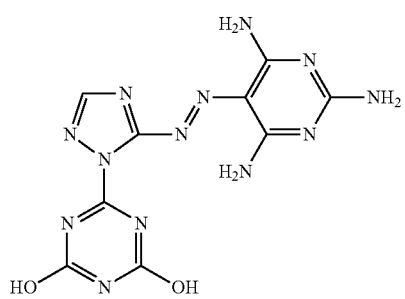
D-33
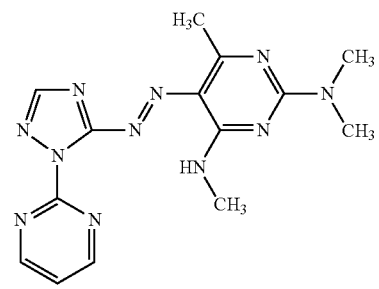
D-34
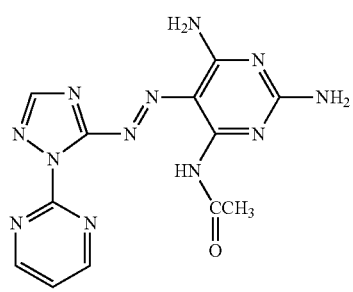
D-35
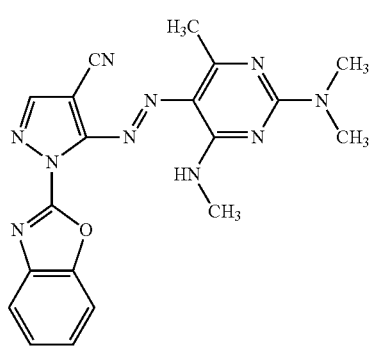
D-36
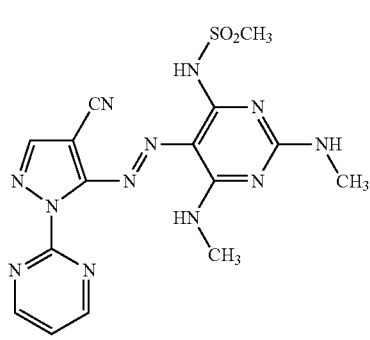
D-37
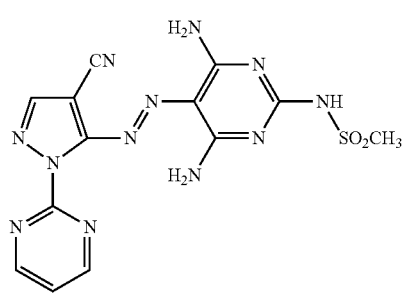
D-38

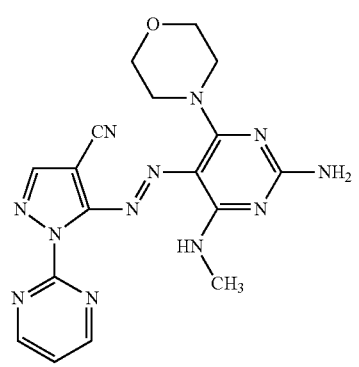
D-39
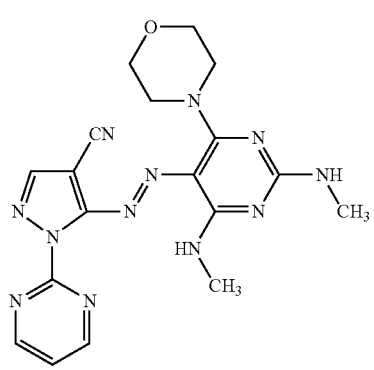
D-40
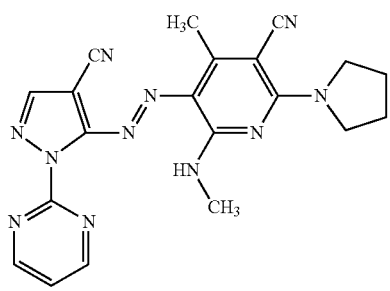
D-41
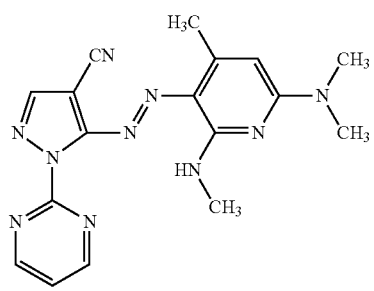
D-42
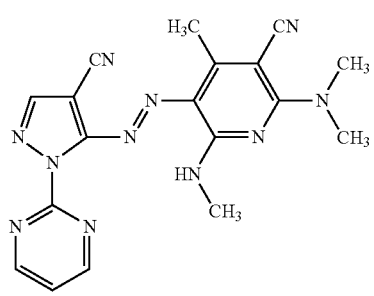
D-43
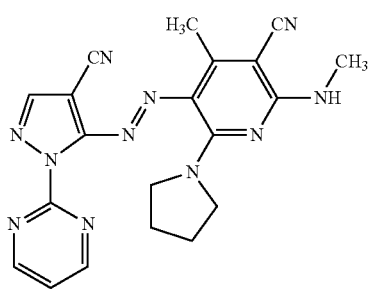
D-44
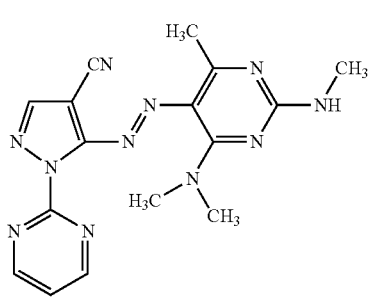
D-45
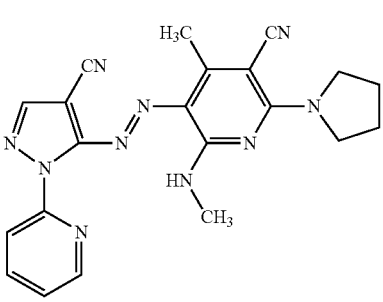
D-46
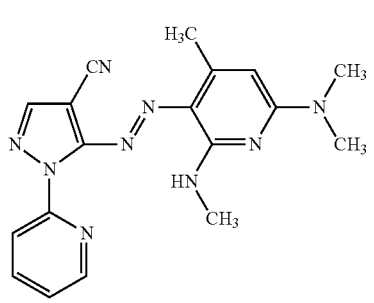
D-47
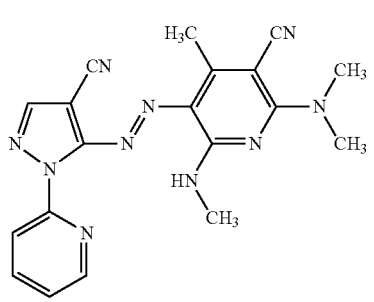
D-48

-continued
D-49
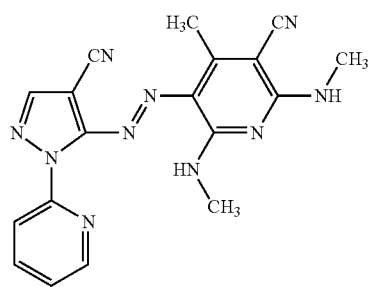
D-50
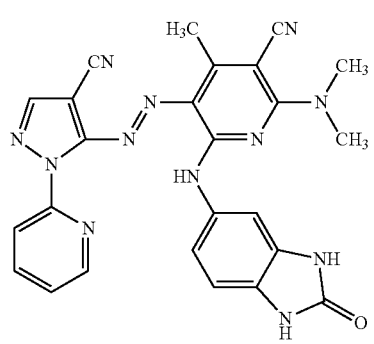
D-51
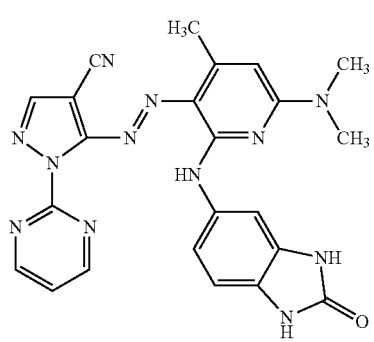
D-52
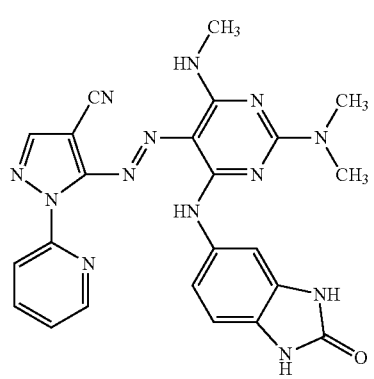
D-53
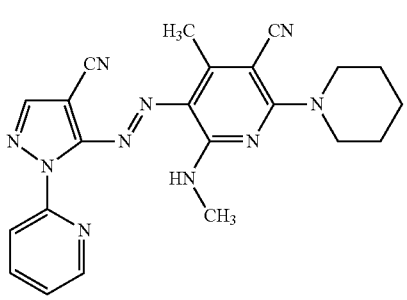
-continued
D-54
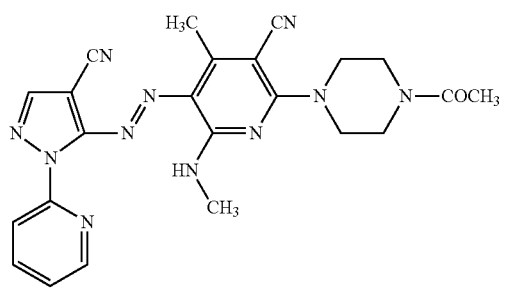
D-55
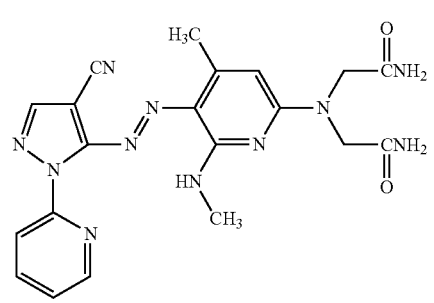
D-56
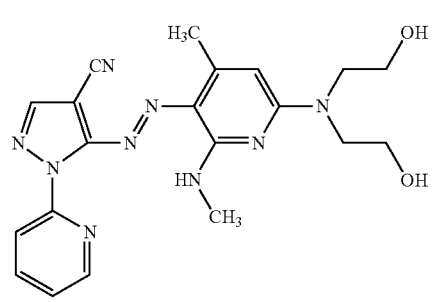
D-57
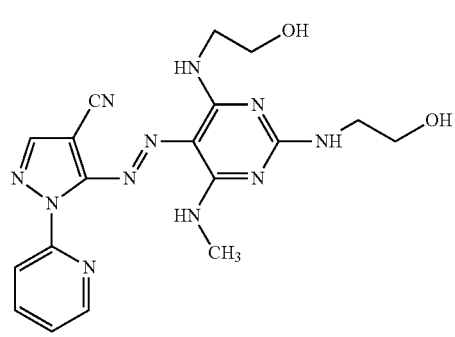
D-58
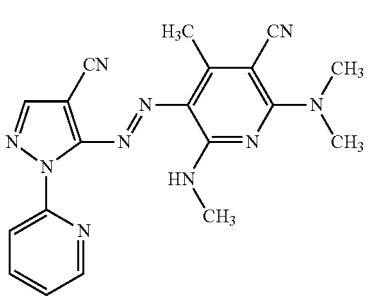

-continued
D-59
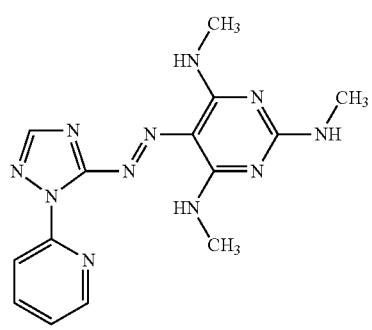
D-60
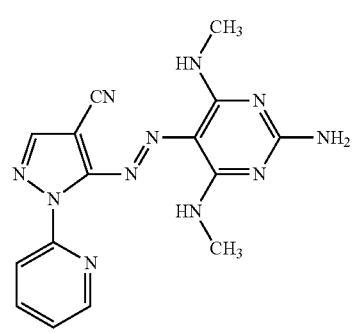
D-61
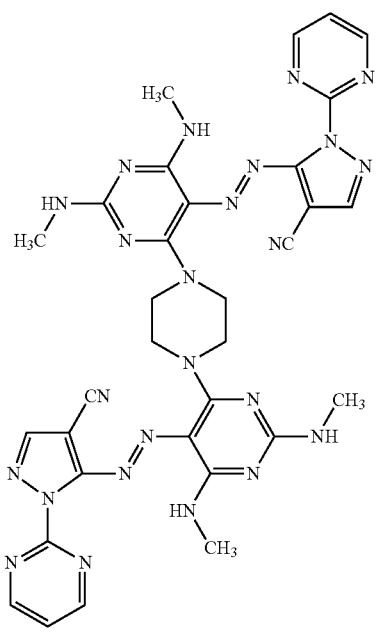
-continued
D-62
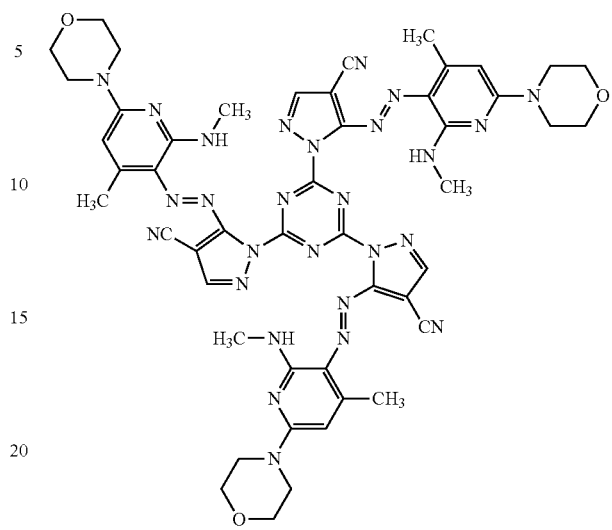
D-63
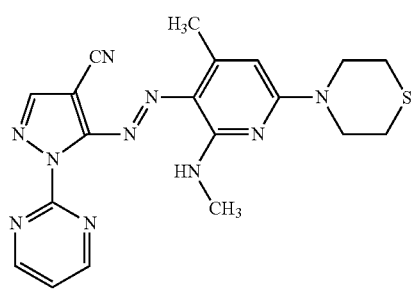
D-64
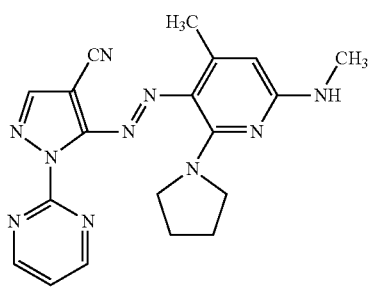
D-65
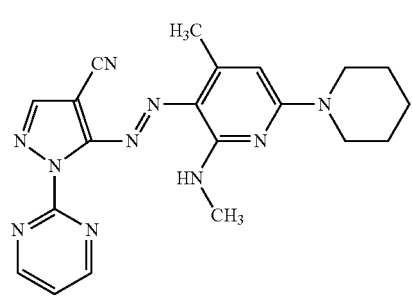

D-66
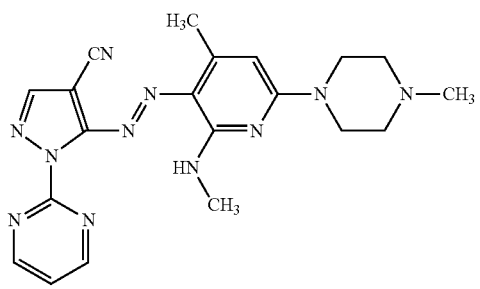
D-67
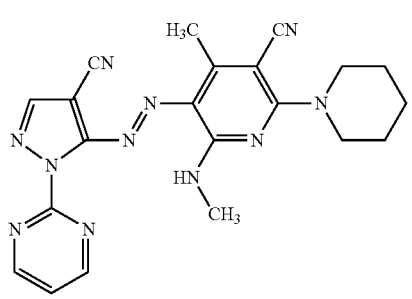
D-68
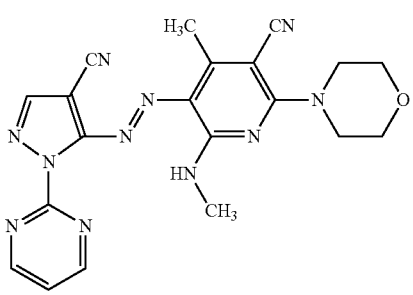
D-69
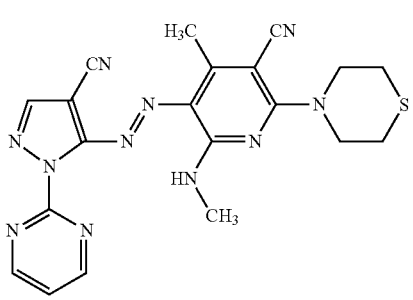
D-70
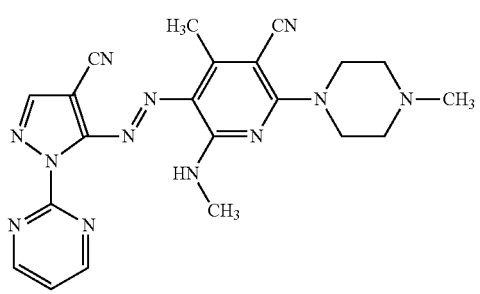
D-71
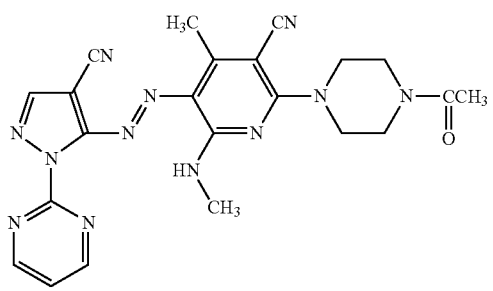
D-72
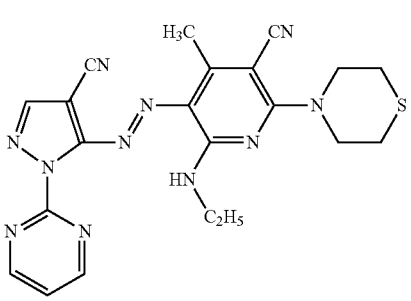
D-73
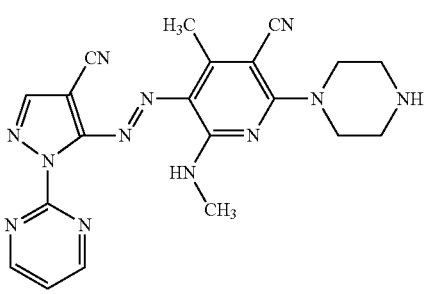
D-74
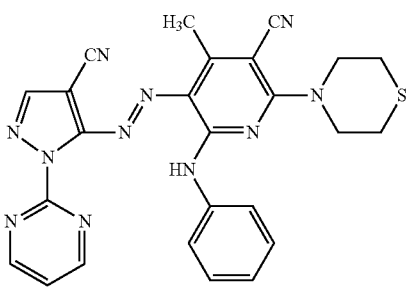
D-75
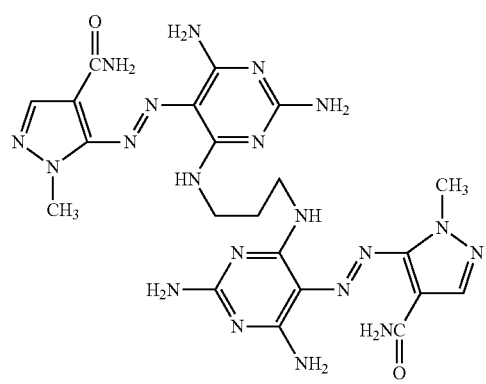

D-76
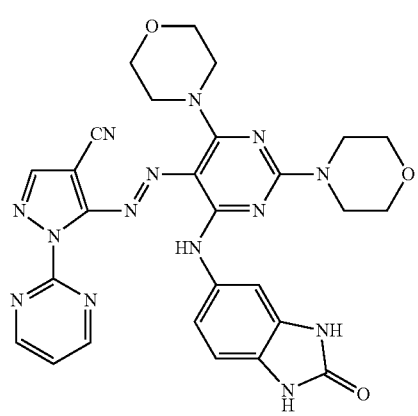
D-77
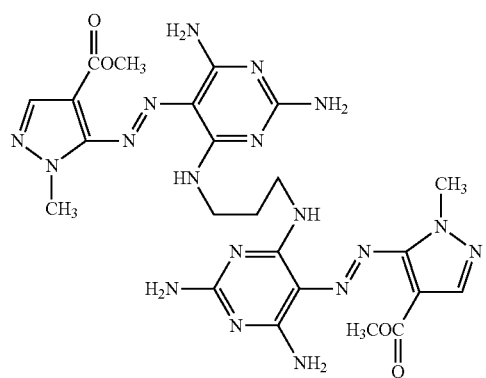
D-78
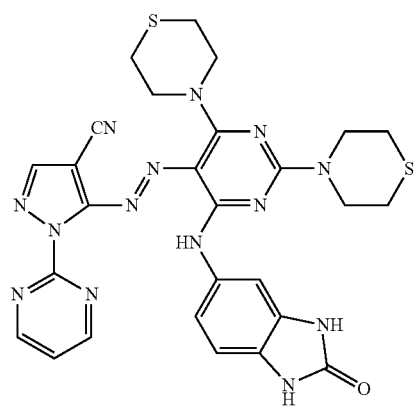
D-79
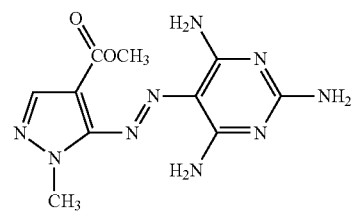
D-80
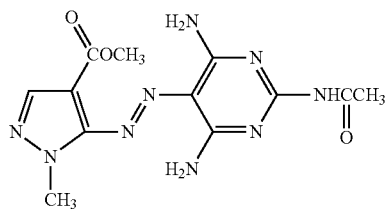
D-81
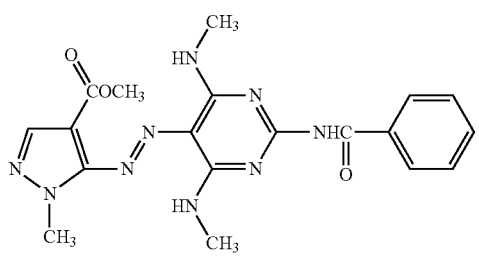
D-82
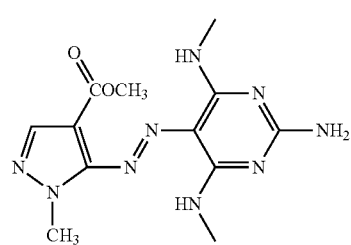
D-83
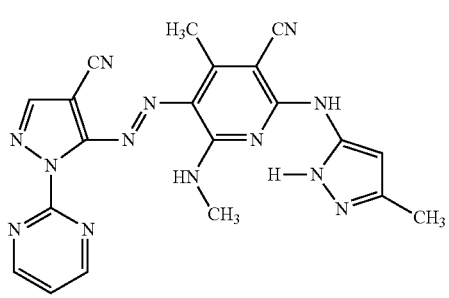
D-84
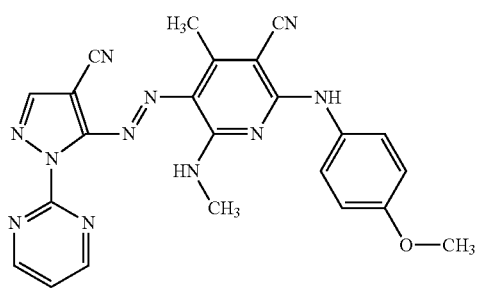
D-85
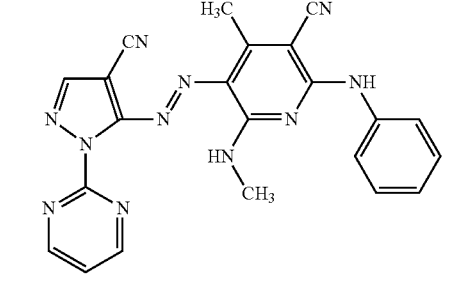

-continued
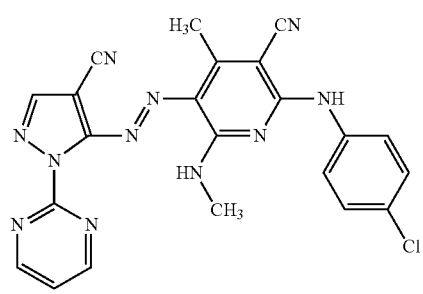
D-86
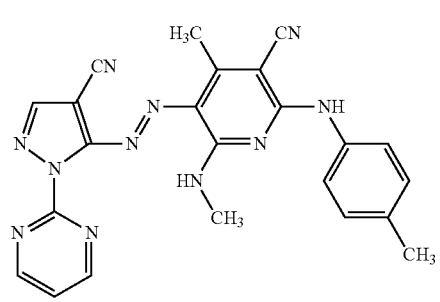
D-87
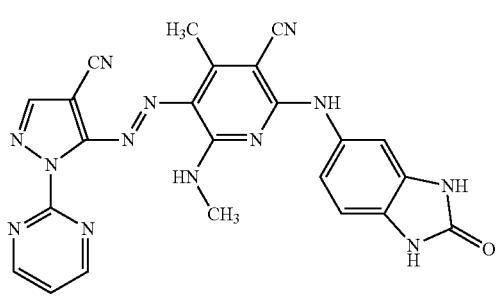
D-88
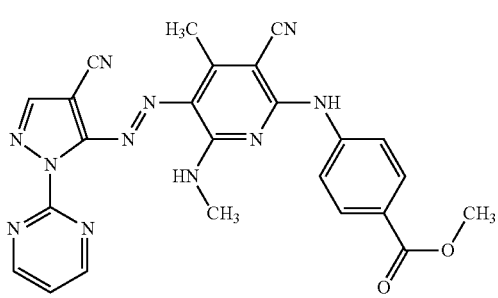
D-89
-continued
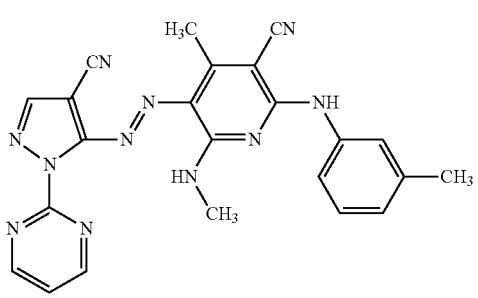
D-90
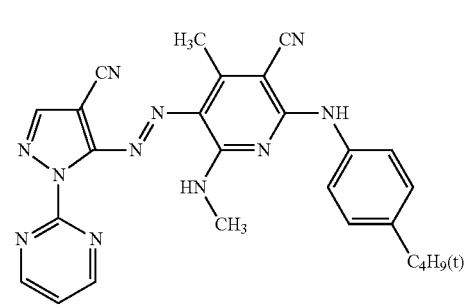
D-91
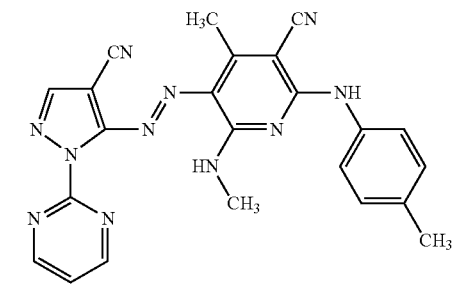
D-92
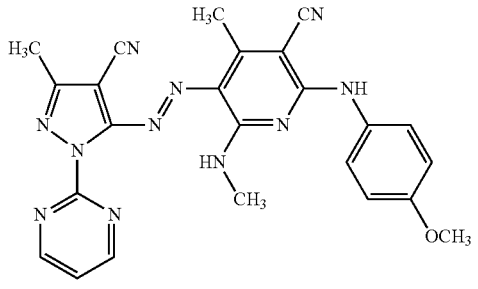
D-93
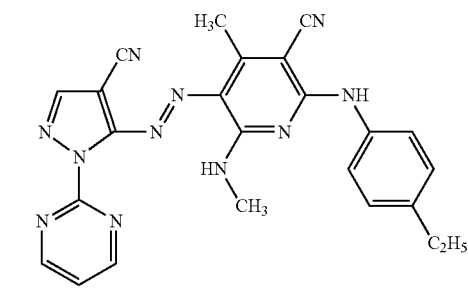
D-89
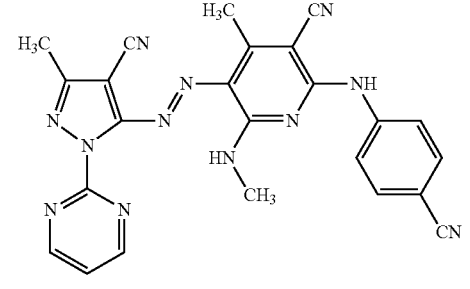
D-94

D-95
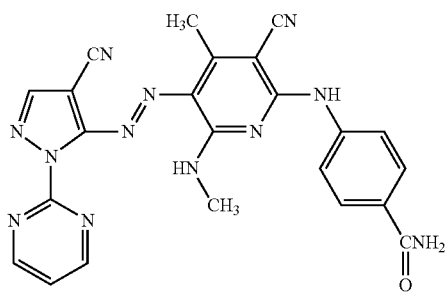
D-96
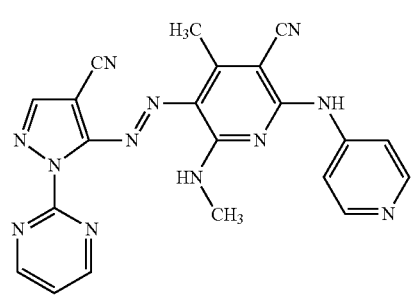
D-97
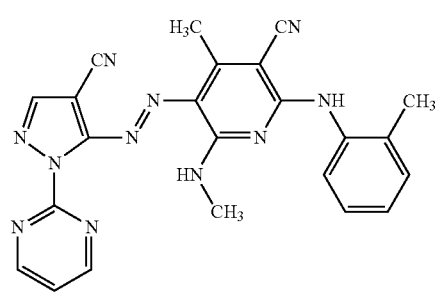
D-98
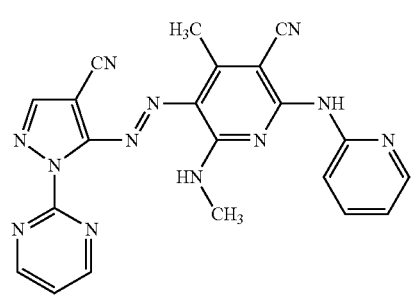
D-99
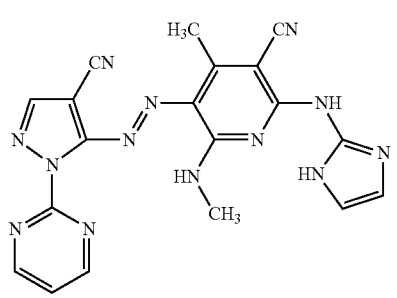
D-100
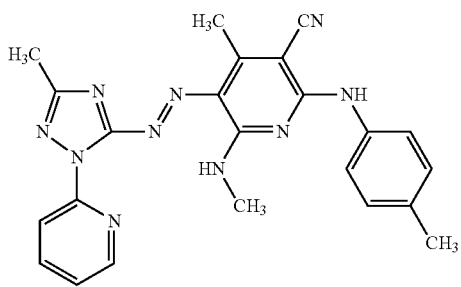
D-101
D-102
D-103
D-104
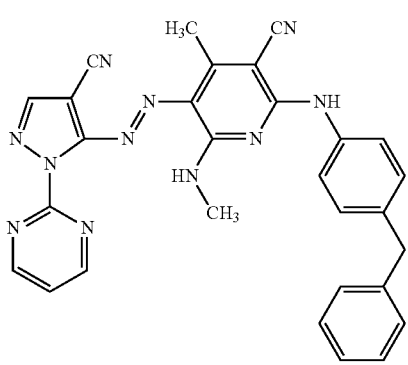

D-105
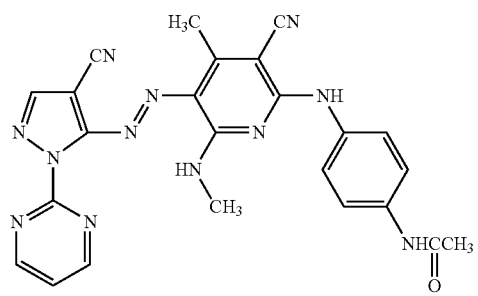
D-106
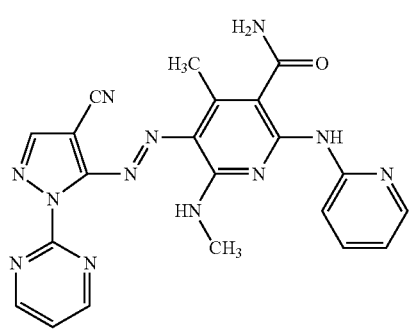
D-107
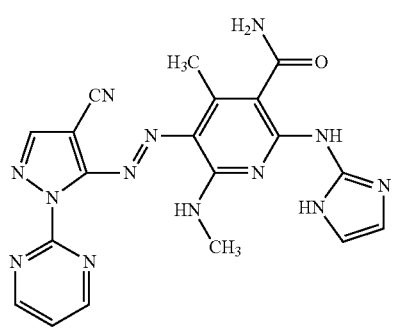
D-108
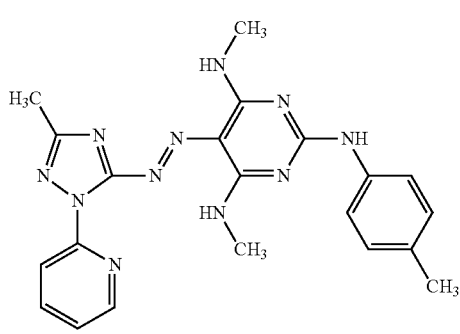
D-109
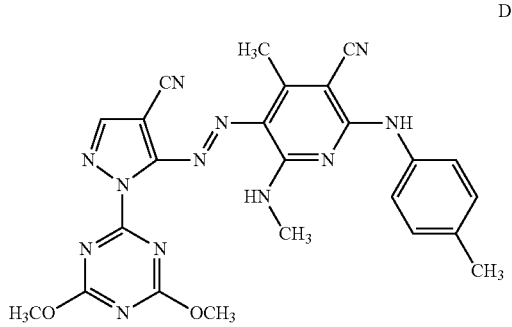
D-110
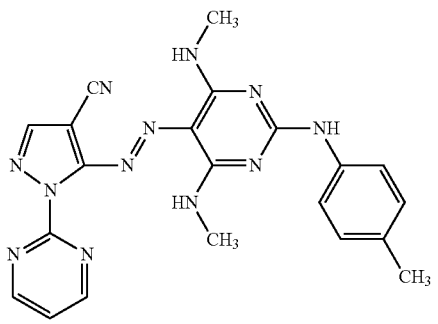
D-111
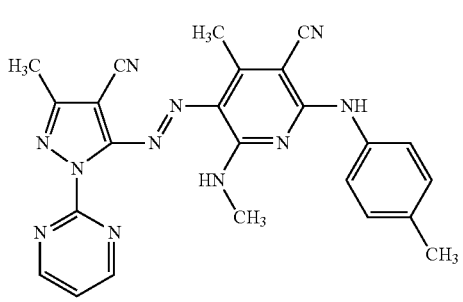
D-112
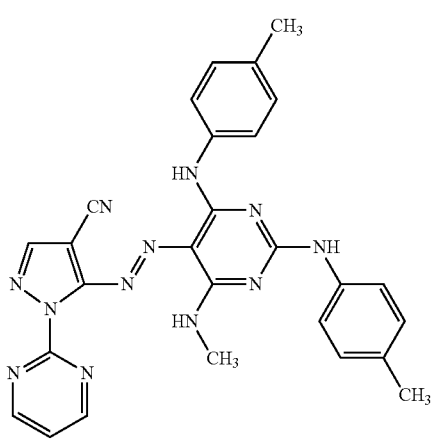
D-113
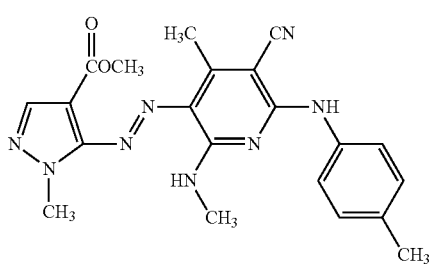
D-114
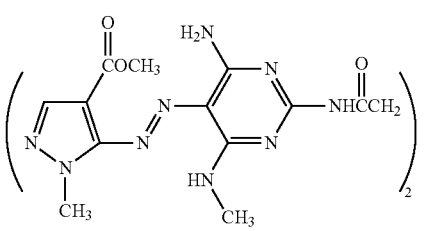

-continued

D-115
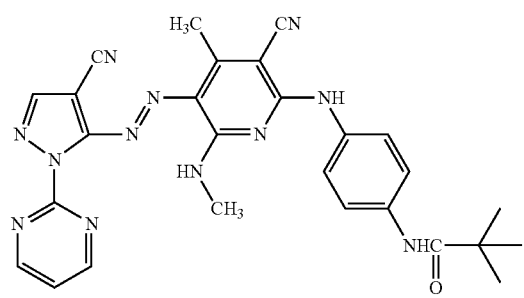

D-116
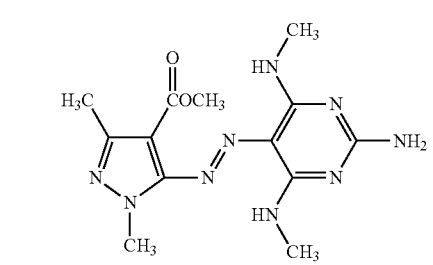

D-117
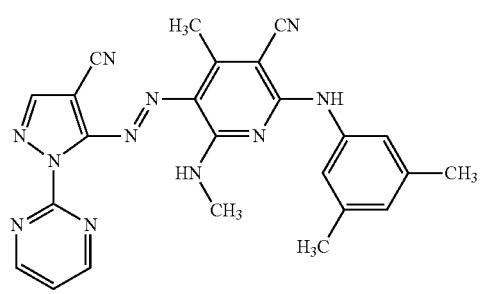

D-118
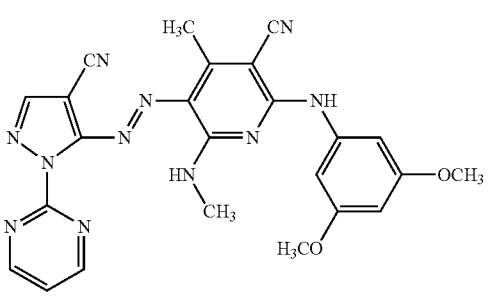

D-119
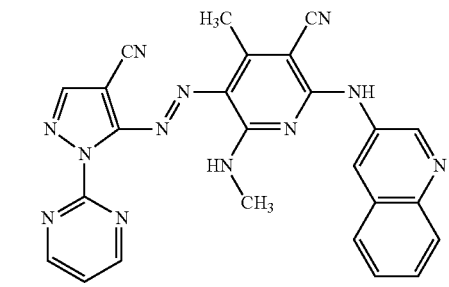

-continued

D-120
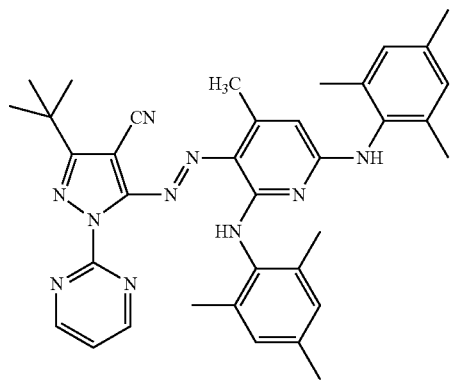

D-121
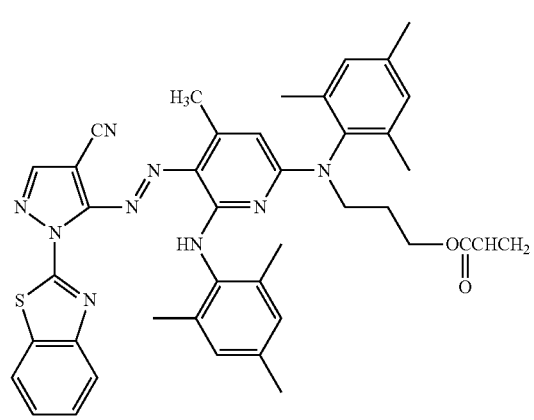

The pigments of the invention represented by the general formulae (1) to (4) and (2-1) may have a chemical structure represented by the general formula (1), (2), (3), (4), or (2-1) or may be the tautomers thereof, and may be of any crystal form called polymorphic form.

Polymorphism means that crystals having the same chemical composition can be different from each other in the conformation of building block (molecules or ions) in the crystal. Chemical and physical properties of the pigments are decided by the crystal structure, and each polymorphic forms of the same pigment can be discriminated from each other by rheology, color, and other color characteristics. Also, different polymorphic forms can be confirmed by X-Ray Diffraction (results of powder X-ray diffractiometry) or by X-Ray Analysis (results of X-ray analysis of crystal structure). In the case where the pigments of the invention represented by the general formulae (1), to (4), and (2-1), exhibit polymorphism, they may be in any polymorphic forms and may be a mixture of two or more polymorphic forms. However, pigments wherein a single crystal form is predominant are preferred. That is, pigments not contaminated with polymorphic form crystals are preferred. The content of the azo pigment having a single crystal form is from 70% to 100%, preferably from 80% to 100%, more preferably from 90% to 100%, still more preferably from 95% to 100%, particularly preferably 100%, based on the entire azo pigment. When the azo pigment contains a single crystal form azo pigment as a main component, regularity of alignment of the pigment molecules is improved, and the intramolecular and intermolecular interaction is enhanced, thus a high-level three-dimensional network being easily formed. As a result, performances required for pigments, such as hue, light fastness, heat fastness, humidity fastness, fastness to an oxidative gas, and solvent resistance, are improved, thus the above-described content being preferred.

The mixing ratio of polymorphic forms in the azo pigment can be confirmed from values obtained by physicochemical measurement of solid such as X-ray crystal structure analysis of single crystal, powder X-ray diffractometry (XRD), microscopic photography of the crystals (TEM), or IR (KBr method).

Control of the above-described tautomerism and/or polymorphism may be achieved by controlling production conditions upon coupling reaction.

With those which have acid groups among the azo pigments of the invention represented by the general formulae (1) to (4), and (2-1), part or all of the acid groups may be in a salt form, or the pigment may be a mixture of a salt type pigment and a free acid type pigment. Examples of the salt type include salts of an alkali metal such as Na, Li, or K, salts of ammonium optionally substituted by an alkyl group or a hydroxyalkyl group, and salts of an organic amine. Examples of the organic amine include a lower alkyl amine, a hydroxyl-substituted lower alkyl amine, a carboxy-substituted lower alkyl amine, and a polyamine having from 2 to 10 alkylene-imine units containing from 2 to 4 carbon atoms. With these salt type pigments, they are not necessarily limited to one as to kind, but may be in a mixture of two or more thereof.

Further, as to the structure of the pigment to be used in the invention, in the case where plural acid groups exist in one molecule, the plural acid groups may be of a salt type or an acid type, and may be different from each other.

The azo pigments represented by the foregoing general formulae (1) to (4), and (2-1) may be hydrates which contain water molecules within the crystal.

An example of processes for producing the azo pigments of the invention will be described hereinafter. For example, the azo pigment represented by the foregoing general formula (1) can be produced by diazotizing a heterocyclic amine represented by the following general formula (6) under a non-aqueous acidic condition, subjecting the resulting diazonium salt with a compound represented by the following general formula (7) in an acidic state, and conducting conventional after-treatment.

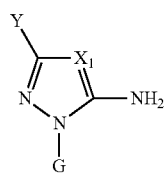

(6)

(In formula (6), Y, G, and $X_1$ are the same as those defined with respect to the foregoing general formula (1).)

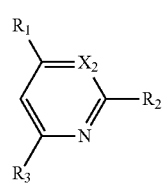

(7)

(In formula (7), $R_1$, $R_2$, $R_3$, and $X_2$ are the same as those defined with respect to the foregoing general formula (1).)

The reaction scheme is shown below.

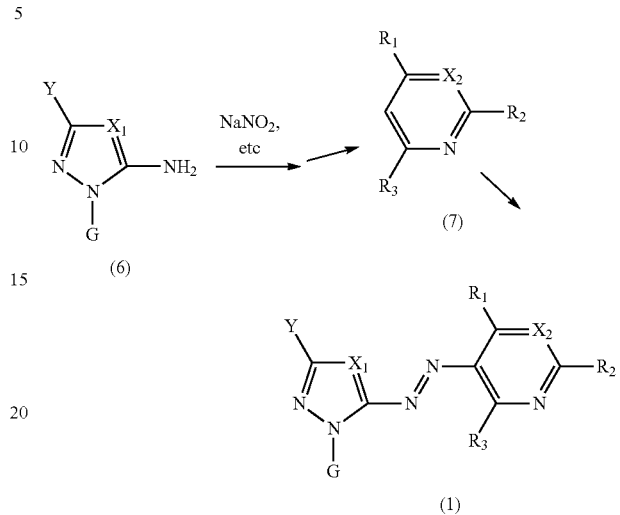

(In the above formulae, G, Y, $R_1$ to $R_3$, $X_1$, and $X_2$ are the same as those defined with respect to the foregoing general formula (1).)

Some of the heterocyclic amine represented by the above general formula (6) may be commercially available but, generally, the heterocyclic amines may be produced in a conventionally known manner by, for example, the process described in Japanese Patent No. 4,022,271. The heterocyclic coupler represented by the above general formula (7) can be produced by, or according to, the processes described in JP-A-56-20062 and JP-A-2002-371079. The diazotization reaction of the heterocyclic amine represented by the above scheme can be conducted, for example, by reacting it with a reagent such as sodium nitrite, nitrosylsulfuric acid, or isoamyl nitrite in an acidic solvent such as sulfuric acid, phosphoric acid, or acetic acid at a temperature of 15° C. or less for about 10 minutes to about 6 hours. The coupling reaction is preferably conducted by reacting the diazonium salt obtained by the above-mentioned process with the compound represented by the above general formula (7) at 40° C. or less, preferably 25° C. or less, for about 10 minutes to about 12 hours.

Regarding synthesis of the azo pigments of the general formulae (1) and (2) wherein n is 2 or more, they can be synthesized in the same manner as in the aforesaid scheme by synthesizing a raw material wherein a substitutable divalent, trivalent, or tetravalent substituent is introduced into $R_1$ to $R_3$, G, Y, $X_1$, $X_2$, and the like in the general formula (6) or (7).

The reaction product may form precipitated crystals but, in general, water or an alcoholic solvent is added to the reaction solution to thereby precipitate crystals, and the precipitated crystals can be collected by filtration. Also, an alcoholic solvent or water may be added to the reaction solution to thereby precipitate crystals, and the precipitated crystals can be collected by filtration. The crystals thus collected by filtration are washed and dried, as needed, to obtain the azo pigment represented by the general formula (1).

The compounds represented by the general formulae (1) to (4), and (2-1) are obtained as a crude azo pigment (crude) by the above-described production process. In the case of using them as the pigments of the invention, they are preferably subjected to after-treatment. As methods of the after-treatment, there are illustrated, for example, a pigment particle-controlling step such as milling treatment (e.g., solvent-salt milling, salt milling, dry milling, solvent milling, or acid pasting) or solvent heating treatment; and a surface-treating step using, for example, a resin, a surfactant, or a dispersing agent.

The compounds of the invention represented by the general formulae (1) to (4), and (2-1) are preferably subjected to the solvent heating treatment and/or the solvent-salt milling as the after-treatment.

As a solvent to be used in the solvent heating treatment, there are illustrated, for example, water; aromatic hydrocarbon series solvents such as toluene and xylene; halogenated hydrocarbon series solvents such as chlorobenzene and o-dichlorobenzene; alcoholic solvents such as isopropanol and isobutanol; polar aprotic organic solvents such as N,N-dimethylformamide, N,N-dimethylacetamide, and N-methyl-2-pyrrolidone; glacial acetic acid; pyridine; and a mixture thereof. An inorganic or organic acid or base may further be added to the above-described solvents. The temperature of the solvent heating treatment varies depending upon the desired primary particle size of the pigment, but is preferably from 40 to 150° C., more preferably from 60 to 100° C. The treating time is preferably from 30 minutes to 24 hours.

As the solvent-salt milling, there is illustrated, for example, the procedure wherein a crude azo pigment, an inorganic salt, and an organic solvent which does not dissolve them are placed in a kneader, and knead-milling of the mixture is conducted therein. As the inorganic salt, water-soluble inorganic salts can preferably be used. For example, inorganic salts such as sodium chloride, potassium chloride, and sodium sulfate are preferably used. Also, it is more preferred to use inorganic salts having an average particle size of from 0.5 to 50 μm. The amount of the inorganic salt to be used is preferably a 3- to 20-fold amount by weight, more preferably a 5- to 15-fold amount by weight, based on the crude pigment. As the organic solvent, water-soluble organic solvents can preferably be used and, since the solvent becomes easily vaporizable due to an increase in temperature upon kneading, high-boiling solvents are preferred in view of safety. Examples of such organic solvents include diethylene glycol, glycerin, ethylene glycol, propylene glycol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monomethyl ether, dipropylene glycol, and a mixture thereof. The amount of the water-soluble organic solvent to be used is preferably a 0.1- to 5-fold amount based on the crude azo pigment. The kneading temperature is preferably from 20 to 130° C., particularly preferably from 40 to 110° C. As a kneader, there can be used, for example, a kneader and a mix muller.

[Pigment Dispersion]

The pigment dispersion of the invention is characterized in that it contains at least one of the azo pigments represented by the general formula (1) to (4), and (2-1), the tautomers of the azo pigments, and the salts or hydrates thereof. Thus, there can be obtained a pigment dispersion having excellent coloring characteristics, durability, and dispersion stability.

The pigment dispersion of the invention may be aqueous or non-aqueous, but is preferably an aqueous pigment dispersion. As the aqueous liquid for dispersing the pigment in the aqueous pigment dispersion of the invention, a mixture containing water as a main component and, as needed, a hydrophilic organic solvent can be used.

Examples of the hydrophilic organic solvent include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol; glycol derivatives such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, and ethylene glycol monophenyl ether; amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine; formamide; N,N-dimethylformamide; N,N-dimethylacetamide; dimethylsulfoxide; sulfolane; 2-pyrrolidone; N-methyl-2-pyrrolidone; N-vinyl-2-pyrolidone; 2-oxazolidone; 1,3-dimethyl-2-imidazolidinone; acetonitrile; and acetone.

Further, the aqueous pigment dispersion of the invention may contain an aqueous resin. As the aqueous resin, there are illustrated water-soluble resins which dissolve in water, water-dispersible resins which can be dispersed in water, colloidal dispersion resins, and a mixture thereof. Specific examples of the aqueous resins include acryl series resins, styrene-acryl series resins, polyester resins, polyamide resins, polyurethane resins, and fluorine-containing resins.

In the case where the aqueous pigment dispersion in the invention contains the aqueous resin, the content is not particularly limited. For example, the content may be from 0 to 100% by weight based on the weight of the pigment.

Further, in order to improve dispersibility of the pigment and quality of image, a surfactant and a dispersing agent may be used. As the surfactant, there are illustrated anionic, nonionic, cationic, and amphoteric surfactants, and any of them may be used. However, anionic or nonionic surfactants are preferred to use.

In the case where the aqueous pigment dispersion in the invention contains the surfactant, the content is not particularly limited. For example, the content may be from 0 to 100% by weight based on the weight of the pigment.

Examples of the anionic surfactants include aliphatic acid salts, alkyl sulfate salts, alkylbenzene sulfonate salts, alkylnaphthalene sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalenesulfonic acid-formalin condensates, polyoxyethylene alkyl phosphate salts, glycerol borate fatty acid esters, and polyoxyethylene glycerol fatty acid esters.

Examples of the nonionic surfactants include polyoxyethylene alkyl ethers, polyoxyethylene alkylaryl ethers, polyoxyethylene-oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, fluorine-containing surfactants, and silicon-containing surfactants.

The non-aqueous pigment dispersion of the invention contains the pigment represented by the general formula (1) dispersed in a non-aqueous vehicle. Examples of resin to be used as the non-aqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, rubber hydrochloride, phenol resin, alkyd resin, polyester resin, unsaturated polyester resin, amino resin, epoxy resin, vinyl resin, vinyl chloride, vinyl chloride-vinyl acetate copolymer, acryl resin, methacryl resin, polyurethane resin, silicone resin, fluorine-containing resin, drying oil, synthetic drying oil, styrene/maleic acid resin, styrene/acryl resin, polyamide resin, polyimide resin, benzoguanamine resin, melamine resin, urea resin, chlorinated polypropylene, butyral resin, and vinylidene chloride resin. It is also possible to use a photo-curable resin as the non-aqueous vehicle.

Examples of the solvents to be used in the non-aqueous vehicles include aromatic solvents such as toluene, xylene, and methoxybenzene; ether acetate series solvents such as ethyl acetate, butyl acetate, propylene glycol monomethyl ether acetate, and propylene glycol monoethyl ether acetate; propionate series solvents such as ethoxyethyl propionate; alcoholic solvents such as methanol and ethanol; ether series solvents such as butyl cellosolve, propylene glycol monomethyl ether, diethylene glycol ethyl ether, and diethylene glycol dimethyl ether; ketone series solvents such as methyl ethyl ketone, methyl isobutyl ketone, and cyclohexanone; aliphatic hydrocarbon series solvents such as hexane; nitrogen-containing compound series solvents such as N,N-dimethylformamide, γ-butyrolactam, N-methyl-2-pyrrolidone, aniline, and pyridine; lactone series solvents such as γ-butyrolactone; and carbamic acid esters such as a 48:52 mixture of methyl carbamate and ethyl carbamate.

In the invention, the volume-average particle size of the pigment is preferably from 10 nm to 250 nm. Additionally, the term "volume-average particle size of the pigment particles" means the particle size of the pigment itself or, in the case where an additive such as a dispersing agent is adhered to the pigment particles, means the size of the particle with the additive being adhered thereto. In the invention, as an apparatus for measuring the volume-average particle size of the pigment, a particle size analyzer of Nanotrac UPA (UPA-EX150; manufactured by Nikkiso Co., Ltd.) is used. The measurement is conducted according to a predetermined measuring method placing 3 ml of a pigment dispersion in a measuring cell. Additionally, with respect to parameters to be inputted upon measurement, an ink viscosity is used as a viscosity, and a pigment density is used as a density of the pigment.

The volume-average particle size of the pigment is more preferably from 20 nm to 250 nm, still more preferably from 30 nm to 230 nm. In case when the volume-average particle size of the particles in the pigment dispersion is less than 20 nm, storage stability might not be ensured in some cases whereas, in case when the volume-average particle size of the particles in the pigment dispersion exceeds 250 nm, the optical density might be reduced in some cases.

The content of the pigment contained in the pigment dispersion of the invention is preferably in the range of from 1 to 35% by weight, more preferably in the range of from 2 to 25% by weight. In case when the content is less than 1% by weight, a sufficient image density might not be obtained in some cases by using the pigment dispersion independently as an ink composition. In case when the content exceeds 35% by weight, the dispersion stability might be reduced in some cases.

The pigment dispersion of the invention is obtained by dispersing the azo pigment and the aqueous or non-aqueous medium using a dispersing apparatus. As the dispersing apparatus, there can be used a simple stirrer, an impeller-stirring system, an in-line stirring system, a mill system (for example, colloid mill, ball mill, sand mill, beads mill, attritor, roll mill, jet mill, paint shaker, or agitator mill), a ultrasonic wave system, a high-pressure emulsion dispersion system (high-pressure homogenizer; specific commercially available apparatuses being Gaulin homogenizer, a microfluidizer, and DeBEE2000).

A dispersion containing the azo compound of the invention can similarly contain the above-described components constituting the pigment dispersion, and a preferred content of the azo compound to be contained in the dispersion is also similar to that described with respect to the pigment dispersion.

As uses of the azo pigments and azo compounds of the invention, there are illustrated image recording materials for forming images, particularly color images. Specifically, there are illustrated inkjet system recording materials to be described in detail below, heat-sensitive recording materials, pressure-sensitive recording materials, recording materials for the electro-photographic system, transfer system silver halide light-sensitive materials, printing inks, and recording pens, preferably inkjet system recording materials, heat-sensitive recording materials, and recording materials for the electro-photographic system, more preferably inkjet system recording materials.

In addition, the pigments and the compounds can find application to color filters for recording and reproducing color images to be used in solid state imaging devices such as CCDs and in displays such as LCD and PDP and to a pigmenting solution for pigmenting various fibers.

The azo pigments of the invention are used by adjusting physical properties such as solvent resistance, dispersibility, and heat flow properties so as to be appropriate to a particular use through selection of substituents. Also, the pigment of the invention may be used in a state of emulsion dispersion or, further, in a state of solid dispersion according to the used system.

[Coloring Composition]

The coloring composition of the invention means a coloring composition containing at least one kind of the azo pigments of the invention. The coloring composition of the invention can contain a medium and, in the case where a solvent is used as the medium, the composition is particularly appropriate as an ink for inkjet recording. The coloring composition of the invention can be prepared by using an oleophilic medium or an aqueous medium as the medium and dispersing the azo pigment of the invention in the medium. Preferably, the aqueous medium is used as the medium. The coloring composition of the invention includes an ink composition excluding the medium. The coloring composition of the invention may contain, as needed, other additives within the range of not spoiling the advantages of the invention. Examples of the other additives include known additives (described in JP-A-2003-306623) such as a drying-preventing agent (a wetting agent), an antibrowning agent, an emulsion stabilizer, a penetration accelerator, an ultraviolet ray absorbent, an antiseptic, an antifungal agent, a pH-adjusting agent, a surface tension-adjusting agent, an anti-foaming agent, a viscosity-adjusting agent, a dispersing agent, a dispersion stabilizer, a rust inhibitor, and a chelating agent. In the case of water-soluble ink compositions, these various additives are added directly to the ink solution. In the case of oil-soluble ink compositions, it is general to add to a dispersion after preparing the azo pigment dispersion, but they may be added to an oil phase or an aqueous phase upon preparation.

[Ink for inkjet Recording]

Next, the ink of the invention for inkjet recording will be described below.

The ink of the invention for inkjet recording (hereinafter also referred to as "ink") contains the pigment dispersion described above, and is preferably prepared by mixing with a water-soluble solvent or water. However, in the case where no particular problems are involved, the pigment dispersion of the invention described above may be used as such.

In view of hue, color density, saturation, and transparency of an image formed on a recording medium, the content of the pigment dispersion in the ink of the invention is in the range of preferably from 1 to 100% by weight, particularly preferably from 3 to 20% by weight, most preferably from 3 to 10% by weight.

The azo pigment or azo compound of the invention is contained in an amount of from 0.1 part by weight to 20 parts by weight, more preferably from 0.2 part by weight to 10 parts by weight, still more preferably from 1 to 10 parts by weight, in 100 parts by weight of the ink of the invention. The ink of the invention may further contain other pigment in combination with the pigment of the invention. In the case of using two or more kinds of pigments, the total amount of the pigments is preferably within the above-described range.

The ink of the invention can be used for forming a full-color image as well as a mono-color image. In order to form the full-color image, a magenta tone ink, a cyan tone ink, and a yellow tone ink can be used and, further, a black tone ink can be used for adjusting tone.

Further, in the ink of the invention may be used other pigments in addition to the azo pigment of the invention. As yellow pigments to be applied, there are illustrated, for example, C.I.P.Y.74, C.I.P.Y.128, C.I.P.Y.155, and C.I.P.Y.213. As magenta pigments to be applied, there are illustrated C.I.P.V.19 and C.I.P.R.122. As cyan pigments to be applied, there are illustrated C.I. P.B.15:3 and C.I.P.B.15:4. Apart from these pigments, any pigment may be used as each pigment. As a black color material, there can be illustrated a dispersion of carbon black as well as disazo, trisazo, and tetrazo pigments.

As the water-soluble solvents to be used in the ink of the invention or inkjet recording, polyhydric alcohols, polyhydric alcohol derivatives, nitrogen-containing solvents, alcohols, and sulfur-containing solvents are used. Specific examples of the polyhydric alcohols include ethylene glycol, diethylene glycol, propylene glycol, butylenes glycol, triethylene glycol, 1,5-pentanediol, 1,2,6-hexanetriol, and glycerin.

Examples of the polyhydric alcohol derivatives include ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and an ethylene oxide adduct of diglycerin.

Also, examples of the nitrogen-containing solvents include pyrrolidone, N-methyl-2-pyrrolidone, cyclohexylpyrrolidone, and triethanolamine, examples of the alcohols include ethanol, isopropyl alcohol, butyl alcohol, and benzyl alcohol, and examples of the sulfur-containing solvents include thiodiethanol, thiodiglycerol, sulfolane, and dimethylsulfoxide. Besides, propylene carbonate and ethylene carbonate may also be used.

The water-soluble solvents to be used in the invention may be used alone or as a mixture of two or more thereof. As to the content of the water-soluble solvent, the solvent is used in an amount of from 1% by weight to 60% by weight, preferably from 5% by weight to 40% by weight, based on the total weight of the ink. In case when the content of the water-soluble solvent in the entire ink is less than 1% by weight, there might result an insufficient optical density in some cases whereas, in case when the content exceeds 60% by weight, there might result unstable jet properties of the ink liquid in some cases due to the large viscosity of the liquid.

The preferred physical properties of the ink of the invention are as follows. The surface tension of the ink is preferably from 20 mN/m to 60 mN/m, more preferably from 20 mN/m to 45 mN/m, still more preferably from 25 mN/m to 35 mN/m. In case when the surface tension is less than 20 mN/m, the liquid might, in some cases, overflow onto the nozzle surface of the recording head, thus normal printing not being performed. On the other hand, in case when the surface tension exceeds 60 mN/m, the ink might, in some cases, slowly penetrate into the recording medium, thus the drying time becoming longer. Additionally, the surface tension is measured under the environment of 23° C. and 55% RH by using a Wilhelmy surface tension balance as is the same described above.

The viscosity of the ink is preferably from 1.2 mPa·s to 8.0 mPa·s, more preferably from 1.5 mPa·s to 6.0 mPa·s, still more preferably from 1.8 mPa·s to 4.5 mPa·s. In case when the viscosity is more than 8.0 mPa·s, ink ejection properties might, in some cases, be deteriorated. On the other hand, in case when the viscosity is less than 1.2 mPa·s, the long-term ejection properties might be deteriorated in some cases. Additionally, the viscosity (including that to be described hereinafter) is measured by using a rotational viscometer Rheomat 115 (manufactured by Contraves Co.) at 23° C. and a shear rate of $1,400 \, s^{-1}$.

In addition to the above-mentioned individual components, water is added to the ink within an amount of providing the preferred surface tension and viscosity described above. The addition amount of water is not particularly limited, but is in the range of preferably from 10% by weight to 99% by weight, more preferably from 30% by weight to 80% by weight, based on the total weight of the entire ink.

Further, for the purpose of controlling characteristic properties such as improvement of ejection properties, there can be used, as needed, polyethyleneimine, polyamines, polyvinylpyrolidone, polyethylene glycol, cellulose derivatives such as ethyl cellulose and carboxymethyl cellulose, polysaccharides and derivatives thereof, water-soluble polymers, polymer emulsions such as an acrylic polymer emulsion, a polyurethane series emulsion, and a hydrophilic latex, hydrophilic polymer gels, cyclodextrin, macrocyclic amines, dendrimers, crown ethers, urea and derivatives thereof, acetamide, silicone surfactants, and fluorine-containing surfactants.

Also, in order to adjust electrical conductivity and pH, there can be used compounds of alkali metals such as potassium hydroxide, sodium hydroxide, and lithium hydroxide; nitrogen-containing compounds such as ammonium hydroxide, triethanolamine, diethanolamine, ethanolamine, and 2-amino-2-methyl-1-propanol; compounds of alkaline earth metals such as calcium hydroxide; acids such as sulfuric acid, hydrochloric acid, and nitric acid; and salts between a strong acid and a weak alkali, such as ammonium sulfate.

Besides, pH buffers, antioxidants, antifungal agents, viscosity-adjusting agents, electrically conductive agents, and ultraviolet ray absorbents may also be added as needed.

EXAMPLES

The invention will be described in more detail by reference to Examples which, however, are not to be construed as limiting the invention. Additionally, in Examples, "parts" are by weight.

Synthesis Example 1

Synthesis of Specific Illustrative Compound D-1

Specific illustrative compound D-1 is synthesized according to the following route.

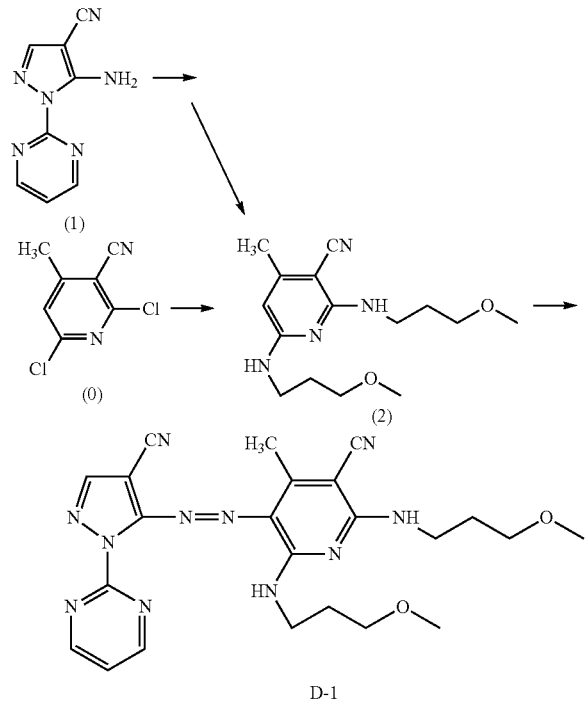

Synthesis of Compound (2)

50 g of compound (0) is added to 107 g of 3-methoxypropylamine under stirring at 10° C., followed by stirring at 20° C. for 3 hours. The reaction solution is cooled to room temperature, and 300 ml of water and 300 ml of ethyl acetate are added thereto. After allowing to stand, the aqueous layer is removed, and the ethyl acetate layer is washed twice, each time with 300 ml of saturated sodium chloride solution, and then dried over magnesium sulfate. After removing magnesium sulfate, the solution is concentrated to 200 ml. To this solution is gradually added 25 ml of hexane under stirring, and the resulting mixture is stirred at 25° C. for 2 hours.

Crystals precipitated are collected by filtration to obtain 56.6 g of compound (2). The yield is 72.5%.

Synthesis of D-1

1.7 g of compound (1) is added to 20 ml of phosphoric acid, and the mixture is heated to 30° C. to dissolve. This solution is cooled with ice and, while keeping the temperature of the solution at −5 to 0° C., 0.67 g of sodium nitrite is added thereto, followed by stirring for 1 hour to obtain a diazonium salt solution. Separately, 3.0 g of compound (2) is dissolved in 15 ml of methanol, and the above-described diazonium salt solution is added thereto at 8° C. or lower. At the time of completion of the addition, the ice bath is removed, followed by stirring the mixture for 3 hours. 50 ml of methanol is added to the reaction solution, and the resulting mixture is stirred for 30 minutes. Crystals precipitated are collected by filtration, and spray-washed with 30 ml of methanol. The thus-obtained crystals are added, without drying, to 100 ml of water, and a solution prepared by dissolving 1 g of sodium hydrogencarbonate in 30 ml of water is added thereto, followed by stirring at 20 to 25° C. for 30 minutes. Crystals precipitated are collected by filtration, and sufficiently spray-washed with water. The thus-obtained crystals are added, without drying, to 100 ml of methanol and heated to dissolve. 50 ml of water is gradually dropwise added thereto, and the mixture is stirred at 50° C. for 1 hour and, further, at room temperature for 30 minutes. Crystals precipitated are collected by filtration, and spray-washed with 20 ml of cold methanol. The thus-obtained crystals are dried to obtain 3.2 g of compound D-1 of the invention. Yield: 63.7%.

Infrared absorption chart of compound D-1 is shown in FIG. 1.

Synthesis Example 2

Synthesis of Specific Illustrative Compound D-3

Specific illustrative compound D-3 is synthesized according to the following route.

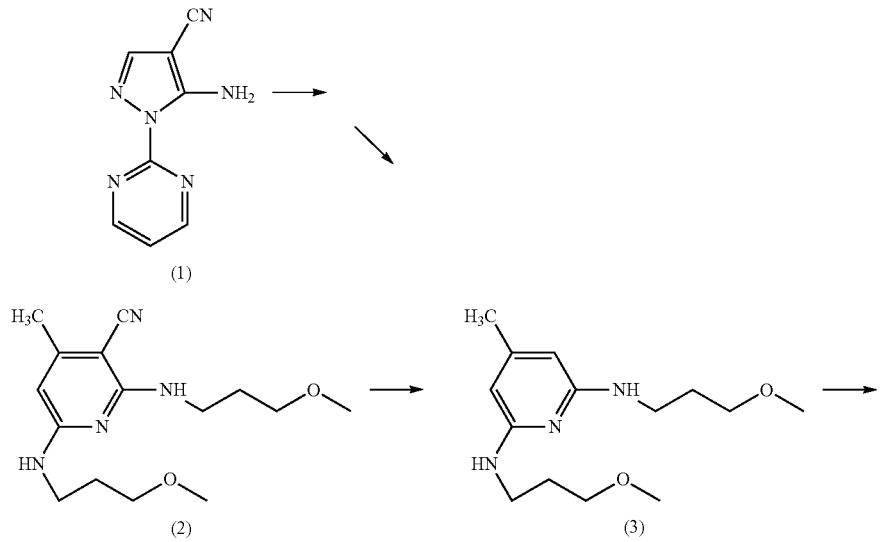

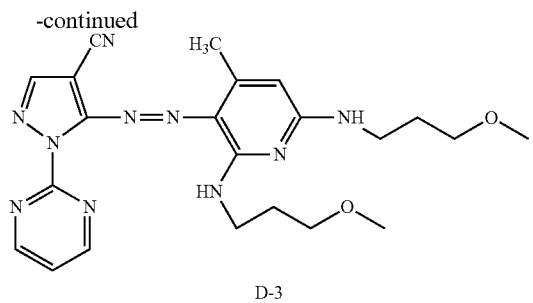

D-3

Synthesis of Compound (3)

15 g of compound (2) is added to a mixture of 50 g of phosphoric acid and 50 g of polyphosphoric acid, and the resulting mixture is heated at 130° C. for 3 hours under stirring. The reaction solution is cooled, and 200 g of ice-water is added thereto at 25° C. or lower. 200 ml of ethyl acetate is added to this solution, and, while stirring the mixture at 10 to 15° C. under cooling with ice, 350 ml of 20% sodium hydroxide aqueous solution is added thereto. After allowing to stand, the ethyl acetate layer is separated, and washed twice, each time with 100 ml of saturated sodium chloride solution. Ethyl acetate is removed by concentration, and the resulting oily product is purified by silica gel column chromatography to obtain 9.5 g of a pale yellow oily product of compound (3). Yield: 69.3%.

Synthesis of D-3

0.86 g of compound (1) is added to 10 ml of phosphoric acid, and the mixture is heated to 30° C. to dissolve. This solution is cooled with ice and, while keeping the temperature of the solution at −5 to 0° C., 0.33 g of sodium nitrite is added thereto, followed by stirring for 1 hour to obtain a diazonium salt solution. Separately, 1.4 g of compound (3) is dissolved in 10 ml of methanol, and the above-described diazonium salt solution is added thereto at 8° C. or lower. At the time of completion of the addition, the ice bath is removed, followed by stirring the mixture for 2 hours. The reaction solution is added to 100 ml of ice-water, and a solution of 8 g of sodium hydroxide in 10 ml of water is added thereto. After stirring the mixture for 30 minutes, crystals precipitated are collected by filtration, and spray-washed with water. The thus-obtained crystals are added, without drying, to 100 ml of water, and 20 ml of water is added thereto, followed by heating for 1 hour under stirring. Then, the mixture is stirred under cooling in air, and crystals precipitated are collected by filtration, then spray-washed with 20 ml of methanol. The thus-obtained crystals are dried to obtain 1.6 g of compound D-3 of the invention. Yield: 65.3%.

Figure 2:
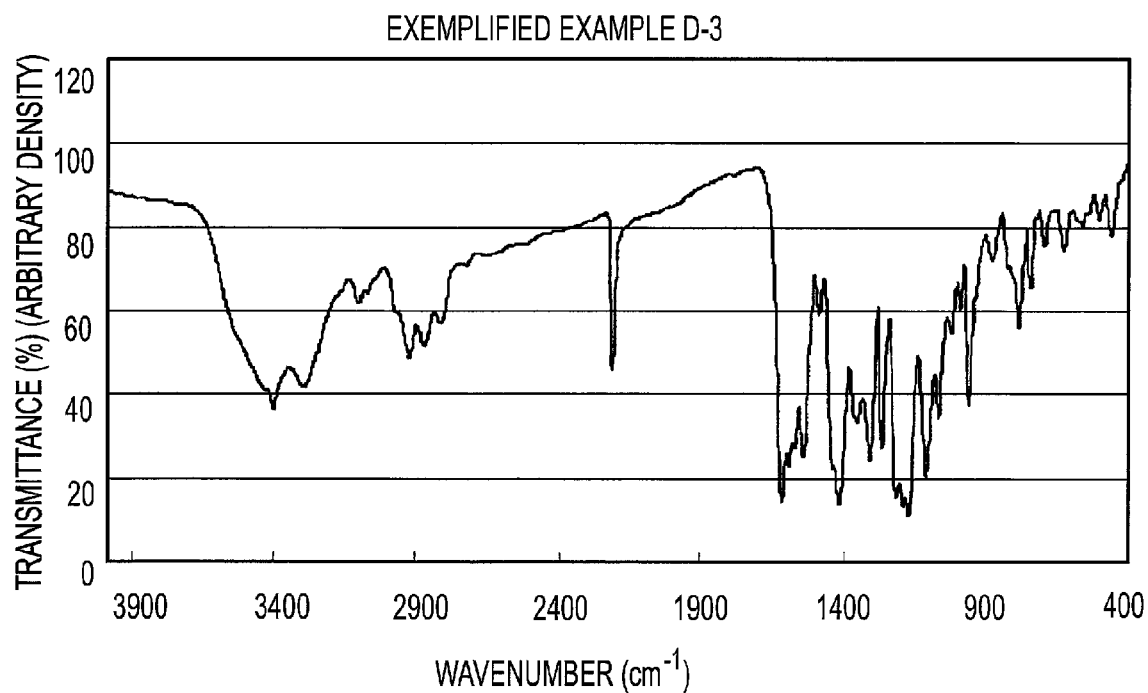
FIG. 2 is an infrared absorption spectrum of a specific illustrative compound D-3 synthesized according to Synthesis Example 2.

Infrared absorption chart of compound D-3 is shown in FIG. 2.

Synthesis Example 3

Synthesis of Specific Illustrative Compound D-5

Specific illustrative compound D-5 is synthesized according to the following route.

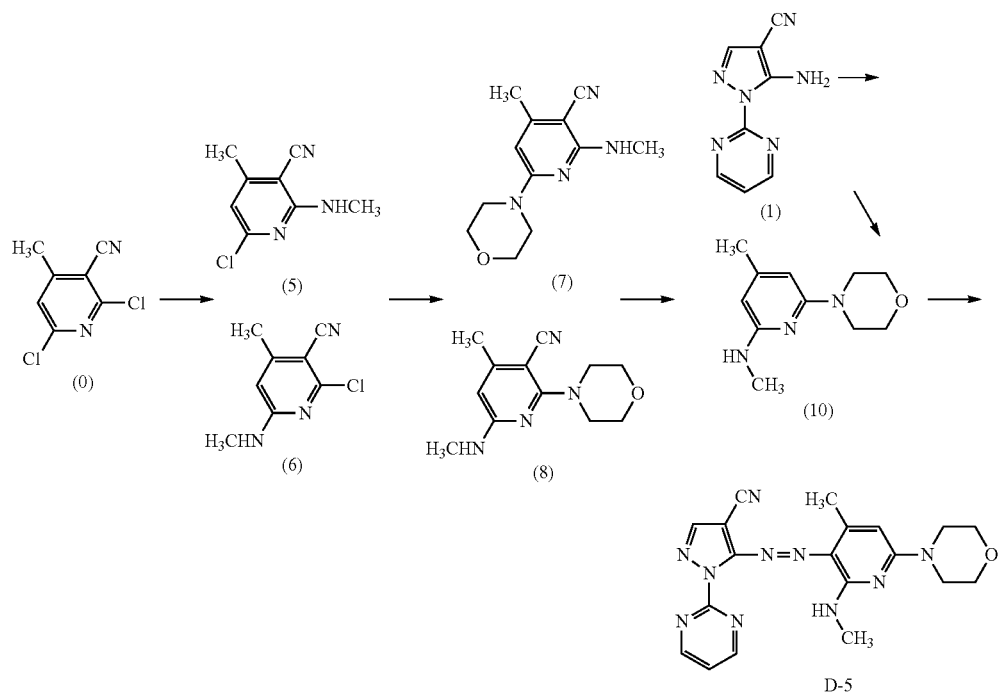

D-5

Synthesis of (5) and (6)

200 ml of methanol is added to 40 g of compound (0) and, while stirring at 40° C., 30 ml of a 40% methylamine solution in methanol is dropwise added thereto at 40 to 43° C. After stirring for further 2 hours at 40 to 43° C., the mixture is cooled with ice water, followed by stirring. Crystals precipitated are collected by filtration, and sufficiently washed with water. The thus-obtained crystals are dried to obtain 34.5 g of a mixture of compounds (5) and (6). Yield: 88.9%.

Synthesis of (7) and (8)

5 g of morpholine is added to 5 g of a mixture of compounds (5) and (6), and the mixture is stirred at 120° C. for 1 hour. The reaction solution is cooled to 50° C., and 50 ml of water is added thereto, followed by stirring for 1 hour. Crystals precipitated are collected by filtration, and sufficiently washed with water. The thus-obtained crystals are dried to obtain 5.5 g of a mixture of compounds (7) and (8). Yield: 85.9%.

Synthesis of (10)

5.5 g of a mixture of compounds (7) and (8) is added to a mixture of 20 g of phosphoric acid and 20 g of polyphosphoric acid, and the resulting mixture is heated at 130° C. for 3 hours under stirring. The reaction solution is cooled, and 50 g of ice-water is added thereto at 25° C. or lower. 100 ml of ethyl acetate is added to this solution, and, while stirring the mixture at 10 to 15° C. under cooling with ice, 250 ml of 20% sodium hydroxide aqueous solution is added thereto. After allowing to stand, the ethyl acetate layer is separated, and washed twice, each time with 100 ml of saturated sodium chloride solution. Ethyl acetate is removed by concentration, and the resulting oily product is purified by silica gel column chromatography to obtain 4.5 g of a colorless oily product of compound (10). Yield: 92.2%.

Synthesis of D-5

1.7 g of compound (1) is added to 20 ml of phosphoric acid, and the mixture is heated to 30° C. to dissolve. This solution is cooled with ice and, while keeping the temperature of the solution at −5 to 0° C., 0.67 g of sodium nitrite is added thereto, followed by stirring for 1 hour to obtain a diazonium salt solution. Separately, 1.8 g of compound (10) is dissolved in 15 ml of methanol, and the above-described diazonium salt solution is added thereto at 8° C. or lower. At the time of completion of the addition, the ice bath is removed, followed by stirring the mixture for 2 hours. The reaction solution is added to 100 ml of ice water, and 120 ml of 10% sodium hydroxide aqueous solution is added thereto, followed by stirring the mixture for 30 minutes. Crystals precipitated are collected by filtration, and spray-washed with a sufficient amount of water. The crystals are dissolved, without drying, in 100 ml of methanol under heating, and the resulting solution is filtered to remove dusts, followed by removing about 60 ml of methanol by heating under ordinary pressure to concentrate. The concentrate is stirred at room temperature for 1 hour. Crystals precipitated are collected by filtration, and spray-washed with 20 ml of cold methanol. 30 ml of methanol and 30 ml of water are added to the thus-obtained crystals without drying the crystals and, after stirring for 1 hour at an external temperature of 70° C., the mixture is stirred at room temperature for 1 hour. Crystals precipitated are collected by filtration, and spray-washed with 30 ml of water/methanol (1/1). The thus-obtained crystals are dried to obtain 1.9 g of compound D-5 of the invention. Yield: 54.1%.

Figure 3:
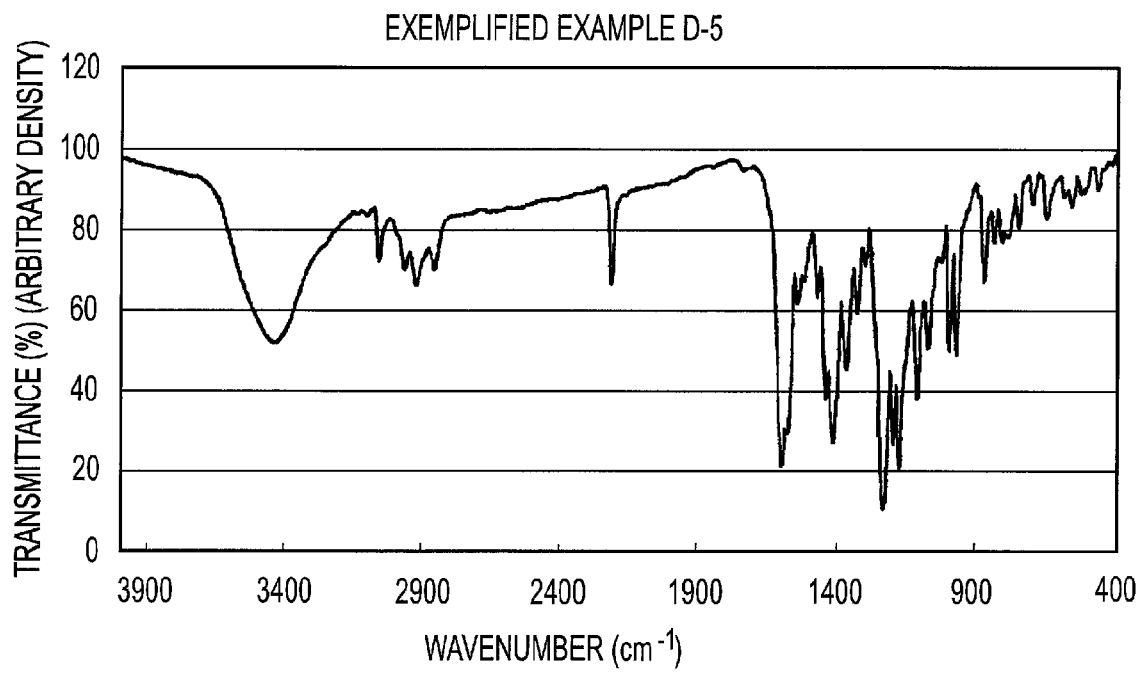
FIG. 3 is an infrared absorption spectrum of a specific illustrative compound D-5 synthesized according to Synthesis Example 3.

Infrared absorption chart of compound D-5 is shown in FIG. 3.

Synthesis Example 4

Synthesis of Specific Illustrative Compound D-7

Specific illustrative compound D-7 is synthesized according to the following route.

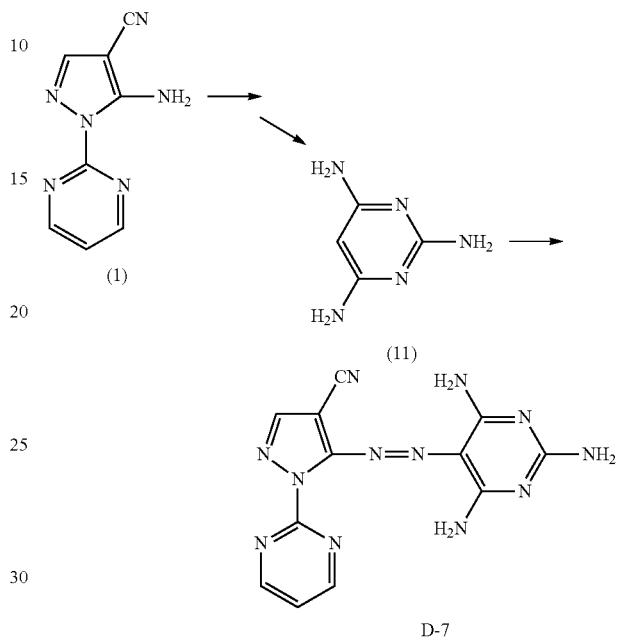

Synthesis of D-7

1.5 g of compound (1) is added to 15 ml of phosphoric acid, and the mixture is heated to 30° C. to dissolve. This solution is cooled with ice and, while keeping the temperature of the solution at −5 to 0° C., 0.60 g of sodium nitrite is added thereto, followed by stirring for 1 hour to obtain a diazonium salt solution. To this diazonium salt solution is added 1.1 g of compound (11). At the time of completion of the addition, the ice bath is removed, followed by stirring the mixture for 2 hours. The reaction solution is cooled to 10° C. or lower, and 80 ml of methanol is added thereto, followed by stirring for 30 minutes. Crystals precipitated are collected by filtration, and spray-washed with water. 150 ml of water and 15 ml of DMAc are added to the thus-obtained crystals without drying the crystals, and 6 g of sodium hydrogencarbonate is added thereto at 25° C. under stirring, followed by stirring at 25° C. for 1 hour. Crystals precipitated are collected by filtration, and added to 100 ml of methanol without drying the crystals. Further, 20 ml of water is added thereto, and the mixture is stirred for 1 hour under heating. Thereafter, the mixture is stirred under cooling in air, and crystals precipitated are collected by filtration and spray-washed with 20 ml of cold methanol. The thus-obtained crystals are dried to obtain 1.8 g of compound D-7 of the invention. Yield: 69.2%.

Figure 4:
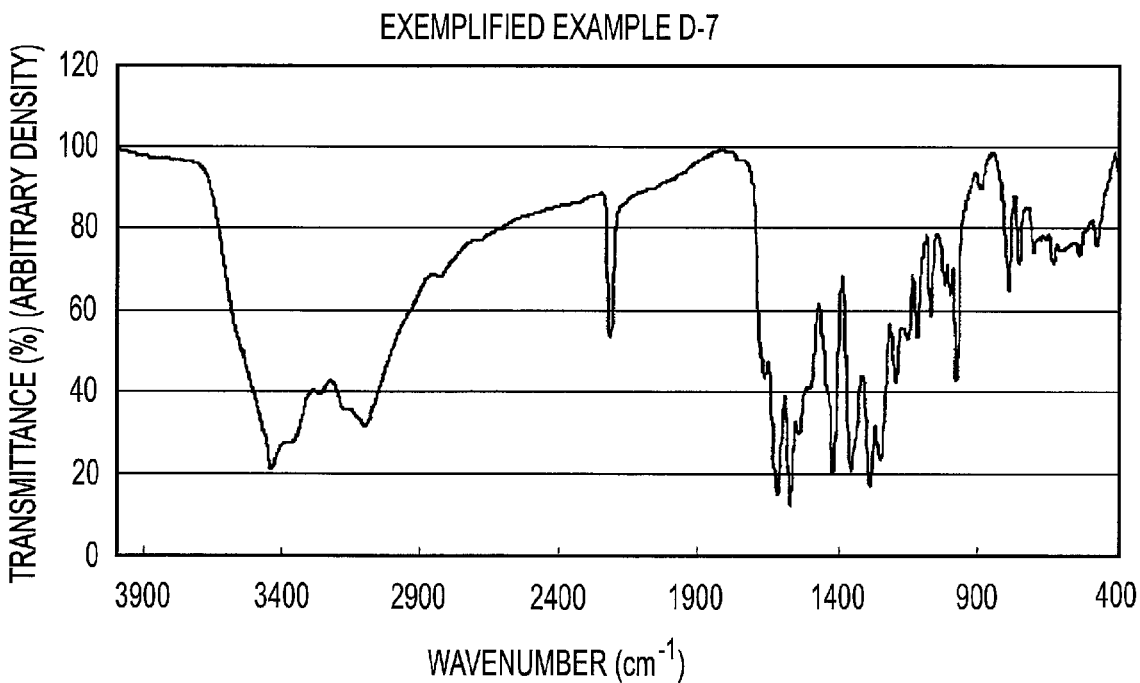
FIG. 4 is an infrared absorption spectrum of a specific illustrative compound D-7 synthesized according to Synthesis Example 4.

Infrared absorption chart of compound D-7 is shown in FIG. 4.

Synthesis Example 5

Synthesis of Specific Illustrative Compound D-9

Specific illustrative compound D-9 is synthesized according to the following route.

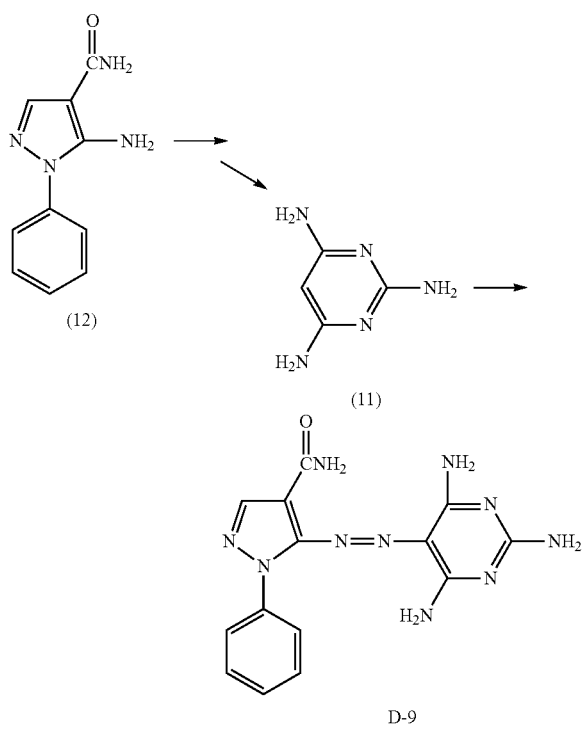

spray-washed with water. 150 ml of water and 15 ml of DMAc are added to the thus-obtained crystals without drying the crystals, and 6 g of sodium hydrogencarbonate is added thereto at 25° C. under stirring, followed by stirring at 25° C. for 1 hour. Crystals precipitated are collected by filtration, and added to 100 ml of methanol without drying the crystals. Further, 20 ml of water is added thereto, and the mixture is stirred for 1 hour under heating. Thereafter, the mixture is stirred under cooling in air, and crystals precipitated are collected by filtration and spray-washed with 20 ml of cold methanol. The thus-obtained crystals are dried to obtain 1.9 g of compound D-9 of the invention. Yield: 75.7%.

Figure 5:
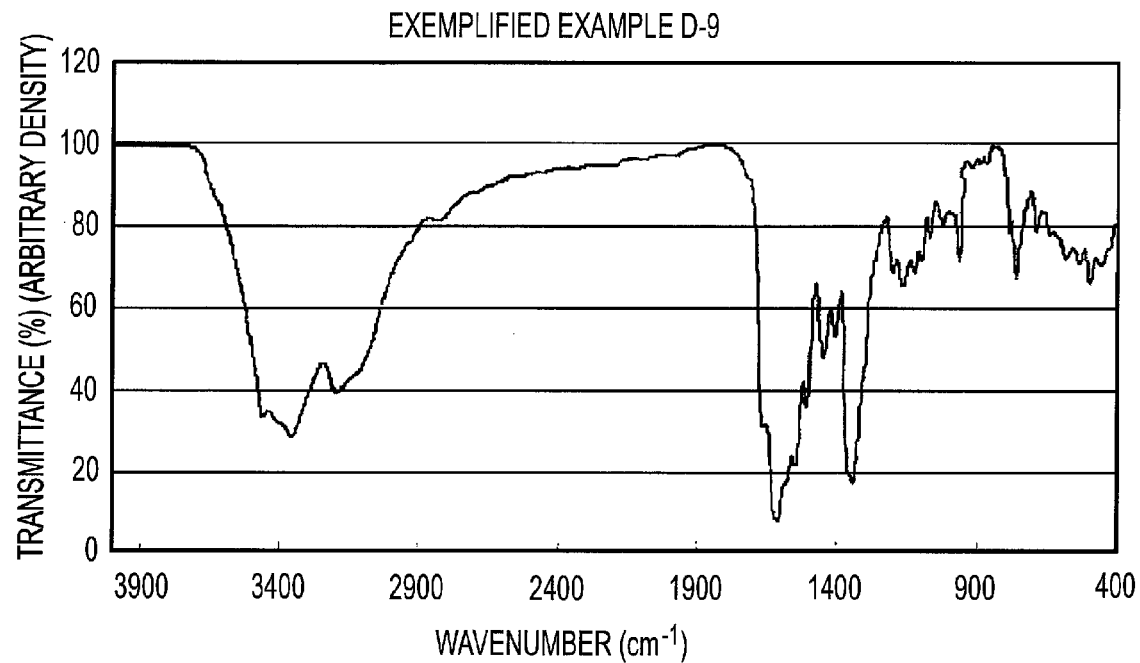
FIG. 5 is an infrared absorption spectrum of a specific illustrative compound D-9 synthesized according to Synthesis Example 5.
Figure 6:
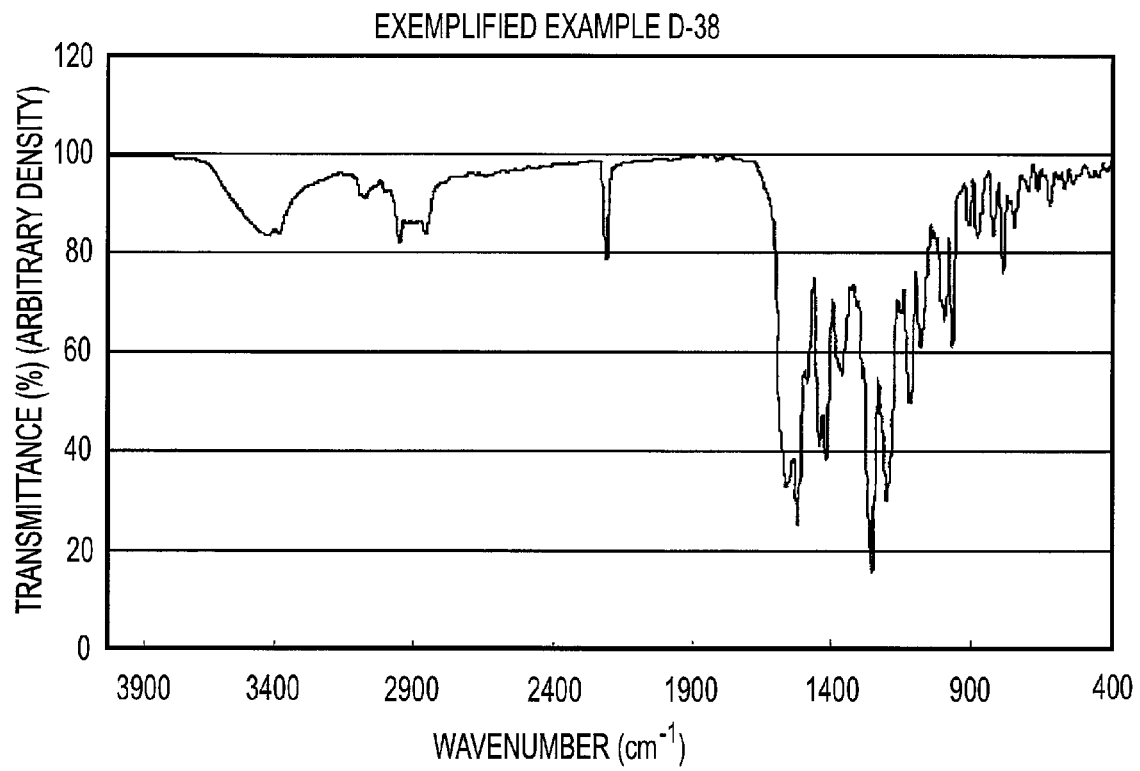
FIG. 6 is an infrared absorption spectrum of a specific illustrative compound D-38.

Infrared absorption chart of compound D-9 is shown in FIG. 5.

Synthesis Example 6

Synthesis of Specific Illustrative Compound D-85

Specific illustrative compound D-85 is synthesized according to the following route.

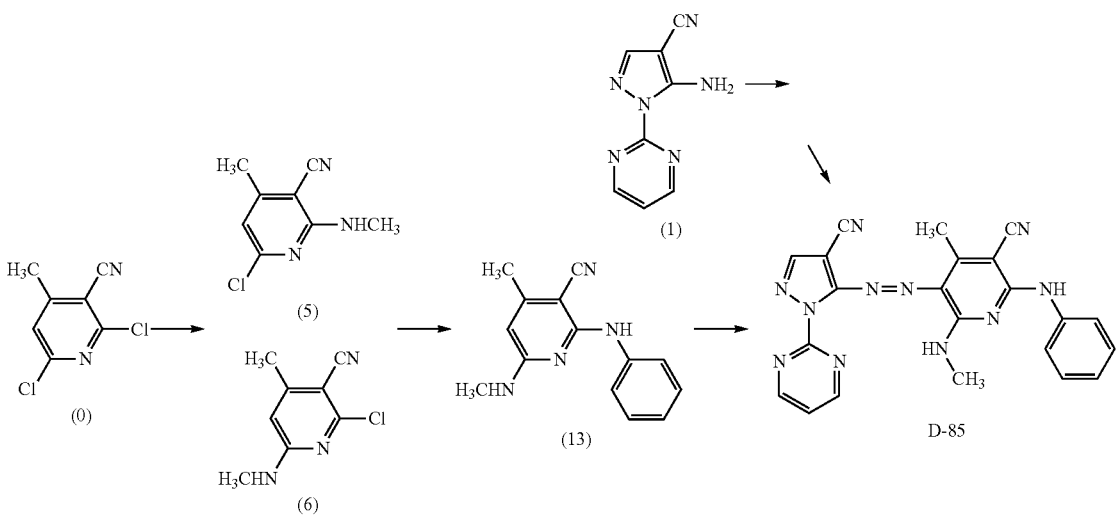

1.5 g of compound (12) is added to 15 ml of phosphoric acid, and the mixture is heated to 30° C. to dissolve. This solution is cooled with ice and, while keeping the temperature of the solution at −5 to 0° C., 0.54 g of sodium nitrite is added thereto, followed by stirring for 1 hour to obtain a diazonium salt solution. To this diazonium salt solution is added 1.0 g of compound (11). At the time of completion of the addition, the ice bath is removed, followed by stirring the mixture for 2 hours. The reaction solution is cooled to 10° C. or lower, and 80 ml of methanol is added thereto, followed by stirring for 30 minutes. Crystals precipitated are collected by filtration, and Synthesis of (6)

200 ml of methanol is added to 40 g of compound (0) and, under stirring at 40° C., 30 ml of a 40% methylamine solution in methanol is dropwise added thereto at 40 to 43° C. Further, after stirring the mixture at 40 to 43° C. for 2 hours, the mixture is cooled with ice-water, and stirred. Crystals precipitated are collected by filtration, and sufficiently washed with water. The thus-obtained crystals are dried to obtain 34.5 g of compounds (5) and (6). This mixture is subjected to recrystallization from 1,000 ml of ethyl acetate to obtain 17.0 g of compound (6). Yield: 43.8%.

Synthesis of (13)

3.6 g of p-toluidine is added to 3 g of compound (6), and the mixture is stirred at 150° C. for 3 hours. The reaction solution is cooled to 50° C., and 50 ml of water is added thereto, followed by stirring the mixture for 1 hour. Crystals precipitated are collected by filtration and sufficiently washed with water. The thus-obtained crystals are recrystallized from 45 ml of acetonitrile to obtain 2.2 g of compound (13). Yield: 52.8%.

Synthesis of D-85

1.5 g of compound (1) is added to 15 ml of phosphoric acid, and the mixture is heated to 30° C. to dissolve. This solution is cooled with ice and, while keeping the temperature of the solution at −5 to 0° C., 0.61 g of sodium nitrite is added thereto, followed by stirring for 1 hour to obtain a diazonium salt solution. Separately, 2.0 g of the compound (13) is dissolved in 70 ml of ethoxyethanol, and the aforesaid diazonium salt solution is added thereto at 8° C. or lower. At the time of completion of the addition, the ice bath is removed, followed by stirring the mixture for 2 hours. The reaction solution is added to 50 ml of methanol, and the mixture is stirred at room temperature for 2 hours. Crystals precipitated are collected by filtration, and spray-washed with 70 ml of methanol. The crystals are added, without drying, to a 1% sodium hydrogencarbonate aqueous solution, and the mixture is stirred for 1 hour. The crystals are collected by filtration, and spray-washed with a sufficient amount of water. The thus-obtained crystals are added, without drying, to a solution composed of 45 ml of dimethylacetamide (DMAc) and 30 ml of water and, after stirring at 80° C. for 1 hour, the mixture is stirred at room temperature for 2 hours. Crystals precipitated are collected by filtration and spray-washed with 30 ml of a mixture of DMAc/methanol (1/1). The thus-obtained crystals are dried to obtain 2.8 g of compound D-85 of the invention. Yield: 78.9%.

Figure 20:
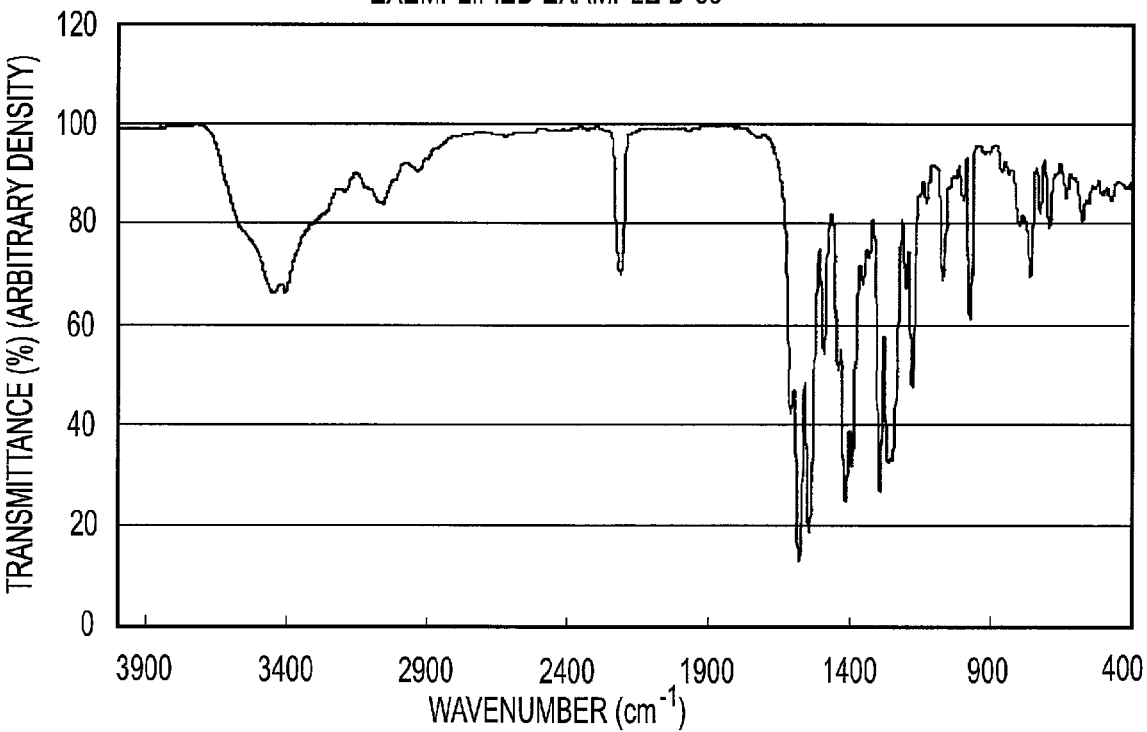
FIG. 20 is an infrared absorption spectrum of a specific illustrative compound D-85.
Figure 21:
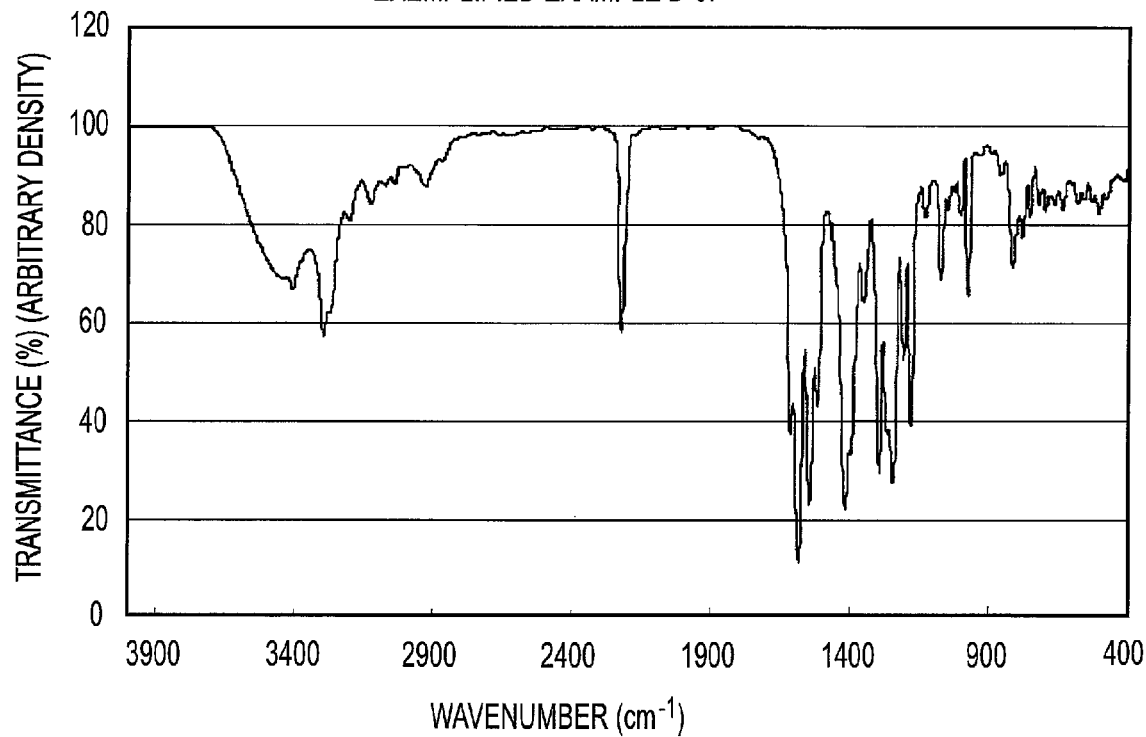
FIG. 21 is an infrared absorption spectrum of a specific illustrative compound D-87.
Figure 22:
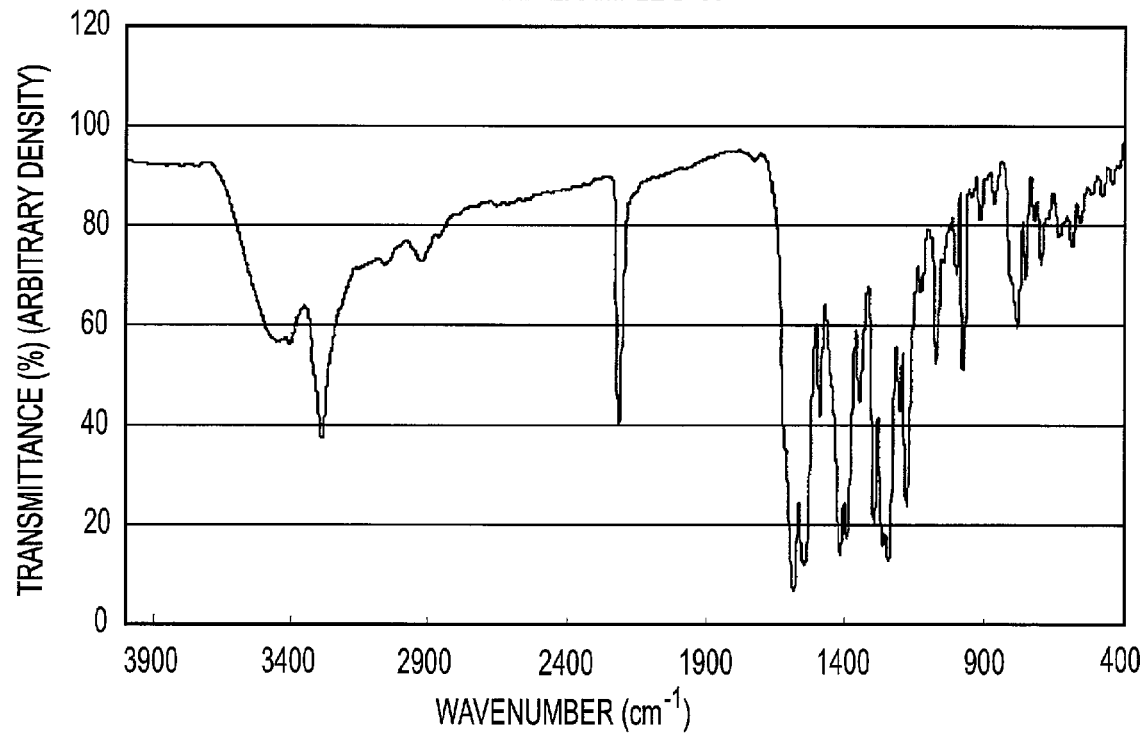
FIG. 22 is an infrared absorption spectrum of a specific illustrative compound D-90.
Figure 23:
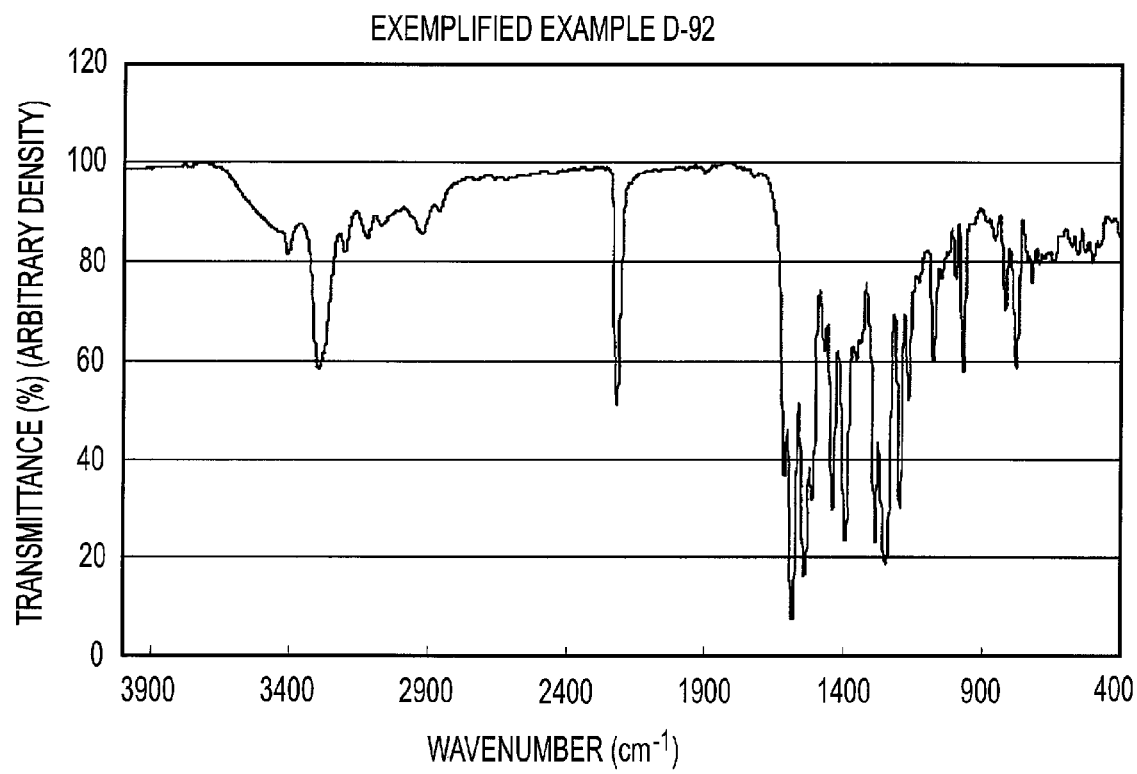
FIG. 23 is an infrared absorption spectrum of a specific illustrative compound D-92.
Figure 24:
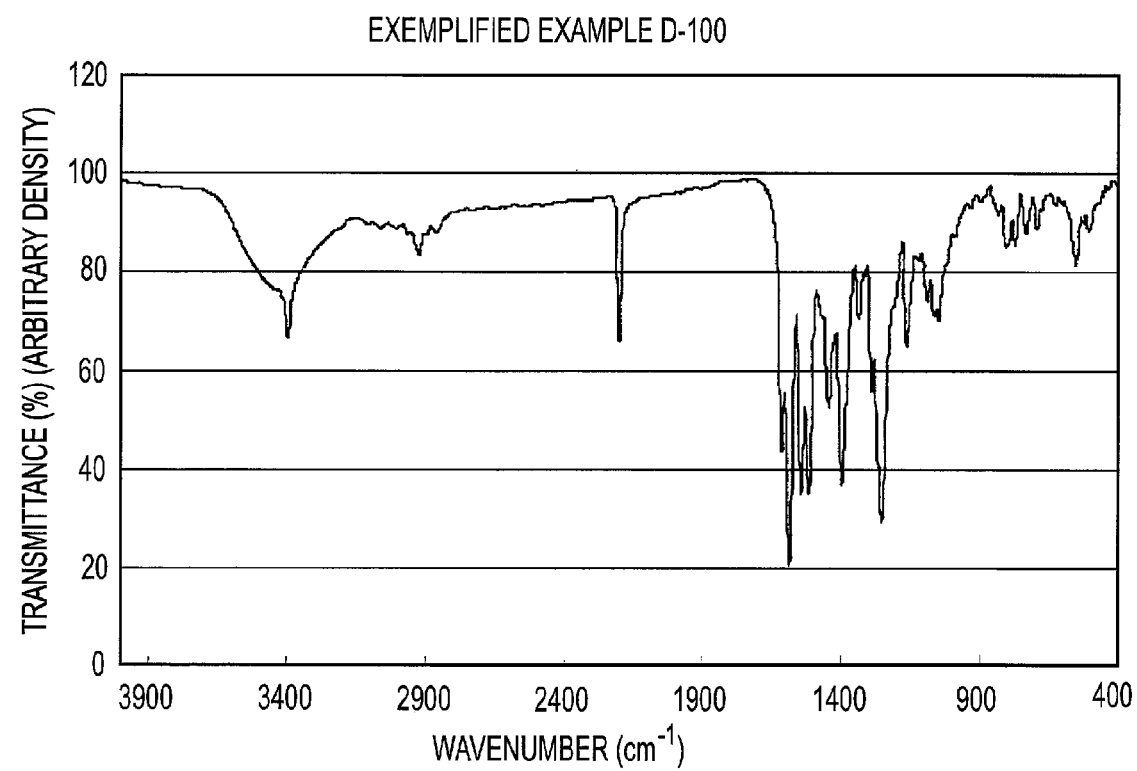
FIG. 24 is an infrared absorption spectrum of a specific illustrative compound D-100.
Figure 25:
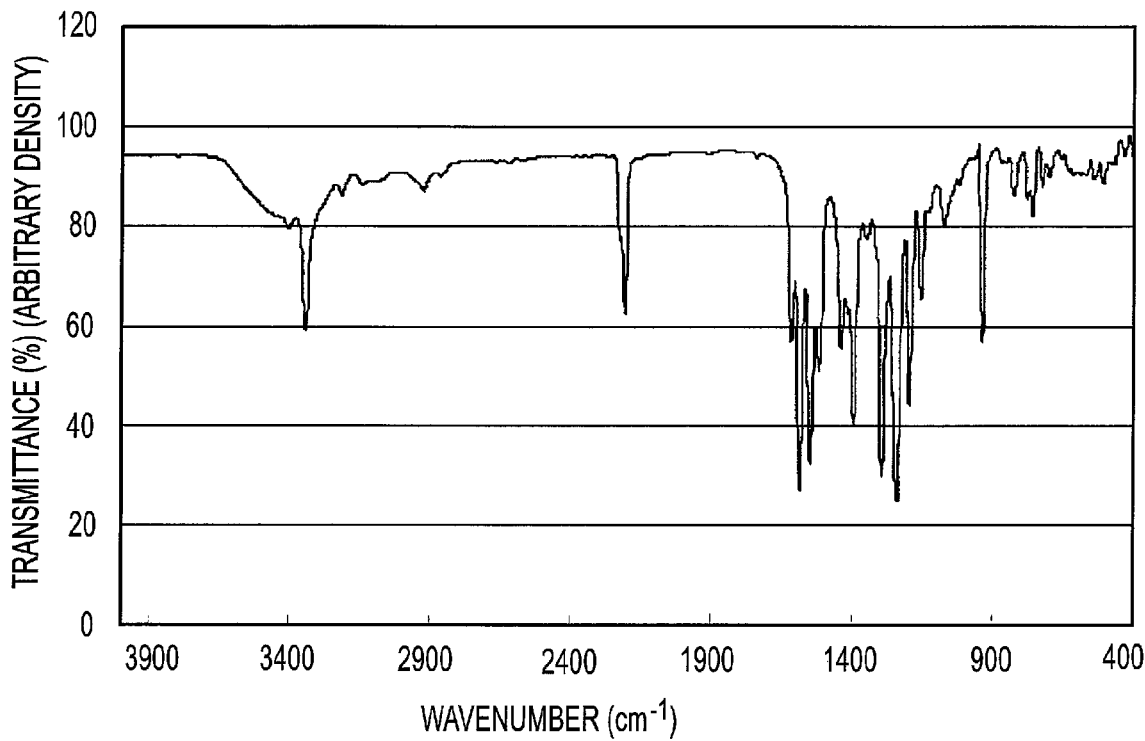
FIG. 25 is an infrared absorption spectrum of a specific illustrative compound D-101.
Figure 26:
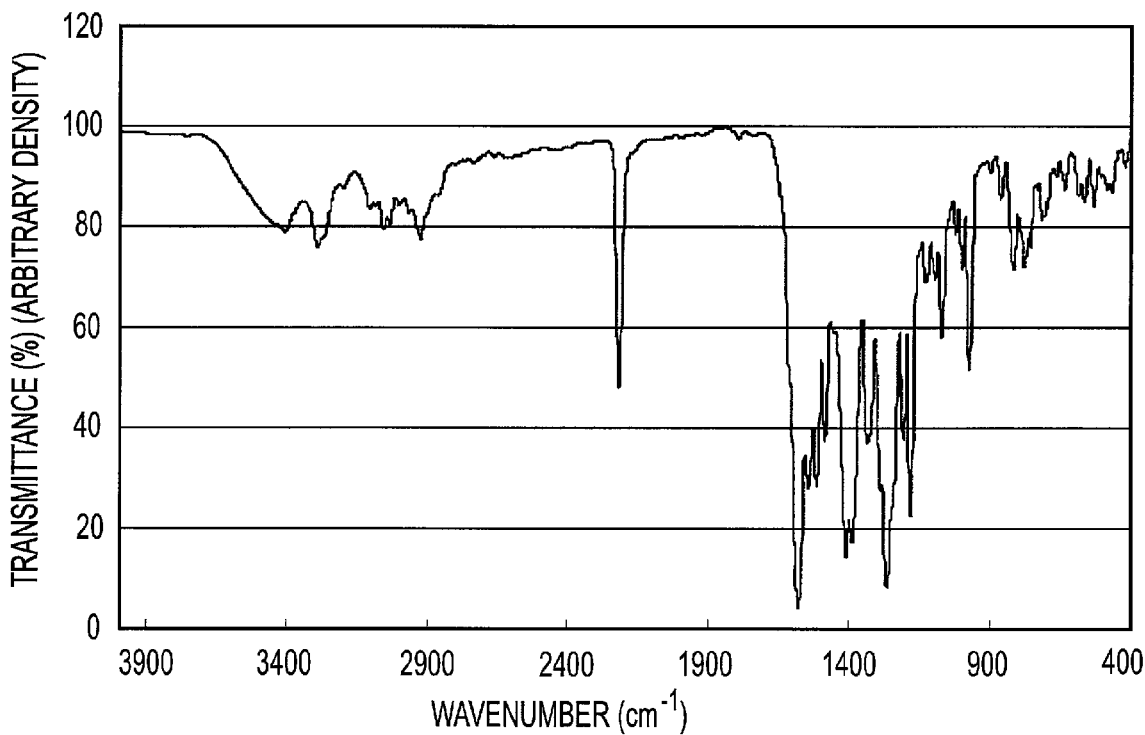
FIG. 26 is an infrared absorption spectrum of a specific illustrative compound D-103.

Infrared absorption chart of compound D-85 is shown in FIG. 20.

Synthesis Example 7

Synthesis of Specific Illustrative Compound D-40

Specific illustrative compound D-40 is synthesized according to the following route.

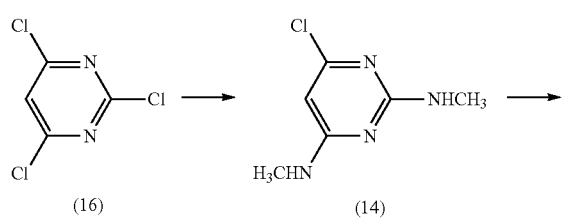

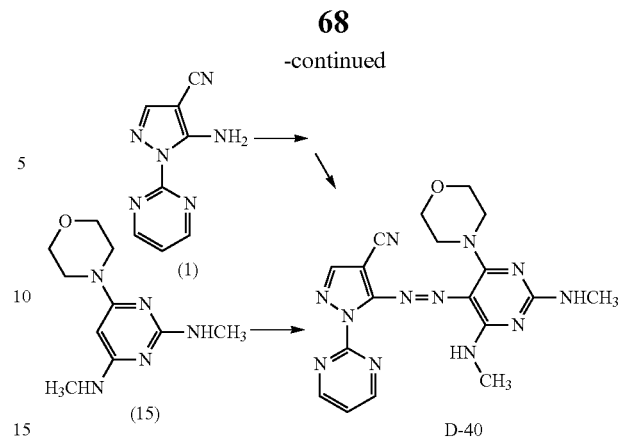

Synthesis of (14)

100 ml of acetonitrile is added to 20 g of compound (13) and, under stirring at 5° C., 60 ml of a 40% methylamine solution is dropwise added thereto in 30 minutes at 20° C. or lower. After completion of the dropwise addition, the mixture is heated at 60 to 65° C. for 30 minutes, and then cooled to room temperature. Crystals precipitated are collected by filtration, and spray-washed with water. The thus-obtained crystals are recrystallized from 100 ml of methanol to obtain 13.3 g of compound (14). Yield: 70.7%.

Synthesis of (15)

5.3 g of morpholine is added to 5 g of compound (14), and the mixture is stirred at an external temperature of 120° C. for 5 hours. The reaction solution is cooled to room temperature, and 50 ml of water is added thereto, followed by stirring the mixture for 1 hour. Crystals precipitated are collected by filtration and spray-washed with a sufficient amount of water. The thus-obtained crystals are dried to obtain 5.5 g of compound (15). Yield: 84.6%.

Synthesis of D-40

1 g of compound (1) is added to 10 ml of phosphoric acid, and the mixture is heated to 30° C. to dissolve. This solution is cooled with ice and, while keeping the temperature of the solution at −5 to 0° C., 0.40 g of sodium nitrite is added thereto, followed by stirring for 1 hour to obtain a diazonium salt solution. Separately, 1.2 g of the compound (15) is dissolved in 80 ml of methanol, and the aforesaid diazonium salt solution is added thereto at 8° C. or lower. At the time of completion of the addition, the ice bath is removed, followed by stirring the mixture for 2 hours. The reaction solution is added to 30 ml of methanol, and the mixture is stirred at room temperature for 2 hours. Crystals precipitated are collected by filtration, and spray-washed with 70 ml of methanol. The crystals are added, without drying, to a 1% sodium hydrogencarbonate aqueous solution, and the mixture is stirred for 1 hour. The crystals are collected by filtration, and spray-washed with a sufficient amount of water. The thus-obtained crystals are added, without drying, to a solution composed of 30 ml of dimethylacetamide (DMAc) and 30 ml of water and, after stirring at 80° C. for 1 hour, the mixture is stirred at room temperature for 2 hours. Crystals precipitated are collected by filtration and spray-washed with 30 ml of a mixture of DMAc/methanol (=1/1). The thus-obtained crystals are dried to obtain 1.2 g of compound D-40 of the invention. Yield: 53.0%.

Figure 7:
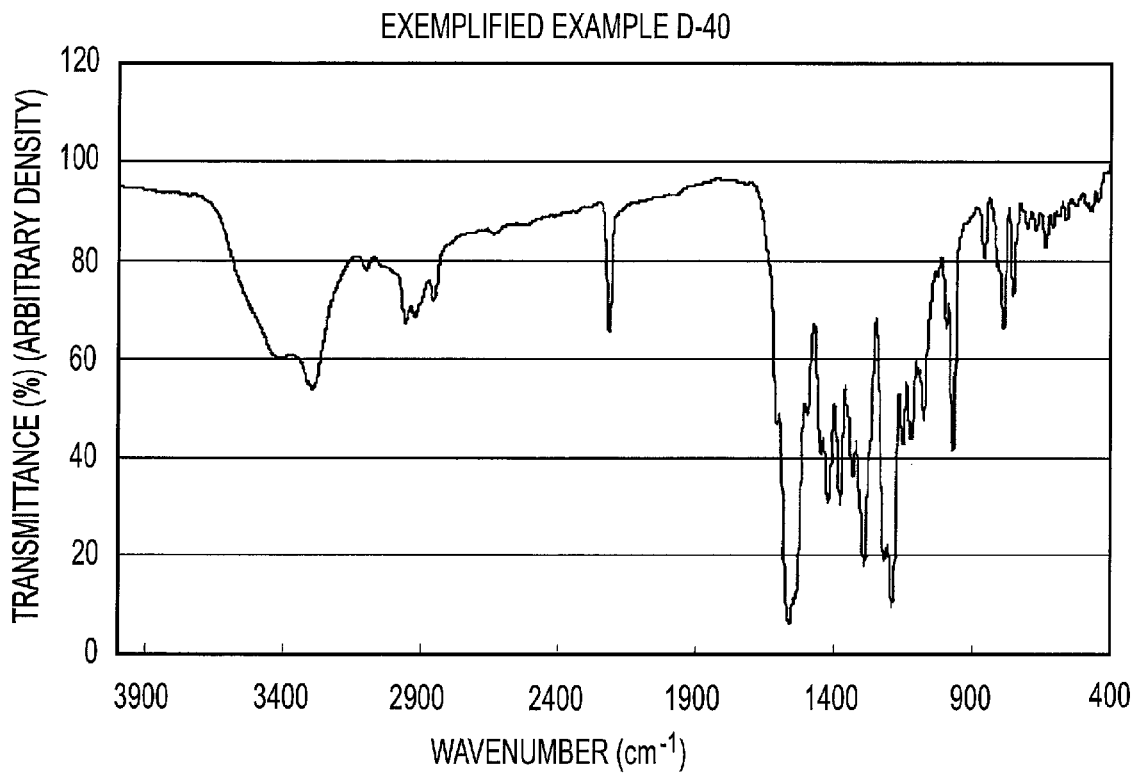
FIG. 7 is an infrared absorption spectrum of a specific illustrative compound D-40.
Figure 8:
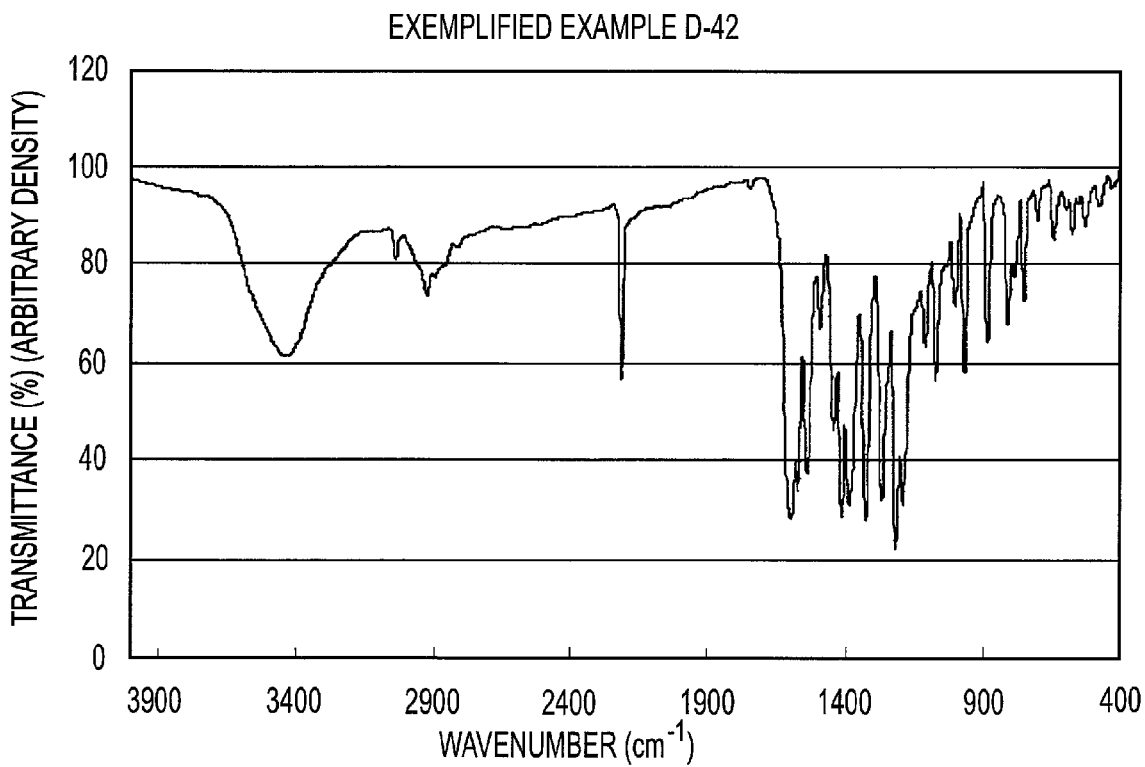
FIG. 8 is an infrared absorption spectrum of a specific illustrative compound D-42.
Figure 9:
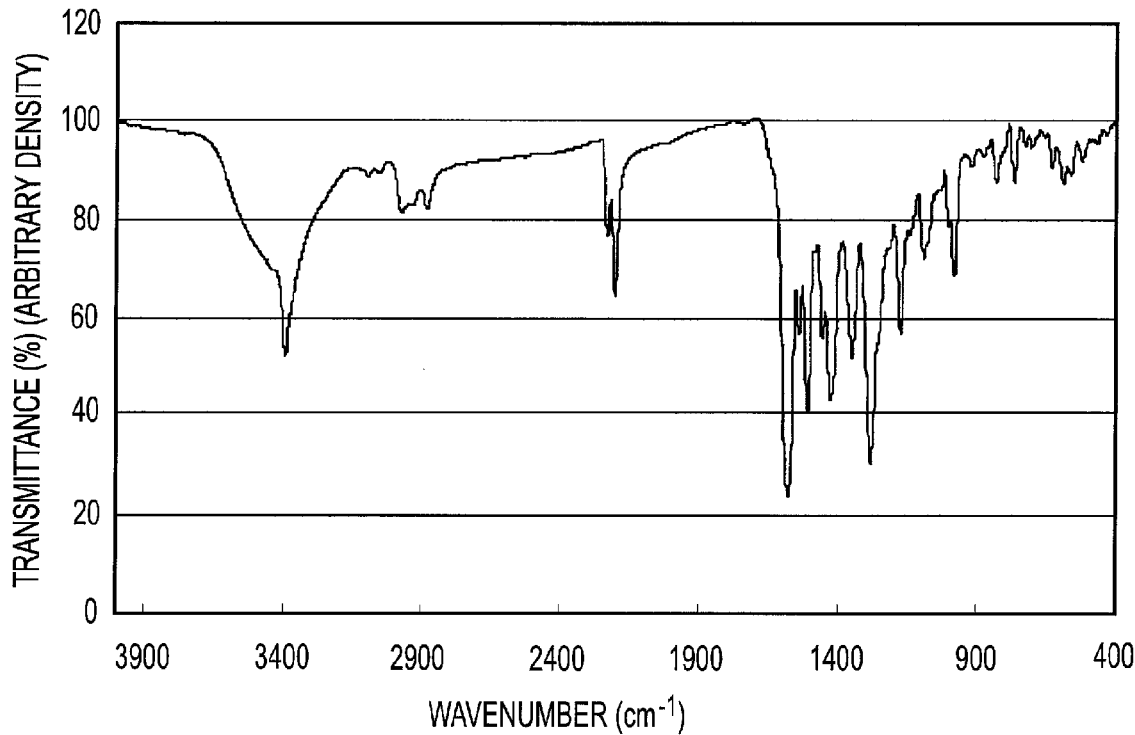
FIG. 9 is an infrared absorption spectrum of a specific illustrative compound D-44.
Figure 10:
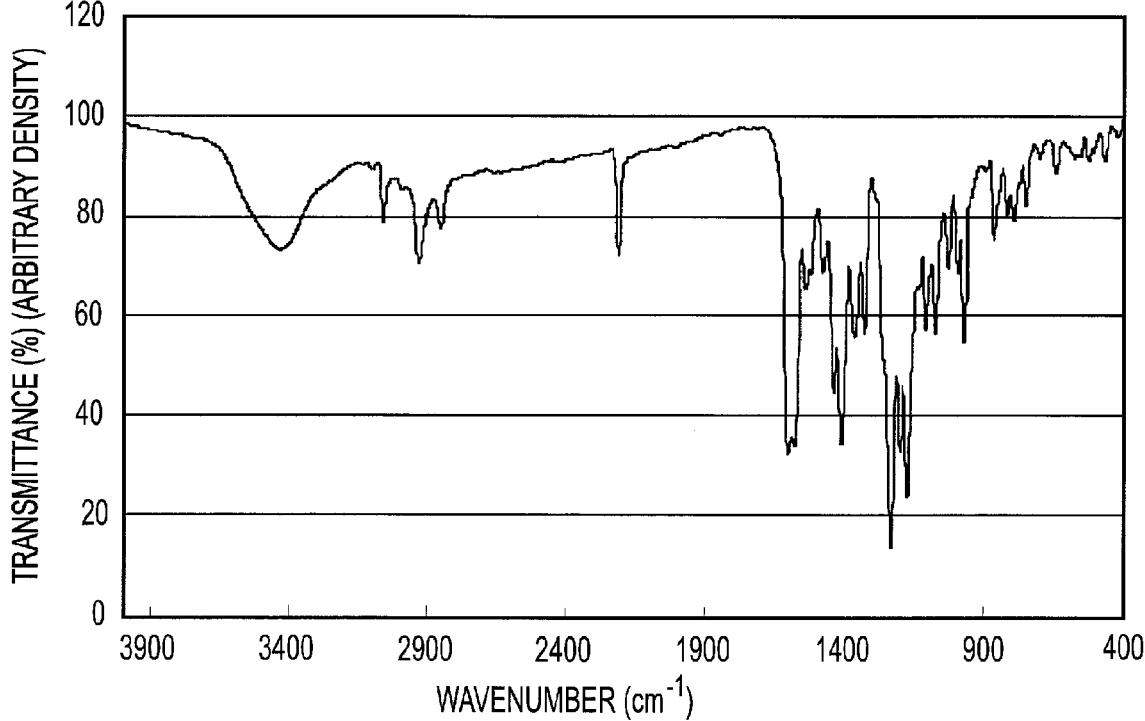
FIG. 10 is an infrared absorption spectrum of a specific illustrative compound D-65.
Figure 11:
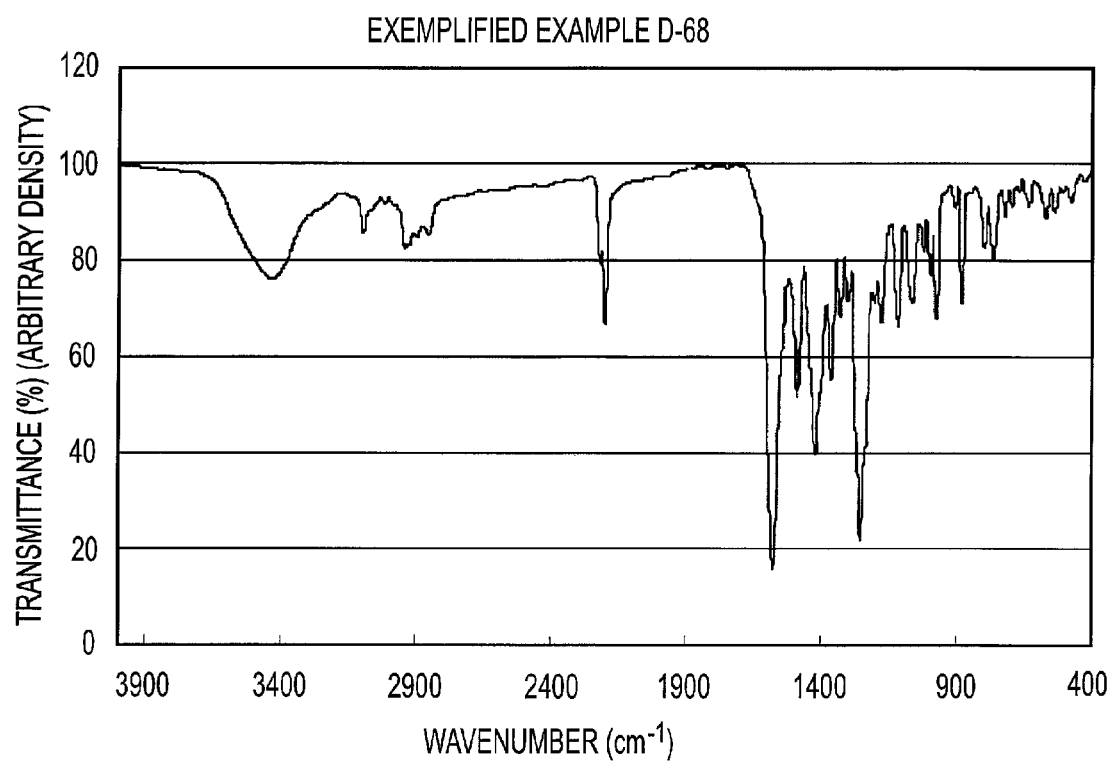
FIG. 11 is an infrared absorption spectrum of a specific illustrative compound D-68.
Figure 12:
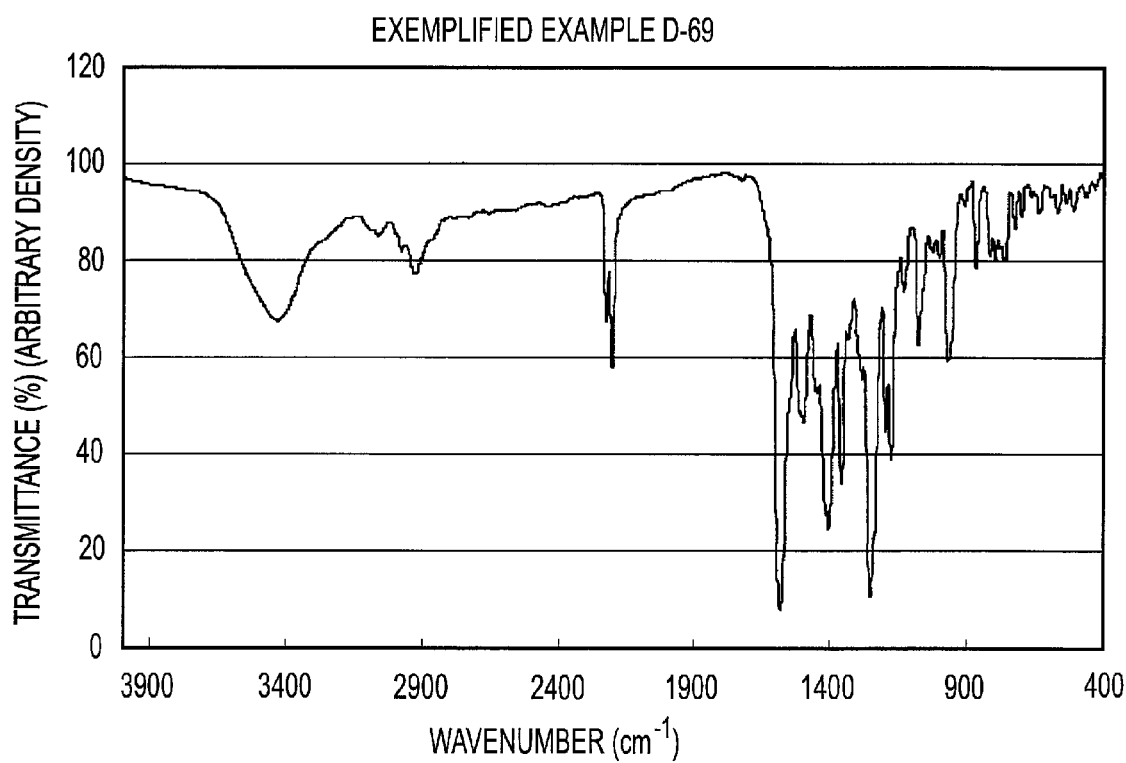
FIG. 12 is an infrared absorption spectrum of a specific illustrative compound D-69.
Figure 13:
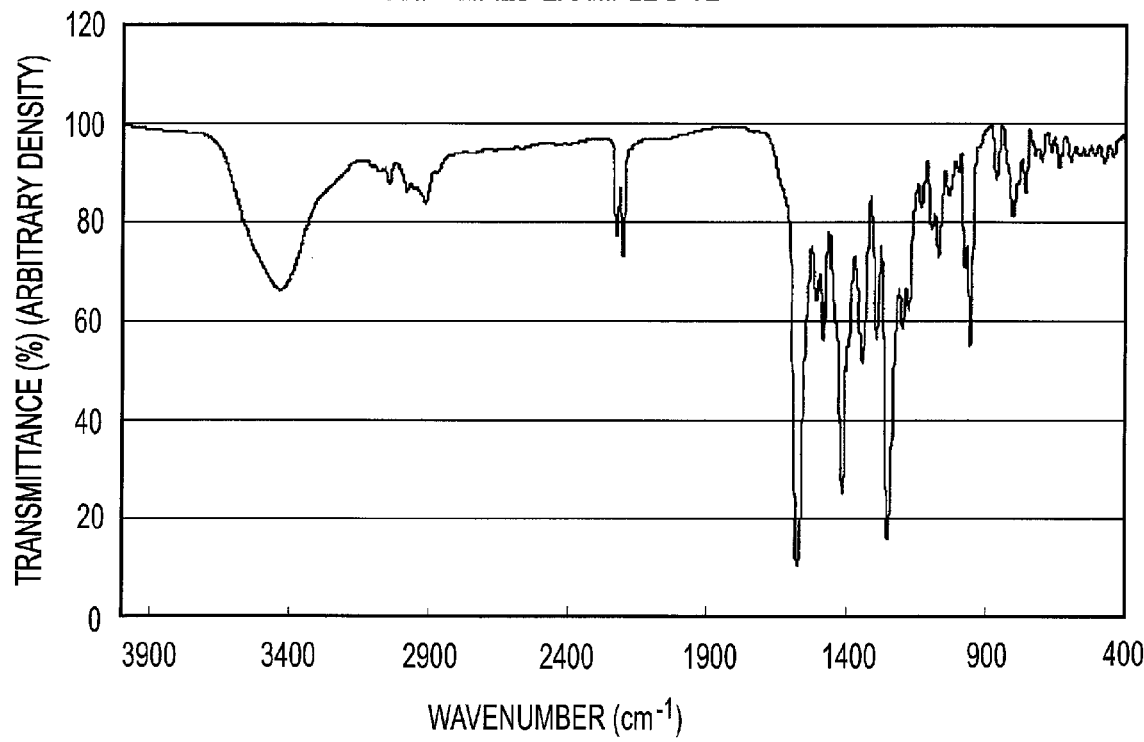
FIG. 13 is an infrared absorption spectrum of a specific illustrative compound D-72.
Figure 14:
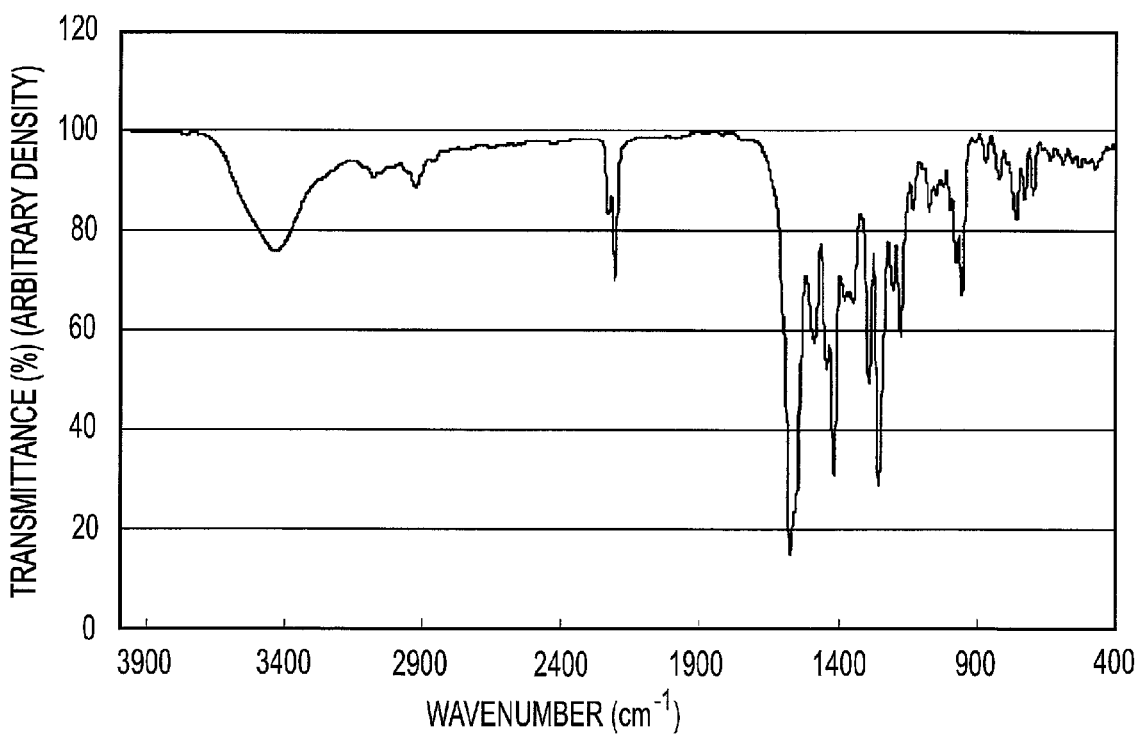
FIG. 14 is an infrared absorption spectrum of a specific illustrative compound D-74.
Figure 15:
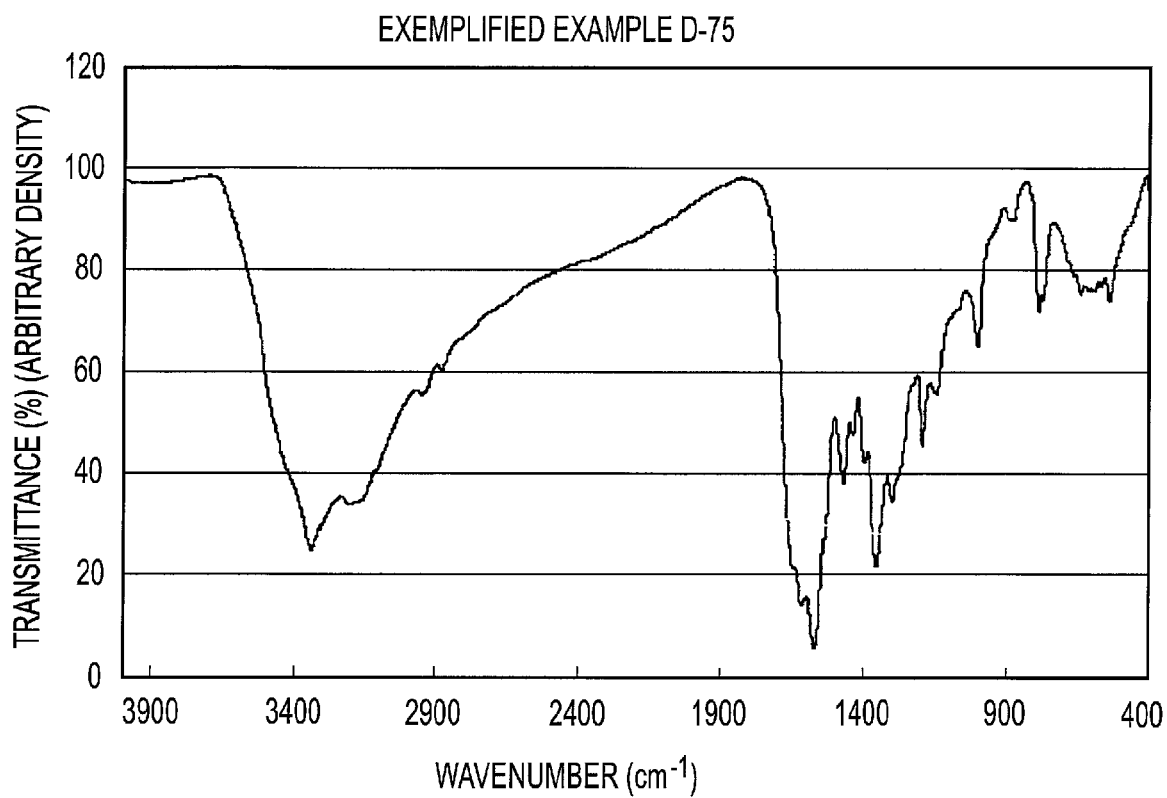
FIG. 15 is an infrared absorption spectrum of a specific illustrative compound D-75.
Figure 16:
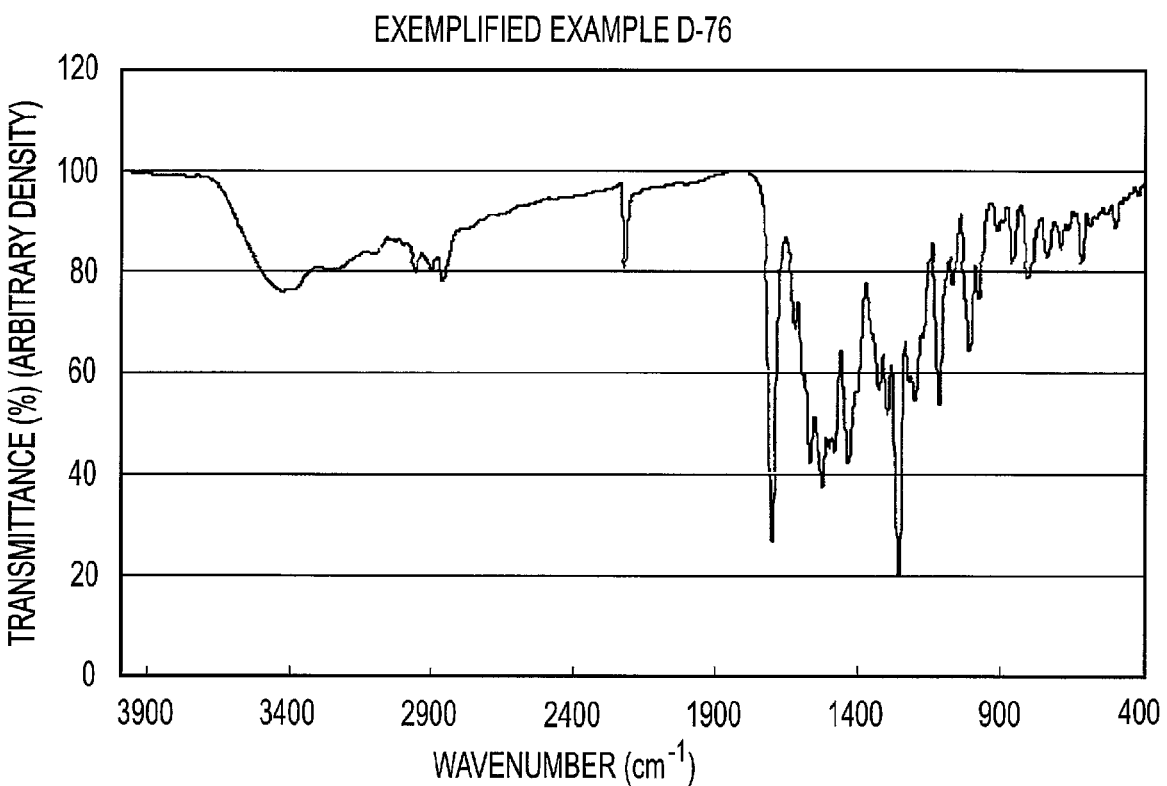
FIG. 16 is an infrared absorption spectrum of a specific illustrative compound D-76.
Figure 17:
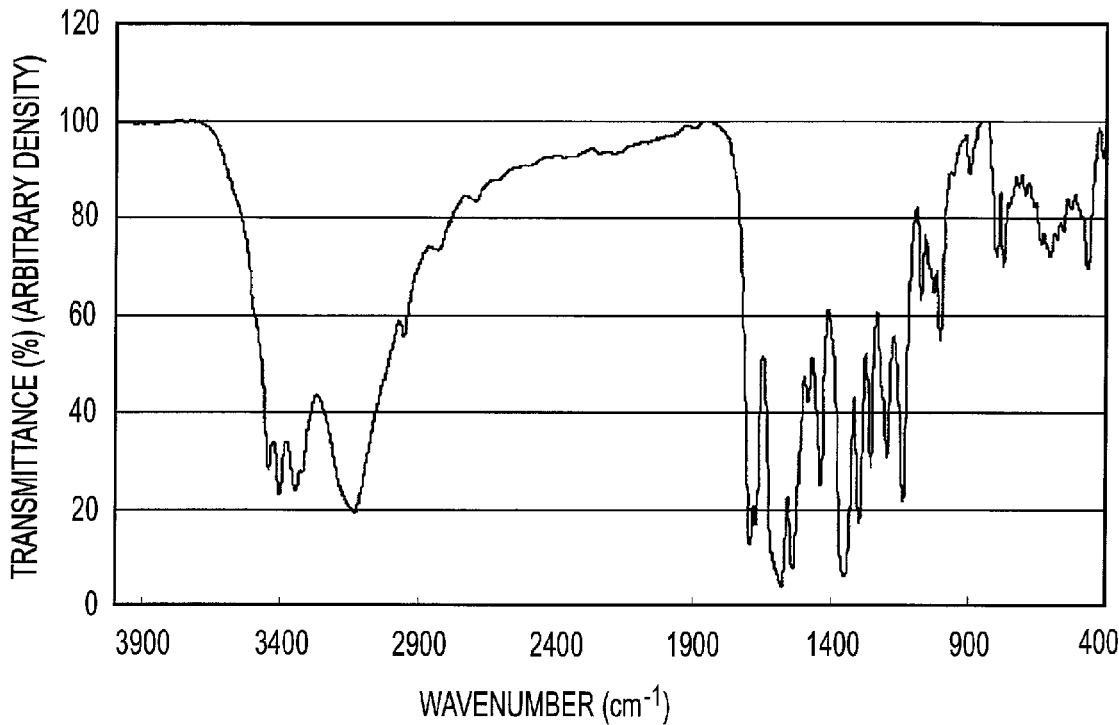
FIG. 17 is an infrared absorption spectrum of a specific illustrative compound D-79.
Figure 18:
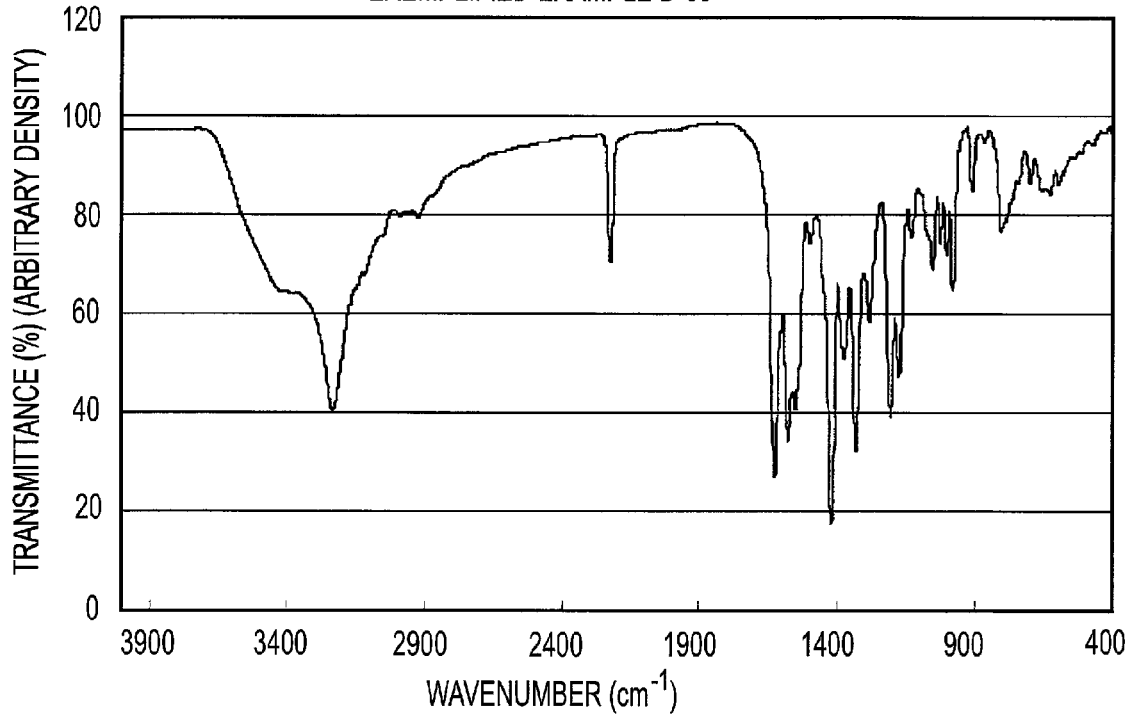
FIG. 18 is an infrared absorption spectrum of a specific illustrative compound D-83.
Figure 19:
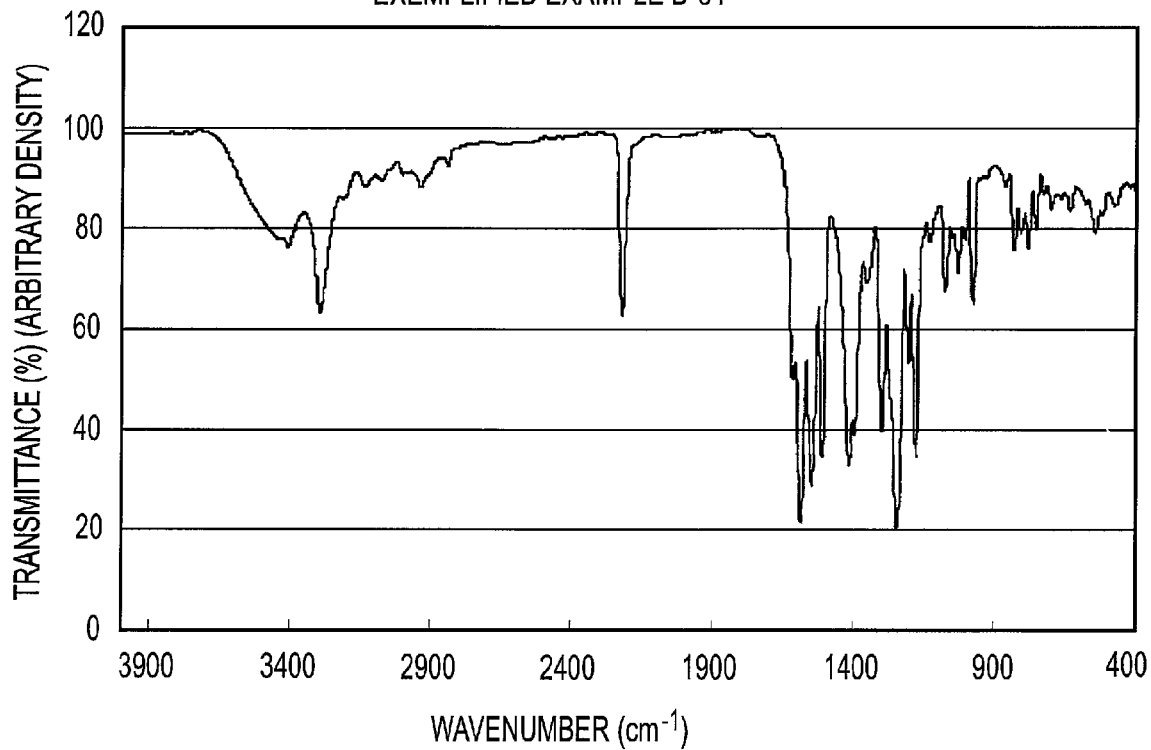
FIG. 19 is an infrared absorption spectrum of a specific illustrative compound D-84.

Infrared absorption chart of compound D-40 is shown in FIG. 7.

Synthesis Example 8

Synthesis of Specific Illustrative Compound D-77

Specific illustrative compound D-77 is synthesized according to the following route.

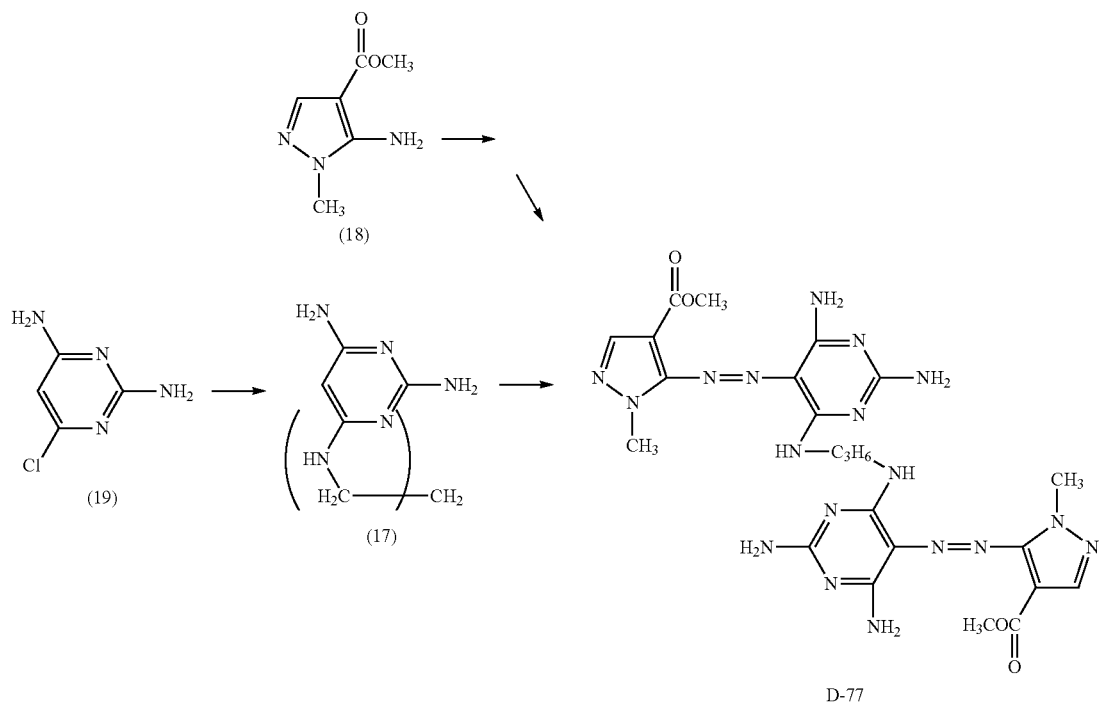

Synthesis of (17)

5 ml of DMAc is added to a mixture of 2.9 g of compound (19) and 0.75 g of 1,3-diaminopropane, and the resulting mixture is stirred at 120° C. for 3 hours. 10 ml of a methanol/acetonitrile (=1/2) solution is added to the reaction solution, followed by stirring. Crystals precipitated are collected by filtration and spray-washed with 10 ml of the methanol/acetonitrile (=1/2) solution to obtain 2.0 g of compound (17). Yield: 69.0%.

Synthesis of D-77

1 g of compound (18) is added to 10 ml of phosphoric acid, and the mixture is heated to 30° C. to dissolve. This solution is cooled with ice and, while keeping the temperature of the solution at −5 to 0° C., 0.46 g of sodium nitrite is added thereto, followed by stirring for 1 hour to obtain a diazonium salt solution. Separately, 0.93 g of the compound (17) is dissolved in 10 ml of methanol, and the aforesaid diazonium salt solution is added thereto at 8° C. or lower. At the time of completion of the addition, the ice bath is removed, followed by stirring the mixture for 2 hours. The reaction solution is added to 30 ml of acetonitrile, and the mixture is stirred at room temperature for 30 minutes. Crystals precipitated are collected by filtration, and spray-washed with 20 ml of acetonitrile. The crystals are added, without drying, to 50 ml of a 1% sodium hydrogencarbonate aqueous solution, and the mixture is stirred for 1 hour. The crystals are collected by filtration, and spray-washed with a sufficient amount of water. The thus-obtained crystals are added, without drying, to a solution composed of 15 ml of dimethylacetamide (DMAc) and 25 ml of water and, after stirring at 80° C. for 1 hour, the mixture is stirred at room temperature for 2 hours. Crystals precipitated are collected by filtration and spray-washed with 30 ml of a mixture of DMAc/water (=1/2). The thus-obtained crystals are dried to obtain 1.1 g of compound D-77 of the invention. Yield: 55.0%.

Figure 27:
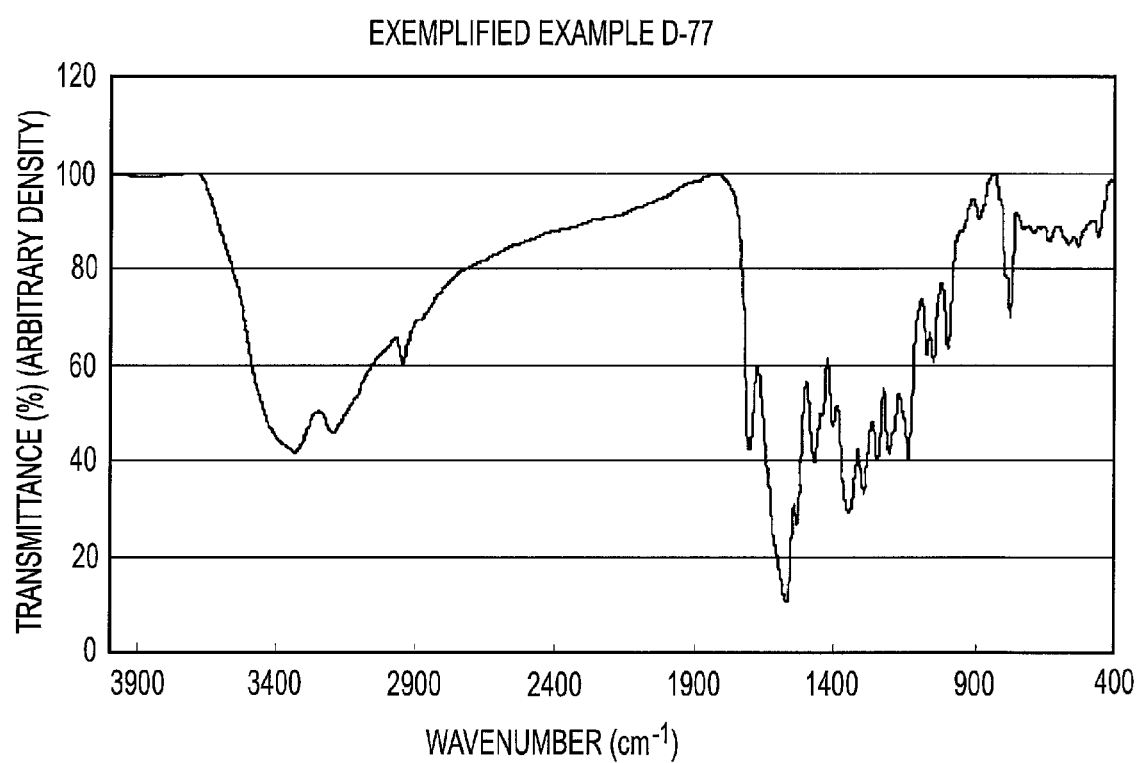
FIG. 27 is an infrared absorption spectrum of a specific illustrative compound D-77.

Infrared absorption chart of compound D-77 is shown in FIG. 27.

IR charts of typical compounds synthesized in Synthesis Examples 1 to 8 and those synthesized in the similar manner are shown in FIGS. 1 to 27.

Example 1

2.5 parts of the specific illustrative compound D-1 (pigment D-1), 0.5 part of sodium oleate, 5 parts of glycerin, and 42 parts of water are mixed, and the resulting mixture is subjected to dispersing procedure together with 100 parts of 0.1-mm diameter zirconia beads for 6 hours at 300 rpm in a planetary ball mill. After completion of the dispersing procedure, the zirconia beads are removed to obtain pigment dispersion 1.

Example 2

5 parts of the pigment D-1 synthesized in Synthesis Example 1, 25.5 parts of an aqueous solution of methacrylic acid-methacrylate copolymer shown as Dispersant Solution 10 described in WO2006/064193, p. 22 as a high-molelcular dispersant, and 19.5 parts of water are mixed, and the resulting mixture is subjected to dispersing procedure together with 100 parts of 0.1-mm diameter zirconia beads for 6 hours at 300 rpm in a planetary ball mill. After completion of the dispersing procedure, the zirconia beads are removed to obtain pigment dispersion 2.

Comparative Example 1

The same procedures as described in Example 1 are conducted except for using C.I. Pigment Yellow 128 (CROMOPHTAL YELLOW 8GN; manufactured by CIBA Specialty Chemicals) in place of the pigment used in Example 1 to obtain yellow comparative pigment dispersion 1.

Comparative Example 2

The same procedures as described in Example 1 are conducted except for using C.I. Pigment Yellow 74 (Iralite YELLOW GO; manufactured by CIBA Specialty Chemicals) in place of the pigment (D-1) used in Example 1 to obtain yellow comparative pigment dispersion 2.

Comparative Example 3

The same procedures as described in Example 1 are conducted except for using C.I. Pigment Yellow 155 (INKJET YELLOW 4G VP2532; manufactured by Clariant Co.) in place of the pigment (D-1) used in Example 1 to obtain yellow comparative pigment dispersion 3.

Comparative Example 4

The same procedures as described in Example 1 are conducted except for using the following comparative compound 4 in place of the pigment (D-1) used in Example 1 to obtain blue comparative pigment dispersion 4.

Comparative compound 4

Compound described in JP-A-56-20062

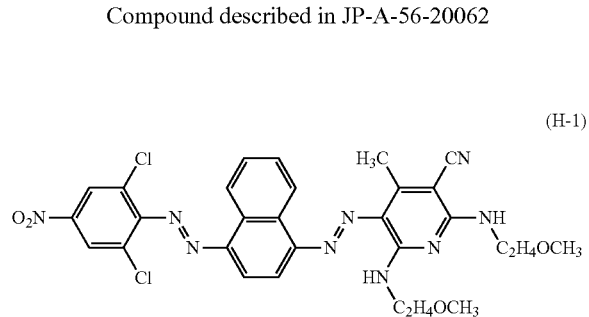

(H-1)

(Evaluation)
<Dispersion Stability>

Each of the pigment dispersions obtained above are subjected to measurement of volume-average particle size in a conventional manner using a dynamic light-scattering particle size-measuring apparatus (Microtrack UPA150; manufactured by Nikkiso Co., Ltd.). Dispersion stability of each of the pigment dispersions is evaluated according to the following criteria: samples with which the volume-average particle size measured 2 hours after preparation of the pigment dispersion and the volume-average particle size measured after being stored at 70° C. for 2 days are both from 130 nm to 30 nm are ranked A (very good); samples with which the volume-average particle size measured 2 hours after preparation of the pigment dispersion and the volume-average particle size measured after being stored at 70° C. for 2 days are both from 230 nm to 131 nm are ranked B (good); and samples with which either of the volume-average particle size measured 2 hours after preparation of the pigment dispersion and the volume-average particle size measured after being stored at 70° C. for 2 days is 230 or more or 30 nm or less are ranked C (bad). The results are shown in Table 1.

<Evaluation of Tinctorial Strength>

Each of the pigment dispersions obtained is coated on a photo mat paper ("pigment only") manufactured by Seiko Epson Corporation by using a No. 3 bar coater. Image density of each of the thus-obtained coated products is measured by means of a reflection densitometer (X-Rite 938; manufactured by X-Rite Co.), and the results are shown in Table 1 as "tinctorial strength (OD: Optical Density)".

<Evaluation of Light Fastness>

Each of the coated products of 1.0 in image density used for evaluation of tinctorial strength is irradiated with xenon light (170000 lux; in the presence of a cut filter which cuts light having a wavelength of 325 nm or less) for 14 days using a fade meter. Image density before and after irradiation with xenon light is measured using the reflection densitometer, and the pigment dispersions are evaluated in terms of colorant residual ratio [(density after irradiation/density before irradiation)×100%]. The results are shown in Table 1.

Examples 3 to 22

Pigment dispersions 3 to 22 are prepared in the same manner as in Example 1 except for changing the specific illustrative compound D-1 to those shown in Table 1, and are evaluated in the same manner.

TABLE 1

| Pigment Dispersion | Pigment | Dispersion Stability | Tinctorial Strength | Light Fastness |
|---|---|---|---|---|
| Example 1 | D-1 | A | 1.35 | 89.6% |
| Example 2 | D-1 | A | 1.40 | 90.2% |
| Example 3 | D-3 | A | 1.49 | 91.8% |
| Example 4 | D-5 | A | 1.43 | 92.4% |
| Example 5 | D-7 | A | 1.36 | 89.0% |
| Example 6 | D-9 | A | 1.30 | 89.0% |
| Example 7 | D-40 | A | 1.38 | 80.2% |
| Example 8 | D-59 | A | 1.30 | 65.2% |
| Example 9 | D-60 | A | 1.30 | 80.5% |
| Example 10 | D-69 | A | 1.42 | 79.2% |
| Example 11 | D-71 | A | 1.39 | 80.2% |
| Example 12 | D-74 | A | 1.30 | 79.0% |
| Example 13 | D-77 | A | 1.42 | 92.2% |
| Example 14 | D-79 | A | 1.40 | 89.8% |
| Example 15 | D-80 | A | 1.42 | 91.2% |
| Example 16 | D-85 | A | 1.46 | 93.0% |
| Example 17 | D-87 | A | 1.49 | 92.4% |
| Example 18 | D-90 | A | 1.48 | 90.2% |
| Example 19 | D-92 | A | 1.45 | 89.8% |
| Example 20 | D-100 | A | 1.35 | 78.8% |
| Example 21 | D-120 | B | 1.40 | 70.3% |
| Example 22 | D-121 | B | 1.15 | 65.2% |
| Comparative Example 1 | P.Y.128 | A | 1.05 | 77.6% |
| Comparative Example 2 | P.Y.74 | A | 1.45 | 12.5% |
| Comparative Example 3 | P.Y.155 | A | 1.10 | 51.9% |
| Comparative Example 4 | H-1 | C | 0.70 | 11.5% |

Example 31

The high-molecular dispersant represented by Dispersant 10 described in WO2006/064193, p. 22 is neutralized with a potassium hydroxide aqueous solution. 30 parts by weight of the azo pigment (D-1) synthesized hereinbefore and 95 parts by weight of deionized water are added to 75 parts by weight (concentration of solid components: 20%) of the thus-obtained dispersant aqueous solution, and the resulting mixture is mixed to roughly disperse by means of a disper agitating element. 600 parts by weight of zirconia beads are added to the mixed and roughly dispersed liquid and, after conducting dispersing procedure for 4 hours in a dispersing machine (sand grinder mill), the liquid is separated into beads and the dispersion. 2 parts by weight of polyethylene glycol diglycidyl ether is gradually added to the thus-obtained mixture while stirring at 25° C., and the mixture is stirred at 50° C. for 6 hours. Further, impurities are removed from the mixture by using a ultra-filtration membrane with the fractional molecular weight of 300K, followed by filtering the mixture by using a syringe of 20 ml in volume equipped with a filter having a pore size of 5 μm (acetylcellulose film; outer diameter: 25 mm; manufactured by Fuji Film Co., Ltd.) to remove coarse particles. Thus, pigment dispersion 31 having a solid content of 10% (particle size: 80 nm; measured by using Nanotrac 150 (UPA-EX150) manufactured by Nikkiso Co., Ltd.) is obtained.

Comparative Example 11

Comparative pigment dispersion 31 is obtained in the same manner as in Example 31 using a yellow pigment (C.I. Pigment Yellow 128 (CROMOPHTAL YELLOW 8GN; manufactured by CIBA Specialty Chemicals)) in place of the pigment used in Example 31.

Example 32

5% by weight (as a solid component) of the pigment dispersion 31 obtained in Example 31, 10% by weight of glycerin, 5% by weight of 2-pyrrolidone, 2% by weight of 1,2-hexanediol, 2% by weight of triethylene glycol monobutyl ether, 0.5% by weight of propylene glycol, and 75.5% by weight of deionized water are mixed, and the resulting mixed liquid is filtered by using a syringe of 20 ml in volume equipped with a filter having a pore size of 1 μm (acetylcellulose film; outer diameter: 25 mm; manufactured by Fuji Film Co., Ltd.) to remove coarse particles. Thus, pigment ink liquid 5 shown in Table 2 is obtained.

Comparative Example 12

Comparative pigment ink liquid 5 is obtained in the same manner as in Example 32 except for using the comparative pigment dispersion 31 obtained in Comparative Example 11 in place of the pigment dispersion 31 obtained in Example 31.

Comparative Example 13

Also, as a comparative type ink, an ink liquid for use in a yellow ink cartridge adapted for PX-V630 manufactured by Seiko Epson Corporation is used as comparative pigment ink liquid 6.

Additionally, in Table 2, "ejection stability", "light fastness", "heat fastness", "ozone fastness", "metallic gloss", and "ink liquid stability" are evaluated as follows. Each ink is placed in a cartridge for a yellow ink liquid adapted for an inkjet printer PX-V630 manufactured by Seiko Epson Corporation, whereas, as other color inks, pigment ink liquids adapted for PX-V630 are used, and a mono-color image pattern and green, red, and gray image patterns wherein density is stepwise changed are printed on image-receiving sheets of photographic paper <Kotaku> manufactured by Seiko Epson Corporation and photographic paper CRISPIA <Ko-kotaku> manufactured by Seiko Epson Corporation selecting recommended kirei mode to thereby evaluate image quality, ejecting properties of the ink, and image fastness. Evaluations are conducted with respect to mono-color samples except for evaluation of metallic gloss.

The inkjet inks of the above-described Example 32 (pigment ink liquid 5) and of Comparative Examples (comparative pigment ink liquid 5 and a yellow pigment ink liquid adapted for PX-V630, comparative pigment ink liquid 6) are subjected to the following evaluations. The results are shown in Table 2.

(Evaluation Experiments)

1) Regarding ejection stability, the cartridge is mounted on a printer and, after confirming ejection of the ink through all nozzles, an image is outputted on 20 sheets of A4 size paper and evaluated according to the following criteria:

A: Printing is not disordered from the start to the end.
B: Printing is disordered in some outputs.
C: Printing is disordered from the start to the end.

2) Regarding image storage stability, the following evaluation is conducted using printed image samples.

[1] Light fastness is evaluated as follows. Image density (Ci) of the sample just after printing is measured by X-rite 310. The sample is irradiated with xenon light (100,000 lux) using a weather meter (manufactured by Atlas Co., Ltd.) for 14 days and then image density (Cf) of the sample is measured to determine an image remaining ratio (Cf/Ci×100), whereby the light fastness is evaluated. The image remaining ratio is determined at 3 points having reflection density of 1, 1.5 and 2 respectively, and a case wherein the image remaining ratio is 80% or more at all three points is ranked A, a case wherein the image remaining ratio is less than 80% at two points is ranked B, and a case wherein the image remaining ratio is less than 80% at all three points is ranked C.

[2] Heat fastness is evaluated as follows. Density of the printed sample is measured by X-rite 310 before and after preservation of the sample under conditions of 80° C. and 60% RH for 7 days and an image remaining ratio is determined, whereby the heat fastness is evaluated. The image remaining ratio is determined at 3 points having reflection density of 1, 1.5 and 2 respectively, and a case wherein the image remaining ratio is 95% or more at all three points is ranked A, a case wherein the image remaining ratio is less than 95% at two points is ranked B, and a case wherein the image remaining ratio is less than 95% at all three points is ranked C.

[3] Ozone resistance (ozone fastness) is evaluated as follows. The printed sample is left for 14 days in a box in which the ozone gas concentration is adjusted to 5 ppm (25° C., 50%), and the image density is measured before and after leaving the paper in the ozone gas atmosphere using a reflection densitometer (Photographic Densitometer 310 manufactured by X-rite) to determine the image-remaining ratio. Additionally, the reflection density is measured at three points where the densities are 1, 1.5 and 2.0, respectively. The ozone gas density within the box is monitored by means of an ozone gas monitor (model: OZG-EM-01) made by APPLICS.

The evaluation is conducted in three ranks. That is, a case wherein the image remaining ratio is 80% or more at all three points is ranked A, a case wherein the image remaining ratio is less than 80% at two points is ranked B, and a case wherein the image remaining ratio is less than 70% at all three points is ranked C.

3) Generation of Metallic Gloss:

Yellow, green, and red solid printed portions of the samples are visually observed under reflected light to evaluate.

A sample with which no metallic gloss is observed is ranked A, and a sample with which metallic gloss is observed is ranked B.

4) Ink liquid stability: Each of the pigment ink liquids obtained in Examples and Comparative Examples are allowed to stand at 60° C. for 10 days, and ink liquid stability is evaluated as follows. A sample wherein particle size of the particles in the pigment ink is not changed is ranked A, and a sample wherein particle size of the particles is changed is ranked B. The results are shown in the following Table 2.

TABLE 2

| Ink Liquid | Ejection Stability | Light Fastness | Heat Fastness | Ozone Fastness | Metallic Gloss | Ink Liquid Stability | Pigment |
|---|---|---|---|---|---|---|---|
| Example 32 | A | A | A | A | A | A | D-1 |
| Comparative Example 12 | A | B | A | A | B | A | C.I.P.Y.128 |
| Comparative Example 13 | A | C | A | A | A | A | PX-V630 |

It is seen from the results shown in Table 2 that the pigment ink liquid using the pigment of the invention has excellent ejection properties and excellent weatherability, can suppress generation of metallic gloss, and shows excellent pigment ink liquid stability.

As is apparent from the results shown in Table 2, it is seen that the system using the ink liquid of the invention is excellent in every performance. In particular, in comparison with the samples of Comparative Examples, the sample of the invention shows excellent light fastness and ink liquid stability.

Example 33

When an image is printed on inkjet paper of photographic glossy paper "Gasai" manufactured by Fuji Film Co., Ltd. by using the pigment ink liquid prepared in Example 32 and using PX-V 630 manufactured by Seiko Epson Corporation, and then the printed paper is subjected to the same evaluation as in Example 32 to obtain the same results.

As is apparent from the results shown in Tables 1 and 2, the pigment dispersions 1 to 20 and the pigment liquid 5 using the pigments of the invention are excellent in color tone, and show high tinctorial strength and high light fastness.

Therefore, the pigment dispersions using the pigments of the invention can favorably be used for an ink for printing such as inkjet printing.

INDUSTRIAL APPLICABILITY

According to the present invention, there can be provided an azo pigment showing excellent coloring characteristics such as tinctorial strength and hue and showing excellent fastness such as light fastness and ozone fastness, a dispersion containing the azo pigment, a coloring composition containing the azo pigment, and an ink for inkjet recording containing the pigment.

Although the invention has been described in detail and by reference to specific embodiments, it is apparent to those skilled in the art that it is possible to add various alterations and modifications insofar as the alterations and modifications do not deviate from the spirit and the scope of the invention.

This application is based on a Japanese patent application filed on Mar. 7, 2008 (Japanese Patent Application No. 2008-58707) and a Japanese patent application filed on Dec. 16, 2008 (Japanese Patent Application No. 2008-319660), and the contents thereof are incorporated herein by reference.

The invention claimed is:

1. An azo pigment represented by the general formula (1), a tautomer, salt, or hydrate of the azo pigment:

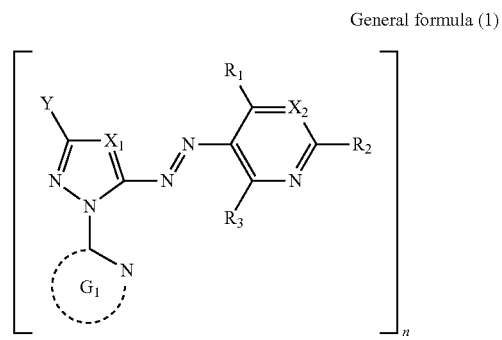

General formula (1)

wherein $G_1$ represents 5- or 6-membered ring together with carbon atoms and a nitrogen atom(s), the heterocyclic ring may be an aromatic ring or a condensed ring;

Y represents a hydrogen atom or an aliphatic group;

$R_1$ represents an aliphatic group, an aliphatic amino group, an arylamino group, a heterocyclic amino group, an acylamino group, a sulfonamido group, an amino group, or a heterocyclic group;

$R_2$ and $R_3$ each independently represents an aliphatic amino group, an arylamino group, a heterocyclic amino group, an acylamino group, a sulfonamido group, an amino group, or a heterocyclic group;

$X_1$ represents a nitrogen atom or C—Z, Z represents an electron-withdrawing group having a Hammett σp value of 0.2 or more;

$X_2$ represents a nitrogen atom or C—$R_5$, $R_5$ represents a hydrogen atom, a cyano group, a carbamoyl group, an aliphatic oxycarbonyl group, or a carboxyl group;

n represents an integer of from 1 to 4;

when n=2, the general formula (1) represents a dimer formed through $R_1$, $R_2$, $R_3$, Y, Z, or G;

when n=3, the general formula (1) represents a trimer formed through $R_1$, $R_2$, $R_3$, Y, Z, or G; and when n=4, the general formula (1) represents a tetramer formed through $R_1$, $R_2$, $R_3$, Y, Z, or G.

2. The azo pigment, a tautomer, salt, or hydrate thereof according to claim 1, wherein the azo pigment represented by the general formula (1) is represented by general formula (2) or (2-1):

General formula (2)

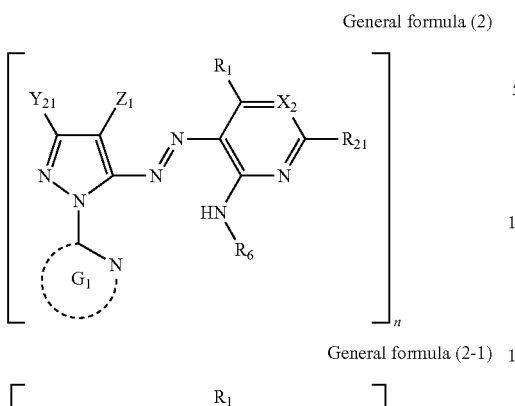

General formula (2-1)

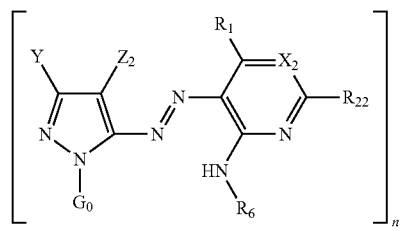

General formula (2-1)

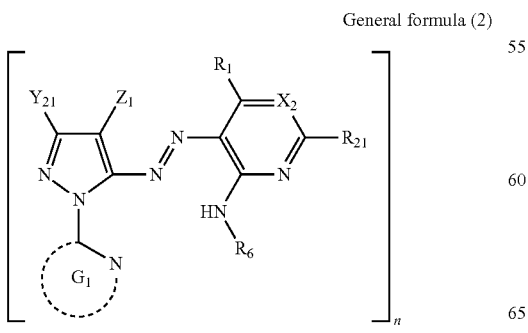

wherein Y, $R_1$, n, and $X_2$ are the same as those defined with respect to the general formula (1);

$R_6$ represents a hydrogen atom, an aliphatic group, an aryl group, or a heterocyclic group;

$R_{21}$ and $R_{22}$ each independently represents an aliphatic amino group, an arylamino group, a heterocyclic amino group, an acylamino group, a sulfonamido group, an amino group, or a heterocyclic group;

$G_1$ is defined in the general formula (1)

$G_0$ represents an aliphatic group;

$Z_1$ and $Z_2$ each represents an electron-withdrawing group having a Hammett σp value of 0.2 or more; and $Y_{21}$ represents a hydrogen atom or a methyl group.

3. A pigment dispersion containing at least one azo pigment according to claim 1, a tautomer, salt, or hydrate thereof.

4. A coloring composition containing at least one azo pigment according to claim 1, a tautomer, salt, or hydrate thereof.

5. An ink for inkjet recording using the pigment dispersion according to claim 3.

6. An azo compound represented by the general formula (2) or (2-1):

General formula (2)

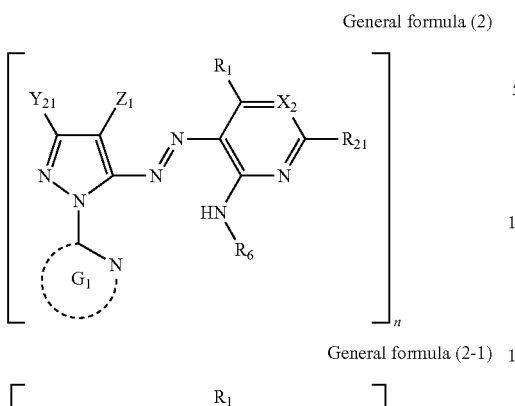

wherein

Y represents a hydrogen atom or an aliphatic group;

$R_1$ represents an aliphatic group, an aliphatic amino group, an arylamino group, a heterocyclic amino group, an acylamino group, a sulfonamido group, an amino group, or a heterocyclic group;

$R_{21}$ and $R_{22}$ each independently represents an aliphatic amino group, an arylamino group, a heterocyclic amino group, an acylamino group, a sulfonamido group, an amino group, or a heterocyclic group;

$Z_1$ and $Z_2$ each represent an electron-withdrawing group having a Hammett σp value of 0.2 or more;

$X_2$ represents a nitrogen atom or C—$R_5$, $R_5$ represents a hydrogen atom, a cyano group, a carbamoyl group, an aliphatic oxycarbonyl group, or a carboxyl group;

$R_6$ represents a hydrogen atom, an aliphatic group, an aryl group, or a heterocyclic group;

$G_0$ represents an aliphatic group;

$G_1$ represents a 5- or 6-membered ring together with carbon atoms and a nitrogen atom(s), the heterocyclic ring may be an aromatic ring or a condensed ring;

$Y_{21}$ represents a hydrogen atom or a methyl group;

n represents an integer of from 1 to 4;

when n=2, the general formula (1) represents a dimer formed through $R_1$, $R_{21}$, $R_{22}$, $R_6$, Y, $Y_{21}$, $Z_1$, $Z_2$, $G_0$, or $G_1$;

when n=3, the general formula (1) represents a trimer formed through $R_1$, $R_{21}$, $R_{22}$, $R_6$, Y, $Y_{21}$, $Z_1$, $Z_2$, $G_0$, or $G_1$; and when n=4, the general formula (1) represents a tetramer formed through $R_1$, $R_{21}$, $R_{22}$, $R_6$, Y, $Y_{21}$, $Z_1$, $Z_2$, $G_0$, or $G_1$.

7. The azo pigment, a tautomer, salt, or hydrate thereof according to claim 1, wherein G is selected from the group consisting of G-1, G-4 and G-6 wherein $Y_1$, $Y_2$, $Y_3$ and $Y_4$ each independently represents a hydrogen atom or a substituent:

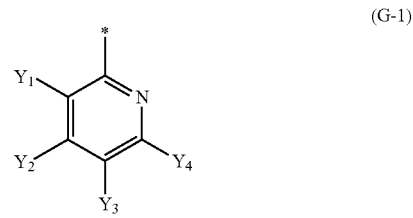

(G-1)

-continued

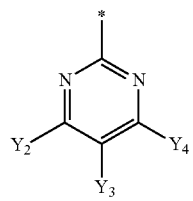
(G-4)

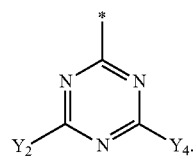
(G-6)

8. The azo pigment, a tautomer, salt, or hydrate thereof according to claim 1, wherein Y is a hydrogen atom.

9. The azo pigment, a tautomer, salt, or hydrate thereof according to claim 1, wherein $X_2$ is a nitrogen atom.

10. The azo pigment, a tautomer, salt, or hydrate thereof according to claim 1, wherein $R_2$ is an alkylamino group, an arylamino group, or a saturated heterocyclic group connected at a nitrogen atom, and a nitrogen atom included in $R_2$ is connected to at least a hydrogen atom.

* * * * *